(12) United States Patent
Seymour et al.

(10) Patent No.: US 7,047,982 B2
(45) Date of Patent: May 23, 2006

(54) METHOD FOR REGISTERING PATTERN LOCATION ON CIGARETTE WRAPPING MATERIAL

(75) Inventors: Sydney Keith Seymour, Clemmons, NC (US); Balager Ademe, Winston-Salem, NC (US)

(73) Assignee: R.J. Reynolds Tobacco Company, Winstôn-Salem, NC (US)

( * ) Notice: Subject to any disclaimer, the term of this patent is extended or adjusted under 35 U.S.C. 154(b) by 310 days.

(21) Appl. No.: 10/440,219

(22) Filed: May 16, 2003

(65) Prior Publication Data

US 2004/0237979 A1    Dec. 2, 2004

(51) Int. Cl.
A24C 5/38    (2006.01)

(52) U.S. Cl. .................. 131/284; 131/280; 131/60; 131/65

(58) Field of Classification Search ................ 131/284, 131/280, 65, 60, 59
See application file for complete search history.

(56) References Cited

U.S. PATENT DOCUMENTS

| | | |
|---|---|---|
| 48,936 A | 7/1865 | Hazman et al. |
| 1,999,222 A | 4/1935 | Weinberger |
| 1,999,223 A | 4/1935 | Weinberger |
| 1,999,224 A | 4/1935 | Miles |
| 2,049,320 A | 7/1936 | Ruben et al. |
| 2,149,896 A | 3/1939 | McArdle et al. |
| 2,512,414 A | 6/1950 | Booth |
| 2,876,160 A | 3/1959 | Schoch et al. |
| 3,165,105 A | 1/1965 | Campbell |
| 3,288,147 A | 11/1966 | Molins et al. |
| 3,422,819 A | 1/1969 | Jones et al. |
| 3,632,384 A | 1/1972 | Saint-Pastou |
| 3,693,313 A | 9/1972 | Sexstone |
| 3,773,055 A | 11/1973 | Stungis et al. |
| 3,844,199 A | 10/1974 | Block et al. |
| 3,890,980 A | 6/1975 | Geldmacher |
| 3,915,176 A | 10/1975 | Heitmann et al. |
| 3,987,804 A | 10/1976 | Molins et al. |
| 3,999,559 A | 12/1976 | Marritt et al. |
| 4,169,278 A | 9/1979 | Roehlich et al. |
| 4,174,720 A | 11/1979 | Hall |
| 4,186,754 A | 2/1980 | Labbe |
| 4,208,956 A | 6/1980 | Hall |
| 4,237,907 A | 12/1980 | Pawelko et al. |
| 4,252,527 A | 2/1981 | Hall |
| 4,280,187 A | 7/1981 | Reuland et al. |
| 4,281,670 A | 8/1981 | Heitmann et al. |
| 4,291,713 A | 9/1981 | Frank |
| 4,340,074 A | 7/1982 | Tudor |
| 4,361,156 A | 11/1982 | Hall |
| 4,409,995 A | 10/1983 | Nichols |
| 4,412,829 A | 11/1983 | Lebet |
| 4,434,805 A | 3/1984 | Hall |
| 4,459,998 A | 7/1984 | Labbe et al. |
| 4,474,190 A | 10/1984 | Brand |
| 4,574,816 A | 3/1986 | Rudszinat |
| 4,580,579 A | 4/1986 | Wahle et al. |
| 4,582,507 A | 4/1986 | Grollimund |
| 4,583,558 A | 4/1986 | Luke |
| 4,590,954 A | 5/1986 | Gooden |
| 4,607,647 A | 8/1986 | Dashley et al. |
| 4,619,276 A | 10/1986 | Albertson et al. |
| 4,619,278 A | 10/1986 | Smeed et al. |
| 4,643,203 A | 2/1987 | Labbe |
| 4,727,888 A | 3/1988 | Luke |
| 4,732,165 A | 3/1988 | Hakansson et al. |
| 4,781,203 A | 11/1988 | La Hue |
| 4,844,100 A | 7/1989 | Holznagel |
| 4,845,374 A | 7/1989 | White et al. |
| 4,878,506 A | 11/1989 | Pinck et al. |
| 4,889,145 A | 12/1989 | Adams et al. |

(Continued)

FOREIGN PATENT DOCUMENTS

EP    0546576 B1    3/1996

(Continued)

OTHER PUBLICATIONS

Hauni Protos/VE 80 Operating Manual, No. 385, B2282e, pp. 3/10-3/11, in existence at least as of Dec. 20, 2002.

(Continued)

*Primary Examiner*—Dionne A. Walls
*Assistant Examiner*—Carmen Lyles-Irving
(74) *Attorney, Agent, or Firm*—Kilpatrick Stockton LLP

(57) ABSTRACT

Cigarettes are manufactured using modified automated cigarette making apparatus. Those cigarettes possess smokable rods having paper wrapping materials having additive materials applied thereto as patterns. The additive material can be applied as a coating formulation in an off-line manner to a continuous paper sheet web that is later used for cigarette manufacture. The additive material can be applied as a coating formulation in an on-line manner to continuous paper web moving through an operating cigarette making machine. The coating formulation is applied to the paper web using roll applicator techniques, ink jet printing techniques or electrostatic precipitation techniques. Liquid coating formulation are curable, and are virtually absent of solvent or liquid carrier. Radiation, such as ultraviolet or electron beam radiation, is used to solidify and fix polymerizable liquid components of the coating formulation that have been applied to the paper web. Heating and subsequent cooling of the coating formulation used to fix solid components of the coating formulation that have been applied to the paper web. Registration techniques are used to ensure proper positioning of the additive material on the smokable rods so manufactured, and to ensure proper quality of those cigarettes.

2 Claims, 18 Drawing Sheets

U.S. PATENT DOCUMENTS

| | | |
|---|---|---|
| 4,944,316 A | 7/1990 | Stuhl et al. |
| 4,945,932 A | 8/1990 | Mentzel et al. |
| 4,962,773 A | 10/1990 | White et al. |
| 4,979,521 A | 12/1990 | Davis et al. |
| 5,012,823 A | 5/1991 | Keritsis et al. |
| 5,060,665 A | 10/1991 | Heitmann |
| 5,085,228 A | 2/1992 | Mooney et al. |
| 5,105,838 A | 4/1992 | White et al. |
| 5,156,169 A | 10/1992 | Holmes et al. |
| 5,163,452 A | 11/1992 | Marritt et al. |
| 5,170,128 A | 12/1992 | Masurat et al. |
| 5,191,906 A | 3/1993 | Myracle, Jr. |
| 5,200,020 A | 4/1993 | Collins et al. |
| 5,314,559 A | 5/1994 | Rinehart et al. |
| 5,342,484 A | 8/1994 | Cutright et al. |
| 5,387,285 A | 2/1995 | Rivers |
| 5,450,863 A | 9/1995 | Collins et al. |
| 5,534,114 A | 7/1996 | Cutright et al. |
| 5,634,477 A | 6/1997 | Ogura et al. |
| 5,666,976 A | 9/1997 | Adams et al. |
| 5,692,526 A | 12/1997 | Adams et al. |
| 5,709,352 A | 1/1998 | Rogers et al. |
| 5,735,292 A | 4/1998 | Draghetti |
| 5,849,153 A | 12/1998 | Ishino et al. |
| 5,919,906 A | 7/1999 | Rowlands et al. |
| 5,966,218 A | 10/1999 | Bokelman et al. |
| 5,997,691 A | 12/1999 | Gautam et al. |
| 6,020,969 A | 2/2000 | Struckhoff et al. |
| 6,059,706 A | 5/2000 | Chehab et al. |
| 6,198,537 B1 | 3/2001 | Bokelman et al. |
| 6,202,648 B1 | 3/2001 | Schumacher et al. |
| 6,202,649 B1 | 3/2001 | Williams |
| 6,229,115 B1 | 5/2001 | Voss et al. |
| 6,543,457 B1 | 4/2003 | Maiwald et al. |
| 6,596,125 B1 | 7/2003 | Garg et al. |
| 6,606,999 B1 | 8/2003 | Crooks et al. |
| 6,645,605 B1 | 11/2003 | Hammersmith et al. |
| 6,647,878 B1 | 11/2003 | Blau et al. |
| 6,684,781 B1 | 2/2004 | Saitoh |
| 6,848,449 B1 * | 2/2005 | Kitao et al. .......... 131/65 |
| 6,904,917 B1 * | 6/2005 | Kitao et al. .......... 131/65 |
| 2002/0023655 A1 | 2/2002 | Fietkau |
| 2002/0092621 A1 | 7/2002 | Suzuki |
| 2002/0129823 A1 | 9/2002 | Dombek et al. |
| 2002/0139381 A1 | 10/2002 | Peterson et al. |
| 2002/0179105 A1 | 12/2002 | Zawadzki et al. |
| 2002/0179106 A1 | 12/2002 | Zawadzki et al. |
| 2003/0131860 A1 | 7/2003 | Ashcraft et al. |
| 2003/0136419 A1 | 7/2003 | Muller |
| 2003/0136420 A1 | 7/2003 | Kraker |
| 2003/0145866 A1 | 8/2003 | Hartmann |
| 2003/0145869 A1 | 8/2003 | Kitao et al. |
| 2003/0150466 A1 | 8/2003 | Kitao et al. |
| 2003/0197126 A1 | 10/2003 | Sato et al. |
| 2003/0211351 A1 | 11/2003 | Figel et al. |
| 2004/0011369 A1 | 1/2004 | Matsufuji et al. |
| 2004/0020520 A1 | 2/2004 | Fuentes et al. |
| 2004/0261805 A1 | 12/2004 | Wanna et al. |

FOREIGN PATENT DOCUMENTS

| | | |
|---|---|---|
| EP | 1092354 A1 | 4/2001 |
| EP | 1 234 514 A2 | 8/2002 |
| EP | 1329165 A1 | 7/2003 |
| EP | EP 1 472 937 A2 | 11/2004 |
| GB | GB 602 736 | 6/1948 |
| WO | WO 02/17737 A1 | 3/2002 |
| WO | WO 02/19848 A1 | 3/2002 |
| WO | WO 02/37991 A1 | 5/2002 |
| WO | WO 02/44700 A1 | 6/2002 |
| WO | WO 02/055294 A1 | 7/2002 |
| WO | WO 02/078471 A1 | 10/2002 |
| WO | WO 03/000497 A2 | 1/2003 |
| WO | WO 03/064165 A1 | 8/2003 |
| WO | WO 03/077686 A1 | 9/2003 |
| WO | WO 2004/056220 A1 | 7/2004 |
| WO | WO 2004/089120 A1 | 10/2004 |
| WO | WO 2004/089121 A1 | 10/2004 |
| WO | WO 2004/095957 A3 | 11/2004 |

OTHER PUBLICATIONS

Hauni Protos/SE 80 Operating Manual, No. B585e, pp. 4/10-4/11, in existence at least as of Dec. 20, 2002.

Hauni Operating Manual, MAX 2, No. 78, HME.0110.04.5.e, pp. 13-49-13/81, Jun. 1997.

* cited by examiner

METHOD FOR REGISTERING PATTERN LOCATION ON CIGARETTE WRAPPING MATERIAL

FIELD OF THE INVENTION

The present invention relates to smoking articles, and in particular, to equipment, materials and techniques used for the manufacture of those smoking articles and components thereof. More specifically, the present invention relates to the manufacture of cigarette rods, and in particular, to systems and methods for applying an additive material to desired locations of wrapping materials of cigarettes in an efficient, effective and desired manner.

BACKGROUND OF THE INVENTION

Smoking articles, such as cigarettes, have a substantially cylindrical rod-shaped structure and include a charge, roll, or column of smokable material, such as shredded tobacco, surrounded by a paper wrapper, to form a "cigarette rod," "smokable rod" or a "tobacco rod." Normally, a cigarette has a cylindrical filter element aligned in an end-to-end relationship with the tobacco rod. Typically, a filter element comprises plasticized cellulose acetate tow circumscribed by a paper material known as "plug wrap." Certain cigarettes incorporate filter elements comprising, for example, activated charcoal particles. Typically, the filter element is attached to one end of the tobacco rod using a circumscribing wrapping material known as "tipping paper."

A cigarette is used by a smoker by lighting one end of that cigarette, and burning the tobacco rod. The smoker then receives mainstream smoke into his or her mouth by drawing on the opposite end of the cigarette. During the time that the cigarette is not being drawn upon by the smoker, the cigarette remains burning.

Numerous attempts have been made to control the manner that a cigarette burns when the cigarette is not being drawn upon. For example, cigarette papers have been treated with various materials to cause cigarettes incorporating those papers to self extinguish during periods when those cigarettes are lit but are not being actively puffed. Certain treatment methods have involved applying materials to the paper in circumferential bands or longitudinal stripes, creating areas that affect the burn rate of cigarettes incorporating those cigarette papers. See, for example, U.S. Pat. No. 3,030,963 to Cohn; U.S. Pat. No. 4,146,040 to Cohn; U.S. Pat. No. 4,489,738 to Simon; U.S. Pat. No. 4,489,650 to Weinert; and U.S. Pat. No. 4,615,345 to Durocher; US Patent Application 2002/0185143 to Crooks et al.; and U.S. patent application Ser. No. 09/892,834, filed Jun. 27, 2001. In addition, numerous references disclose applying films to the paper wrapping materials of tobacco rods. See, for example, U.S. Pat. No. 1,909,924 to Schweitzer; U.S. Pat. No. 4,607,647 to Dashley; and U.S. Pat. No. 5,060,675 to Milford et al.

"Banded" paper wrapping materials that are used for cigarette manufacture possess segments defined by the composition, location, and properties of the various materials within those wrapping materials. Numerous references contain disclosures suggesting various banded wrapping material configurations. See, for example, U.S. Pat. No. 1,996,002 to Seaman; U.S. Pat. No. 2,013,508 to Seaman; U.S. Pat. No. 4,452,259 to Norman et al.; U.S. Pat. No. 5,417,228 to Baldwin et al.; U.S. Pat. No. 5,878,753 to Peterson et al.; U.S. Pat. No. 5,878,754 to Peterson et al.; and U.S. Pat. No. 6,198,537 to Bokelman et al.; and PCT WO 02/37991 and PCT WO 03/034845. Methods for manufacturing banded-type wrapping materials also have been disclosed. See, for example, U.S. Pat. No. 4,739,775 to Hampl, Jr. et al.; and U.S. Pat. No. 5,474,095 to Allen et al.; and PCT WO 02/44700 and PCT WO 02/055294. Some of those references describe banded papers having segments of paper, fibrous cellulosic material, or particulate material adhered to a paper web. See, U.S. Pat. No. 5,263,999 to Baldwin et al.; U.S. Pat. No. 5,417,228 to Baldwin et al.; and U.S. Pat. No. 5,450,863 to Collins et al.; and US Patent Application 2002/0092621 to Suzuki. Methods for manufacturing cigarettes having treated wrapping materials are set forth in U.S. Pat. No. 5,191,906 to Myracle, Jr. et al. and PCT WO 02/19848.

Additive materials can be applied to cigarette paper wrapping materials prior to the time that those wrapping materials are used for cigarette manufacture (i.e., in a so-called "off-line" fashion). For certain additive material components (e.g., ethylcellulose) that are applied off-line, it has been desirable for additive materials to be applied within non-aqueous solvents, such as iso-propyl acetate. See, for example, U.S. patent application Ser. No. 10/303,648, filed Nov. 25, 2002, which is incorporated herein by reference in its entirety. Additive materials also can be applied to cigarette paper wrapping materials during the time that those wrapping materials are used for cigarette manufacture (i.e., in a so-called "on-line" fashion). For certain additive material components (e.g., starch-based materials) that are applied on-line, it has been desirable for additive materials to be applied as water-based formulations. See, for example, U.S. patent application Ser. No. 10/324,837, filed Dec. 20, 2002, which is incorporated herein by reference in its entirety.

It would be highly desirable to provide cigarettes having predetermined patterns of additive materials (e.g., as bands) applied to the wrapping materials of those cigarettes. It would be particularly desirable to apply additive materials to a continuous web of a wrapping material of a tobacco rod of a cigarette in an efficient and effective manner during the manufacture of that tobacco rod. It also would be desirable to provide a method for minimizing or avoiding the use of solvents when applying additive material to the wrapping material; and it also would be desirable that such method operate effectively and be easily implemented within a conventional automated cigarette making machine of the type used to produce commercial quantities of cigarettes.

SUMMARY OF THE INVENTION

The present invention provides systems, materials, apparatus, and processes for manufacturing smoking articles and components of those smoking articles. Of particular interest are systems, apparatus, and methods for manufacturing cigarettes and wrapping materials used for manufacturing cigarettes. The present invention relates to manners and methods for transferring additive material to, and for retaining an additive material on, desired locations of a wrapping material (e.g., paper wrapping web) suitable for use for smoking article manufacture. The additive material can be applied to the wrapping material, and that wrapping material can be used at later times for the manufacture of smoking articles, such as cigarettes. Of particular interest is the application of additive material to wrapping material during manufacture of smoking articles using an automated cigarette making machine (e.g., a machine designed to produce a continuous cigarette rod). That is, it is of particular interest to apply and fix an additive material to a continuously advancing strip of a paper web within a region of an automated cigarette making machine using a component of such a machine during a cigarette manufacturing process.

Certain cigarette making apparatus and systems are characterized as single component systems. A continuous paper web is provided from a source (e.g., a bobbin) associated with a component of such a system (e.g., an unwind spindle assembly of that system). Tobacco filler and components for manufacturing a continuous cigarette rod from the tobacco filler and the continuous paper web are provided using the same component of that system (e.g., using an upwardly moving air stream coupled with a conveyor system and a garniture system, respectively). Such a cigarette making apparatus can be used to manufacture cigarettes from a continuous paper web that has been treated previously so that additive material (e.g., a coating formulation) has been applied to that paper web in an off-line fashion. Such a cigarette making apparatus also can be adapted to incorporate additive application apparatus that allow application of additive material to the continuous paper web in an on-line fashion.

Certain cigarette making apparatus and systems are characterized as multi-component systems, and in particular, two component systems. A continuous paper web is provided from a source that is the first component of such a system. Tobacco filler and components for manufacturing a continuous cigarette rod from the tobacco filler and the continuous paper web supplied by the first component are provided using the second component of that system. For preferred two component systems, the two components are independent, stand alone units. Such cigarette making apparatus can be adapted to incorporate additive application apparatus that provide ways to apply additive material to the continuous paper web in an on-line fashion.

Certain cigarette making apparatus and systems characterized as multi-component systems can be three component systems. A continuous paper web is provided from a source that is the first component of such a system. A continuous paper web is supplied by the first component of the system, and the first component can be adapted to incorporate an additive application apparatus in order that a coating formulation can be applied to the paper web. Tobacco filler and components for manufacturing a continuous cigarette rod from the tobacco filler is carried out using the second component of that system. The third component of the system is positioned between the first and second components, and can be used to apply coating formulation to the paper web that is supplied by the first component. The third component of the system also is adapted so that the continuous paper web passes from that third component to the second component of the system for cigarette manufacture. For preferred three component systems, the three components are independent, stand alone units. Such a cigarette making apparatus can be used to apply additive material to the continuous paper web in an on-line fashion.

Equipment and methods for applying additive material to a substrate, such as a continuous strip of paper web used as a wrapping material for cigarette manufacture, can be employed to apply additive material as a predetermined pattern to the paper web during operation of an automated cigarette making machine. The additive material can be applied to desired locations on the paper web using suitably positioned and controlled application devices that can apply the additive material in either a contact or non-contact manner. A contact application device is used to apply additive material to the paper web by transferring the additive material from a surface of that device that involves an action of physical touching of the some portion of that device with the paper web. Contact application devices include roller-type applicator devices, screen printing devices, and the like. Non-contact or non-impact application devices are used to apply additive material to the paper web by projecting additive material from one region to the paper web, such as is carried out using spraying techniques, electrostatic deposition techniques, or the like.

In one aspect, the present invention relates to equipment and methods for applying an additive material to a substrate, such as a paper web used as a wrapping material for cigarette manufacture. Those equipment and methods are particularly suitable in connection with the operation of an automated cigarette making machine, and for the purpose of applying a predetermined pattern of additive material to a continuous strip of paper web. As such, a suitable method for applying additive material to a web of wrapping material, most preferably in an on-line fashion, is provided.

An additive application apparatus that can be used to apply various types of additive materials having fluid forms to a continuously advancing substrate, such as a moving strip of paper web within a cigarette making machine, includes an outer housing and an inner gear. The outer housing is wheel-like, rotatable, and possesses an outer surface and an inner region. The inner region possesses (i) a reservoir for additive material, (ii) an inner face possessing gear teeth, and (iii) a passageway for passage of fluid from the inner region to the outer surface. The inner gear is a rotatable gear having gear teeth, and is located within the housing. The gear teeth of the housing and the inner gear are in a cooperating arrangement with one another; that is, the gear teeth of the housing and inner gear are meshed in an operative arrangement. Rotation of the inner gear relative to the housing is driven by a suitable power source. Rotation of the outer housing causes additive material within the reservoir to be transferred to trough regions between adjacent gear teeth of the inner region of the outer housing; that is, during rotation of the inner gear and outer housing, additive material is picked up on regions of the gear face of the outer housing from the reservoir. Rotation of the inner gear also is such that cooperation of the gear teeth of the rotatable gear and the housing cause additive material within trough regions between adjacent gear teeth of the outer housing to be forced through the passageways. That is, meshing of the gear teeth, and the configuration of meshed gear teeth in the region of each passageway, provide pumping action resulting in a forcing of the additive material carried within a trough region between adjacent gear teeth of the outer housing through those passageways. Such an apparatus is used in conjunction with a cigarette making machine in order to apply an additive material having a fluid form to a continuous strip of paper web that is arranged so as to move past that apparatus and contact a portion of the outer surface of housing. As such, additive material that is forced through the passageways of the rotating housing is applied at desired locations on the paper web. Preferred additive materials are applied as fluid coating formulations, including those that are virtually free of solvents or liquid carriers, and those that incorporate solvents or liquid carriers (e.g., aqueous liquids).

Another additive application apparatus includes a first roller adapted to receive the additive material (e.g., a coating formulation in liquid form) and a second roller adjacent to the first roller adapted to transfer the additive material from the first roller to a substrate (e.g., continuous advancing paper web). That apparatus also includes an additive material reservoir adjacent to the first roller for containing the additive material, and for supplying the additive material to the first roller. The additive material so supplied is positioned on the roll face of the first roller. For that apparatus, the roll faces of protruding dies extending from the second roller are in roll contact with the roll face of the first roller in one location; and the roll faces of the protruding dies of the second roller are in contact with the paper web in another location; thus allowing for a predetermined transfer of additive material in a two-step manner. That is, when the additive material is supplied to the roll face of the first roller, that additive material is transferred to the roll face of the protruding dies of the second roller; and when those dies possessing additive material on their roll faces contact the advancing paper web, the additive material is transferred from the roll face of the protruding dies of the second roller and applied to the advancing paper web.

Another additive application apparatus includes a first roller adapted to receive the additive material (e.g., a coating formulation in liquid form) and adapted to transfer the additive material to a substrate (e.g., a continuous advancing paper web). The paper web passes between the roll faces of the first roller and a second roller. That apparatus also includes an additive material reservoir adjacent to the first roller for containing the additive material, and for supplying the additive material to the first roller. The additive material so supplied is positioned on the roll face of the first roller. For that apparatus, the roll faces of protrusions or cams extending from the second roller are in roll contact with the roll face of the first roller, and the paper web passes between those roll faces such that both rollers are periodically in contact with the paper web; thus allowing for a predetermined transfer of additive material to the paper web from the roll face of the first roller when the roll faces of the protruding cams of the second roller cause the application of force to the paper web. That is, when the additive material is supplied to the roll face of the first roller, that additive material is transferred to predetermined locations on the surface of the paper web when the protruding cause of the second roller cause the paper web to be pushed against the roll face of the first roller.

An additive material, which can have the form of a coating formulation, is applied to a paper wrapping material for cigarette manufacture. Certain preferred coating formulations that are applied to wrapping materials (e.g., paper webs) incorporate relatively low levels of solvent or liquid carrier. Highly preferred coating formulations are essentially absent of solvent or liquid carrier, and most highly preferred coating formulations are virtually free of solvent or liquid carrier. Representative additive application techniques that are useful for applying generally liquid type coating formulations, or those types of formulations having the form of liquid dispersions, can involve the use of either contact types of printing devices (e.g., roll applicators) or non-contact digital printing types of application systems (e.g., ink jet type printing devices). Representative additive application techniques that are useful for applying coating formulations having generally solid forms can involve the use of non-contact printing types of application systems, such as electrostatic deposition type printing devices.

A wrapping material having coating formulation applied thereto can be subjected to processing steps that cause certain components of that formulation to form a type of film that is in intimate contact with that wrapping material. Typically, a fluid coating formulation incorporating an aqueous solvent or liquid carrier is applied to the paper wrapping material and is subjected to exposure conditions sufficient to evaporate that solvent or liquid carrier; and hence provide a dry film that is fixed in intimate contact with the paper. Typically, a coating formulation incorporating pre-polymer components (that typically have a fluid form) is applied to the paper wrapping material and is subjected to exposure to suitable radiation (e.g., ultraviolet or electron beam radiation), of a type and in a manner sufficient, to cause the pre-polymer components to undergo polymerization and hence solidify (e.g., be cured); and hence the resulting polymer forms a solid type of film that is fixed in intimate contact with the paper. Alternatively, a coating formulation incorporating finely divided solid form components is applied to the paper wrapping material (e.g., using electrostatic deposition techniques) and is subjected to further processing conditions (e.g., the application of heat followed by cooling) so as to cause certain components of that formulation to form a film which then solidifies; and hence the resulting polymeric film is fixed (e.g., fused) in intimate contact with the paper. Preferably, the coating formulation is applied to a continuous advancing strip of paper web, and the resulting coated paper web is used as wrapping material for smokable material (e.g., for the manufacture of a cigarette rod).

A registration system can control, in an on-line fashion, the location of the applied pattern (e.g., bands) of additive material on the wrapping material to the location of that pattern on the smoking article that is manufactured. The application of each band can be controlled relative to the speed at which the cigarette making machine is operated; and the location of each band can be timed to the operation of the additive applicator system and to the operation of the cutting device (e.g., flying knife) that cuts the continuous rod into cigarette rods of predetermined length. In addition, a servo control system incorporating a multi-axes programming unit can be used to facilitate adjustments resulting from changes in the length the paper web during travel between the applicator system and the cutting device.

An inspection system can be used to ensure the quality of the treated paper web and the smoking articles manufactured therefrom. The system possesses a detector (e.g., a capacitance detector) for detecting information regarding the electrical properties of the web, and for generating responsive electrical signals. The system further includes circuitry for processing those electrical signals to determine information relating to the presence of the pattern on the web, and for generating output signals. The system further includes computing logic for receiving the output signals and for determining whether those signals are representative of an unacceptable, irregular pattern on the web or of an acceptable, desired pattern. The system further includes computer logic for receiving information regarding irregular patterns and for signaling rejection of component materials (e.g., formed cigarettes) manufactured from wrapping materials possessing that have been determined to possess irregular patterns.

As will be appreciated by those of ordinary skill in the art, the present invention has wide utility in a number of applications as illustrated by the variety of features and advantages discussed herein. As will be realized by those of skill in the art, many different embodiments of the foregoing are possible. Additional uses, objects, advantages, and novel features of the present invention are set forth in the detailed description that follows and will become more apparent to those skilled in the art upon examination of the following disclosure or by practice of the invention.

DETAILED DESCRIPTION

Aspects and embodiments of the present invention include cigarette making machines and components thereof that are useful for manufacturing cigarettes, and in particular, that are useful for transferring and retaining additive material on a paper wrapping web in an efficient, effective and desired manner. FIGS. 1 through 18 illustrate those aspects and embodiments. Like components are given like numeric designations throughout the figures.

A conventional automated cigarette rod making machine useful in carrying out the present invention is of the type commercially available from Molins PLC or Hauni-Werke Korber & Co. KG. For example, cigarette rod making machines of the type known as Mk8 (commercially available from Molins PLC) or PROTOS (commercially available from Hauni-Werke Korber & Co. KG) can be employed, and can be suitably modified in accordance with the present invention. A description of a PROTOS cigarette making machine is provided in U.S. Pat. No. 4,474,190 to Brand, at col. 5, line 48 through col. 8, line 3, which is incorporated herein by reference. Types of equipment suitable for the manufacture of cigarettes also are set forth in U.S. Pat. No. 4,844,100 to Holznagel; U.S. Pat. No. 5,156,169 to Holmes et al. and U.S. Pat. No. 5,191,906 to Myracle, Jr. et al.; and PCT WO 02/19848. Designs of various components of cigarette making machines, and the various materials used to manufacture those components, will be readily apparent to those skilled in the art of cigarette making machinery design and operation.

Figure 1:
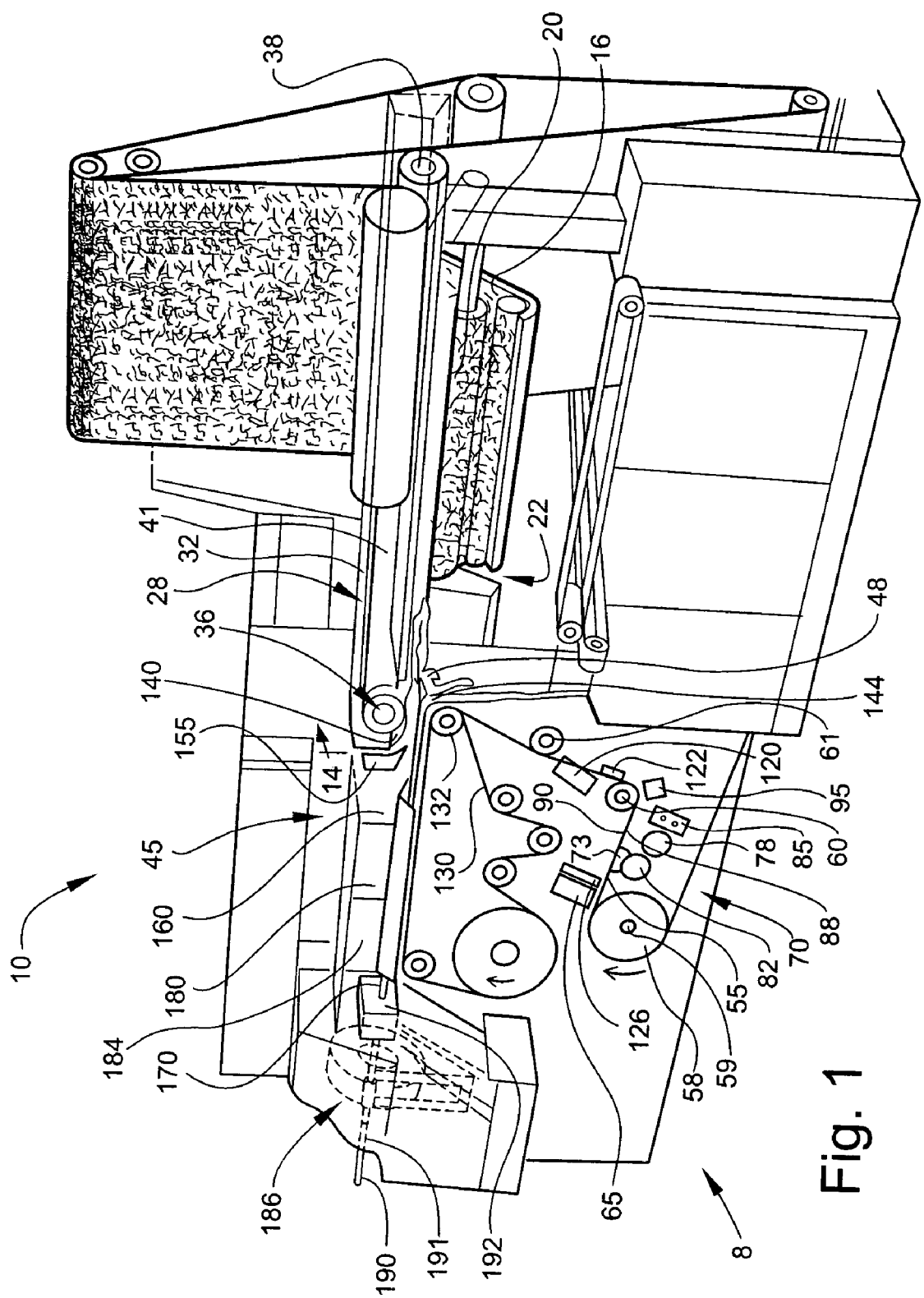
FIG. 1 is a schematic illustration of a portion of a cigarette making machine showing a source of wrapping material, a source of tobacco filler and a garniture region that is used to produce a continuous cigarette rod.

Referring to FIG. 1, a one-component cigarette making machine assembly 8 includes cigarette making machine 10. The cigarette making machine 10 includes a chimney region 16 that provides a source of tobacco filler 20, or other smoking material. The tobacco filler 20 is provided continuously within an upwardly moving air stream (shown by arrow 22), and is blown onto the lower outside surface of a continuous a conveyor system 28. The conveyor system 28 includes an endless, porous, formable conveyor belt 32 that is supported and driven at each end by left roller 36 and right roller 38. A low pressure region or suction chamber 41 within the foraminous belt 32 acts to attract and retain tobacco filler 20 against the bottom of the conveyor system 28. As such, tobacco filler 20 located below the conveyor belt 32 is pulled upward toward that belt, thereby forming the tobacco filler into a tobacco stream or cake on the lower surface of that belt. The conveyor belt 32 thus conveys the stream of tobacco filler 20 to the left; toward a garniture section 45 of the cigarette making machine 10. An ecreteur or trimmer disc assembly 48 assists in providing transfer of the appropriate amount of tobacco filler 20 to the garniture region 45. Descriptions of the components and operation of several types of chimneys, tobacco filler supply equipment and suction conveyor systems are set forth in U.S. Pat. No. 3,288,147 to Molins et al.; U.S. Pat. No. 4,574,816 to Rudszinat; U.S. Pat. No. 4,736,754 to Heitmann et al. U.S. Pat. No. 4,878,506 to Pinck et al.; U.S. Pat. No. 5,060,665 to Heitmann; U.S. Pat. No. 5,012,823 to Keritsis et al. and U.S. Pat. No. 6,360,751 to Fagg et al.

Meanwhile, a continuous web of paper wrapping material 55 is supplied from a bobbin 58. The bobbin is supported and rotated using an unwind spindle assembly 59.

The paper web 55 is routed on a desired path using a series of idler rollers and guideposts (shown as rollers 60, 61), through an optional printing assembly device 65, and ultimately through the garniture region 45. Typically, product indicia are printed onto the paper web 55 at predetermined regions thereof using printing assembly 65. Printing assemblies for printing product indicia (e.g., logos in gold colored print) are component parts of commercially available machines, and the selection and operation thereof will be readily apparent to those skilled in the art of cigarette making machine design and operation. Techniques for registering the location of printed product indicia on the ultimate cigarette product (e.g., on the paper wrapper of a cigarette rod in a location immediately adjacent to the tipping material of that product) are known to those skilled in the art of automated cigarette manufacture.

The paper web 55 also is routed through an applicator system 70 prior to the time that the web reaches the garniture section 45. The applicator system 70 is employed to apply a desired pattern of additive material 73 to the paper web 55. A representative pattern is provided by applying spaced bands that are aligned transversely to the longitudinal axis of the paper web 55. A representative additive material 73 is a coating formulation having a fluid form; and representative coating formulations that have fluid forms can have the form of liquids, syrups, pastes, emulsions, or dispersions or slurries of solid materials within any of the foregoing.

Optionally, the paper web 55 can be routed through a heating/cooling control unit (not shown) immediately before the paper web passes through the applicator system 70. A suitable heating/cooling unit is a heating unit having the form of an infrared heater (not shown), and that heater can be operated at any desired temperature; for example, at a temperature of about 180° C. to about 220° C. The heating/cooling unit can be used to provide the paper web 55 at a desired temperature (e.g., the paper web can be pre-heated) immediately prior to application of the additive material formulation 73 to the surface of that paper web.

A representative additive applicator 70 is a contact-type applicator that comprises a pick-up roller 78 and a transfer roller 82. The pick-up roller 78 includes a plurality of patterned (e.g., evenly spaced apart) pockets on its roll face (not shown) into which a predetermined amount of additive is deposited. The positioning, shape and number of pockets can vary, and typically depends upon the pattern that is desired to be applied to the paper web 55 (e.g., spaced apart pockets can be used to place spaced bands of additive material 73 on the web). For example, in one embodiment of a transfer roller 82, seven pockets each having the form of transversely aligned bands each placed about 46 mm apart. The shape, including depth, of each pocket can determine the amount of additive material that can be carried by that pocket, and hence applied to the paper web 55.

The additive material 73 typically is provided from a supply source reservoir (not shown) through tubing or other suitable supply means (not shown) to a port or supply region 85 near the head (i.e., infeed region) of the pick-up roller 78. The additive material 73 is fed from the head of the pick-up roller into the pockets of the pick-up roller.

If desired, the supply region and the region of the pick-up roller 78, and other relevant regions of the additive applicator 70, can be supplied with heat control system using a suitable heating or cooling device (not shown). As such, a heating device can provide a heated region that can be used to assist in maintaining a solid or very viscous coating formulation in a melted form or fluid form (e.g. the form of a liquid, a syrup, a paste, an emulsion, or a dispersion or slurry of solid materials within any of the foregoing). A representative heating device is an electrical resistance heating unit controlled by a rheostat; and the heating device can be appropriately fashioned so as to transfer the desired amount of heat to the various components of the additive applicator 70. As such, sufficient heat can be provided to provide coating formulation at a temperature above ambient temperature, and for example, at a temperature within the range of about 120° F. to about 180° F. If desired, heat insulation material (not shown) can be positioned in adjacent regions of the cigarette making machine 10 in order that transfer of heat to other regions of that machine is minimized or prevented.

Operation of the pick-up roller 78 and the transfer roller 82 are timed and controlled relative to the speed of operation of the cigarette making machine 10. As the pick-up roller 78 and the transfer roller 82 are engaged in roll contact, and rotate in contact with each other in a controlled manner, the additive material 73 is transferred from the pockets of the pick-up roller 78 onto predetermined regions of the roll face surface (not shown) of the transfer roller 82. The additive material 73 is transferred onto the transfer roller 82 surface in essentially the same pattern as that of the spaced apart pockets on the pick-up roller 78 (i.e., the pattern applied to the paper web is dictated by the design of the pattern of the roll face of the pick-up roller 78).

Representative types of contact-type applicators are described in greater detail hereinafter with reference to FIGS. 5 through 17. Those types of applicators can be suitably incorporated into the cigarette making machine assembly 8.

The paper web 55 comprises two major surfaces, an inside surface 88 and an outside surface 90. The stream of tobacco filler 20 ultimately is deposited upon the inside surface 88 of the paper web 55, and the additive material 73 most preferably also is applied to the inside surface 88 of that web. As the paper web 55 travels across the surface of the rotating transfer roller 82, the additive material 73 on the surface of the transfer roller 82 is transferred to the inside surface 88 of the advancing paper web 55 at locations corresponding to the location of the pockets located on the roll face of the pick-up roller 78.

After the additive material 73 has been applied to the paper web 55, the web can be exposed to a sensor or detector 95 for a measurement system, such as an inspection system (not shown). Preferably, the detector 95 is mounted on the frame of the cigarette making machine 10 and is positioned so as to receive information concerning the paper web 55 immediately after additive material 73 has been applied to that paper web. Typically, the detector 95 is a component of certain registration systems and inspection systems. Types of sensors, detectors and inspection system components and description of inspection system technologies and operation thereof are set forth in U.S. patent application Ser. No. 10/324,837, filed Dec. 20, 2002. Alternative sensors, detectors and inspection system components and description of inspection system technologies and methods of operation are set forth in U.S. Pat. No. 4,845,374 to White et al.; U.S. Pat. No. 5,966,218 to Bokelman et al.; U.S. Pat. No. 6,020,969 to Struckhoff et al. and U.S. Pat. No. 6,198,537 to Bokelman et al.; which are incorporated herein by reference.

A representative inspection system employs a capacitance detector positioned downstream from the applicator system 70. A preferred detector is a non-contact detector that can sense changes in the dielectric field of the paper web resulting from the application of additive material to certain regions of that paper web. A representative detector is a Hauni Loose End Detector, Part Number 2942925CD001500000 that is available from Hauni-Werke Korber & Co. KG. The detector is combined with appropriate electronics for signal processing. That is, the detector generates an electrical signal, and appropriate electronic circuitry is used to compare that signal relative to a programmed threshold level. Such a signal allows for graphical display of the profile of applied additive material along the length of the paper web. When application of a band of additive material does not occur as desired (i.e., a band is missing on the paper web, or the amount of additive material that is applied is not the desired amount) a signal is generated. As such, rejection of poor quality rods, and adjustments to the overall operation of the cigarette making machine, can occur. In addition, an output signal from such a measurement system can be used in a feedback control system to maintain the desired level of additive material to the paper web and/or to maintain the desired rate of feed of coating formulation to the applicator system.

Additionally, after the additive material 73 has been applied to the paper web 55, the web can be passed through an optional heating/cooling control device 120. The control device 120 can be used to alter the heat to which the paper web 55 and additive material 73 is subjected (e.g., by raising or lowering temperature). For example, the heating/cooling control device can be a heating or drying device adapted to assist in the removal of solvent (e.g., moisture) from the additive material 73 that has been applied to the paper web 55. Alternatively, for example, the heating/cooling control device can be a cooling device adapted to assist in the hardening melted additive material 73 that has been applied to the paper web 55 using a heated additive applicator system 70. Typically, the heating/cooling control device 120 has a tunnel-type configuration through which the paper web 55 is passed; and during the time that the paper web is present within that tunnel region, the paper web is subjected to heating supplied by a convection or radiant heating device, or cooling supplied by a refrigerant-type, solid carbon dioxide-type or liquid nitrogen-type cooling device.

Typically, the region of the cigarette making machine 10 where the heating/cooling device 120 is located does not afford sufficient room to provide a heating/cooling control device 120 of any appreciable size. For this reason, it is desirable to locate such an optional heating/cooling device 120 in a location that is offset from the cigarette making machine. For example, appropriately located and positioned turning bars (not shown) can be used to direct the paper web 55 outward (and optionally upward or downward) from the front face of the cigarette making machine 10, and the paper web 55 can be routed through the heating/cooling device 120 that can be supported but frame or other suitable support means (not shown), and appropriately located and positioned turning bars (not shown) can be used to direct the paper web 55 so subjected to heating or cooling back to the cigarette making machine 10 for continued use in the cigarette manufacturing process.

The paper web 55 having certain types of additive materials 73 applied thereto is subjected to exposure to appropriate radiation. That is, coating formulations incorporating pre-polymer components can be exposed to suitable radiation of a type and in a manner sufficient to cause the pre-polymer components to undergo polymerization reactions and hence solidify. At least one radiation source 122 is positioned so as to subject the paper web 55 having additive material applied thereto to exposure to radiation. Typical radiation sources can provide radiation, for example, in the ultraviolet (uv) range or radiation in the form of electron beam radiation (i.e., gamma radiation). For paper web having pre-polymer components (not shown) applied thereto, heating/cooling control device 120 also can be replaced with a source of radiation, in order to provide for exposure of the coating formulation on the paper web to radiation that causes polymerization (and hence solidification) of the additive material. A reflective shield or cover (not shown) can be positioned over that radiation source 122 in order to ensure that radiation is directed toward the coating formulation positioned on the paper web, and in order to minimize or prevent emission of radiation to undesired locations within the environment near the cigarette making machine assembly 8. If desired, the atmosphere within the shield or cover (not shown) can be controlled (e.g., by flushing the region with dry nitrogen gas).

Optionally, though not preferably, the indicia printing assembly 65 can be modified in order to print formulations other than printing inks and intended for purposes other than product indicia. For example, the printing assembly 65 can be adapted to apply coating formulations having intended purposes other than product indicia. For example, fluid coating formulations (e.g., that incorporate pre-polymer components and are essentially absent of solvent, or that are water-based), can be applied to either the inside surface or outside surface of the paper web 55, using a suitably adapted printing assembly 65. Such coating formulations can be supplied using a pump or other suitable means (not shown) from a reservoir (not shown) through a tube or other suitable supply means (not shown). The paper web 55 having water-based additive material (not shown) applied thereto is subjected to exposure to heat or microwave radiation using heat source 126, in order to dry the coating formulation and fix additive material to the desired location on the paper web. For paper web having pre-polymer components (not shown) applied thereto, the heat source 126 is replaced with a source of suitable radiation, in order to provide for exposure of the coating formulation on the paper web to radiation that causes solidification of the additive material. A reflective shield or cover (not shown) can be positioned over that radiation source 126. The previously described heating/cooling control device 120 and/or the radiation source 122 also can be employed.

The paper web 55 travels toward the garniture region 45 of the cigarette making machine 10. The garniture region 45 includes an endless formable garniture conveyor belt 130. That garniture conveyor belt 130 conveys the paper web 55 around a roller 132, underneath a finger rail assembly 140, and advances that paper web over and through a garniture entrance cone 144. The entrance cone 144 also extends beyond (e.g., downstream from) the finger rail assembly 140. The right end of the garniture conveyor belt 130 is positioned adjacent to and beneath the left end of the suction conveyor system 28, in order that the stream of tobacco filler 20 carried by conveyor belt 32 is deposited on the paper web 55 in that region. The finger rail assembly 140 and garniture entrance cone 144 combine to provide a way to guide movement of an advancing tobacco filler cake 20 from the suction conveyor 32 to the garniture region 45. Selection and use of finger rail assemblies and garniture entrance cones will be readily apparent to those skilled in the art of cigarette manufacture. Alternatively, it is possible to employ those finger rail assemblies and/or modified garniture entrance cones that are set forth in U.S. patent application Ser. No. 10/324,837, filed Dec. 20, 2002.

As the conveyor belt 32 and tobacco filler cake 20 travel within the finger rail assembly 140, vacuum suction applied to the inside region of the conveyor belt 32 is released. As a result, tobacco filler 20 is released from contact with the conveyor belt 32, falls downwardly from that conveyor belt through a longitudinally extending track (not shown) within the finger rail assembly 140, and is deposited onto the advancing paper web 55 at the left side of the garniture region 45 immediately below the finger rail assembly. In conjunction with the release of vacuum from the conveyor belt 32, removal of tobacco filler 20 from the conveyor belt 32 and deposit of that tobacco filler onto the moving paper web 55 is facilitated through the use of a shoe or scrape 155 or other suitable means, that is used to peel or otherwise physically remove advancing tobacco filler 20 off of the outer surface of the extreme left end of the conveyor belt 32.

The garniture section 45 includes a tongue 160 adjacent to the distal end of the finger rail assembly 140 and above the top surface of the garniture conveyor belt 130. The tongue 160 provides a commencement of constriction of the tobacco filler 20 that has been deposited on the paper web 55. Meanwhile, the garniture conveyor belt 130 begins to form that tobacco filler stream and paper web 55 into a continuous rod 170. The tongue 160 extends to a point where the paper web 55 is secured around that stream of tobacco filler. The tongue 160 and the garniture conveyor belt 130 define a passage which progressively decreases in cross-section in the direction of movement of the tobacco filler stream, such that the deposited tobacco filler stream progressively forms a substantially circular cross-section that is desired for the ultimate finished continuous cigarette rod 170.

The garniture section 45 also includes a folding mechanism 180 on each side of the garniture conveyor belt 130 located adjacent to, and downstream from, the tongue 160. The folding mechanism 180 is aligned in the direction of filler stream movement, further compresses the tobacco filler 20 within the rod that is being formed, and folds the paper web 55 around the advancing components of the forming continuous cigarette rod 170. A fashioned continuous tobacco rod that exits the tongue 160 and folding mechanism 180 then passes through an adhesive applicator 184, in order that adhesive is applied to the exposed length or lap seam region of the paper web 55 (i.e., side seam adhesive is applied to the paper web). That is, the exposed length of paper web 55 then is lapped onto itself, and the adhesive is set that region in order to secure the paper web around the tobacco filler 20, thereby forming the continuous cigarette rod 170. The continuous rod 170 passes through a cutting or subdivision mechanism 186 and this subdivided into a plurality of rods 190, 191 each of the desired length. The selection and operation of suitable subdivision mechanisms 186, and the components thereof, will be readily apparent to those skilled in the art of cigarette manufacture. For example, the cutting speed of knife (not shown) within a ledger or other suitable guide 192 is controlled to correspond to the speed that the cigarette making machine 10 is operated. That is, the location that an angled flying knife (not shown) cuts the continuous rod 170 into a plurality of rods 190, 191, each of essentially equal length, is controlled by controlling the speed of operation of that knife relative to speed that the cigarette making machine supplies the continuous rod.

Typically, operation of the conveyor belt 32, garniture belt 130 and flying knife (not shown) within ledger 192 all are mechanically linked to one another by belts or other suitable means, and are driven off of the same power source (not shown). For example, for a cigarette making machine, such as a PROTOS 80 that is commercially available from Hauni-Werke Korber & Co. KG, the main motor of that cigarette making machine is used to drive operation of the conveyor belt 32, the garniture belt 130 and the flying knife. An alternate design of such a type of cigarette making machine can be provided by providing power to the flying knife from one power source, such as the motor of a servo system (not shown); and the power to the garniture belt 130 and the conveyor belt 32 can be provided from a second power source, such as the motor of a second servo system (not shown). Typically, power for operation of the garniture belt 130 is provided by suitable mechanical connection to the second power source, and the power for operation of the conveyor belt 32 is provided by suitable linkage to the operation of the garniture belt by suitably adapted timing belt systems, or other suitable means (not shown). Encoders (not shown) mechanically coupled to the first and second servo systems (not shown) provide information to a processing unit (not shown) regarding cigarette manufacturing speed, and garniture speed, respectively. The detector 95 (e.g., such as a non contact ultrasonic detector) also can be adapted to provide information regarding location of additive material 73 that has been applied to the paper web 55 to the same processing unit (not shown). Using the processing unit, the positioning of applied pattern on the paper web 55 can be compared to a specified positioning of the pattern, and the processing unit can be used to alter the speed of operation of the two servo systems relative to one another to bring cigarette rods 190, 191 that are out of specification back to within specification. For example, the speed of operation of the flying knife can be increased and/or the speed of operation of the garniture belt can be decreased until cigarette rods are determined to be back within the desired range of tolerance or within specification.

Servo control systems and the operation thereof will be readily apparent to those skilled in the art of cigarette making machine design and operation. Representative servo systems are readily available as Single Axis Controller P/N: DKC03.3-040-7FW/FWA-EDODR3-FGP-04VRS-MS, Motor P/N: MKD025-144-KP1-KN SERVO MOTOR from Indramat; Ultra 5000 Single Axis P/N: 2098-IPD-010 Motor P/N: Y-2012-1-H00AA from Allen Bradly; and Servo P/N :SC752A-001-01 Motor P/N: R34-GENA-HS-NG-NV-00 from Pacific Scientific.

Information concerning the position and speed of operation of the flying knife can be fed to a servo control system that incorporates a multi-axes programming unit. Such a servo system is available as PPC-R02-2N-N-N1-V2-NN-FW from Indramat. As such, the servo system can be used to observe and control the transfer roller to a known position relative to the flying knife. Preferred cigarette making machines, such as PROTOS machines, can possess an automatic servo-driven print displacement control systems as well as servo-driven paper tension control systems. Thus, the distance of travel of the paper web between the applicator system and the continuous cigarette rod cutoff knife can be changed; for example, when adjustments are made to correct for print displacement relative to the cut in the continuous rod or to control paper tension to avoid paper breakage. Such changes in distance of travel of the paper web can vary; and for example, the changes of as much as 35 mm in paper travel can be provided for adjustments for print displacement, and changes of as much as 20 mm in paper travel can be provided for paper tension adjustments. Thus, when any adjustments are made that result in a change in the length of the path of travel of the paper web from the applicator roller to the flying knife, the multi-axes control system can be used to make the corresponding adjustments to the speed of operation of the applicator roller. Most preferably, adjustments to the speed of operation of the applicator roller are provided at times when the applicator roller is not in the process of applying additive material to the paper web. As such, adjustments programmed to occur between the application of successive bands result in avoiding smearing of additive material on the paper web and in avoiding paper breakage. To minimize the number of reject cigarettes, adjustments can be made on a single rod resulting in only a single rejected rod, or adjustments can be made as small changes spread out over a number of cigarette rods until the application system in adjusted to be back to providing cigarettes having patterns applied at the desired locations.

Those cigarette rods 190, 191 then most preferably have filter elements (not shown) attached thereto, using known components, techniques and equipment (not shown). For example, the cigarette making machine 10 can be suitably coupled to filter tipping machine (not shown), such as a machine available as a MAX, MAX S or MAX 80 Hauni-Werke Korber & Co. KG. See, also, for example, U.S. Pat. No. 3,308,600 to Erdmann et al. and U.S. Pat. No. 4,280,187 to Reuland et al.

The cigarette making machine assembly and configuration described with reference to FIG. 1 are representative of a single cigarette making machine that provides both the tobacco filler and the patterned paper web to the garniture region of that machine. Cigarette making machine assemblies and configurations representative of those that provide the tobacco filler to the garniture region from one location, and the patterned paper web to the garniture region from another location (i.e., multi-component systems), are described with reference to FIGS. 2, 3 and 4.

Figure 2:
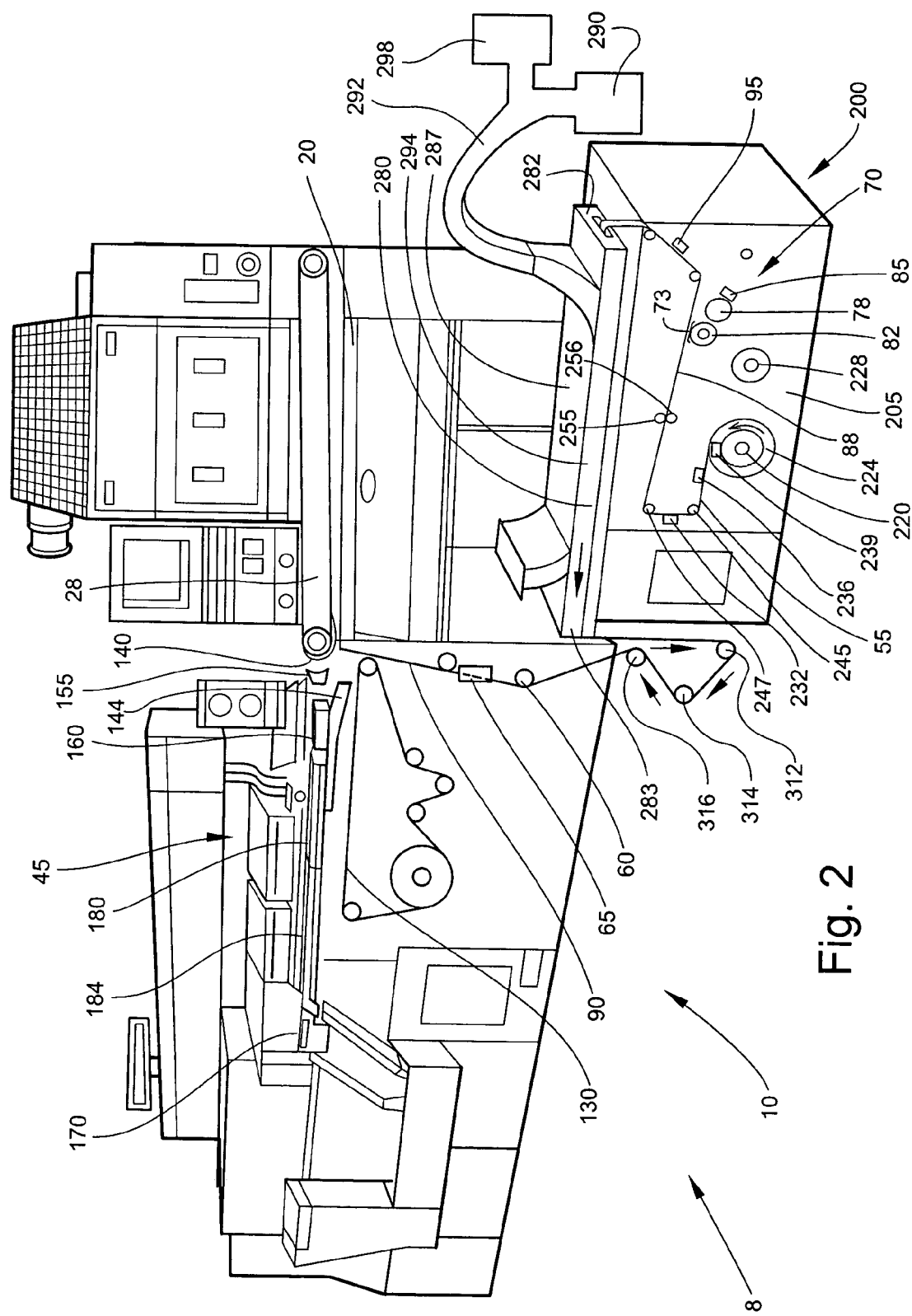
FIG. 2 is a schematic illustration of a cigarette making machine assembly including the combination of a wrapping material supply system and a cigarette making machine.

Referring to FIG. 2, there is shown a two-component automated cigarette making machine assembly 8 that is constructed by coupling a wrapping material supply machine 200 (e.g., a first component) with a cigarette making machine 10 (e.g., a second component).

A suitable wrapping material supply machine 200 can be provided by appropriately modifying a web supply unit available as SE 80 from Hauni-Werke Korber & Co. KG. See, for example, U.S. Pat. No. 5,156,169 to Holmes et al., which is incorporated herein by reference. Other suitable unwind units, such those having the types of components set forth in U.S. Pat. No. 5,966,218 to Bokelman et al., also can be employed. The supply machine 200 most preferably is a free-standing machine that is capable of providing a patterned web of wrapping material 55 to a conventional (or suitably modified) cigarette making machine 10. The supply machine 200 includes a frame 205 that supports at least one unwind spindle assembly 220 onto which a first bobbin 224 is mounted. Preferably, the supply machine 200 includes a second unwind spindle assembly 228 for a second bobbin (not shown), and a web splicing mechanism 232.

The paper web 55 is threaded through a tension sensor 236, which in conjunction with a braking component 239 connected to the shaft of the unwind spindle assembly, maintains a desired amount of tension on the paper web 55 as it is transferred from the bobbin 224.

In operation, a continuous paper web 55 supplied from a bobbin 58 is routed through a path defined by a series of idler rollers 245, 247, 248, 249, 250 and guideposts 255, 256. The paper web 55 also is routed through an applicator system 70 that is used to apply a desired pattern of additive material 73 to the paper web 55. Representative additive materials 73 are coating formulations that have fluid forms can have the form of liquids, syrups, pastes, emulsions, or dispersions or slurries of solid materials within any of the foregoing. Optionally, though not preferably, the paper web can be routed through a heating/cooling control unit (not shown) immediately before the paper web passes through the applicator system 70.

A representative additive applicator 70 comprises a pick-up roller 78 and a transfer roller 82, and can be operated in essentially the same manner as described previously with reference to FIG. 1. The additive material 73 typically is provided from a supply source reservoir (not shown) through tubing (e.g., Tygon-type tubing) or other suitable supply means (not shown) to a port or supply region 85 near the head (i.e., infeed region) of the pick-up roller 78. If desired the supply region and the region of the pick-up roller can be supplied with heat using a suitable heating device (not shown). The additive material 73 is fed from the head of the pick-up roller into the pockets of the pick-up roller. As the pick-up roller 78 and the transfer roller 82 are engaged in roll contact, and rotate in contact with each other, the additive material 73 is transferred from the pockets of the pick-up roller 78 onto predetermined regions of the roll face surface (not shown) of the transfer roller 82. The additive material 73 is transferred onto the transfer roller 82 surface in essentially the same pattern as that of the spaced apart pockets on the pick-up roller 78 (i.e., the pattern on the paper web is defined by that pattern on the roll face of the pick-up roller). Representative types of additive application systems are described in greater detail hereinafter with reference to FIGS. 5 through 17. The additive material 73 most preferably also is applied to predetermined locations on the inside surface 88 of the paper web 55.

After the additive material 73 has been applied to the paper web 55, the web can be exposed to a sensor or detector 95 for a registration system and/or an inspection system (not shown). Preferably, the detector 95 is positioned so as to receive information concerning the paper web 55 immediately after additive material 73 has been applied to that paper web. Typically, the detector 95 is used in conjunction with the certain registration systems and inspection systems, and in conjunction with suitable marker components that are incorporated as components of the additive material 73. Representative types of sensors, detectors and inspection system components and description of inspection system technologies and operation thereof have been set forth hereinbefore with reference to FIG. 1. Components associated with registration and inspection also can be positioned elsewhere within the machine assembly 8. The exact location of such components can depend upon operational factors, and the positioning such components can be a matter of design choice.

Additionally, after the additive material 73 has been applied to the paper web 55 (i.e., downstream from the applicator apparatus 70), the web can be passed through an optional, heating/cooling control device 280, or other suitable means for controlling heat to which the paper web is subjected. The control device 280 can be used to alter the heat to which the paper web 55 and additive material is subjected (e.g., by raising or lowering the temperature). For example, the control device can be a heating or drying device adapted to assist in the removal of solvent (e.g., moisture) from the additive material 73 that has been applied to the paper web 55. Alternatively, for example, the heating/cooling control device can be a cooling device adapted to assist in the hardening melted additive material 73 that has been applied to the paper web 55 using a heated additive applicator system 70. Typically, the heating/cooling control device 280 has a tunnel-type configuration through which the paper web 55 is passed (through an inlet end 282 and out an outlet end 283); and during the time that the paper web is present within that tunnel region, the paper web is subjected to heating supplied using infrared convection or radiant heating devices, or cooling supplied using refrigerant-type, solid carbon dioxide-type or liquid nitrogen-type cooling devices.

The size of the heating/cooling device 280 can vary, particularly because that device is positioned and supported by a component 200 that is physically separated from, and spaced from, the cigarette making machine 10. That is, there is provided sufficient room to subject the paper web 55 to treatment using the heating/cooling device 280. Exemplary heating/cooling devices 280 have lengths of about 2 feet to about 10 feet, with lengths of about 3 feet to about 8 feet being typical, and lengths of about 4 feet to about 7 feet being desirable. The distance that the paper web 55 travels through the heating/cooling device 280 (i.e., the length of travel through that device) can vary. For example, the paper web 55 can be routed back and forth within the heating/cooling device 280 using a suitably adapted roller system configuration (not shown).

The heating/cooling control device 280 can be used to provide radiant heating to the paper web 55, and hence evaporate solvent (e.g., water) present in those coating formulations that are water-based. An exemplary heating and drying system 280 is available as IMS Model No. P24N002KA02 2 kW, 2450 MHz Linear Drying System from Industrial Microwave Systems, Inc. Representative types of radiant drying systems are set forth in U.S. Pat. No. 5,958,275 to Joines et al.; U.S. Pat. No. 5,998,774 to Joines et al.; U.S. Pat. No. 6,075,232 to Joines et al.; U.S. Pat. No. 6,087,642 to Joines et al.; U.S. Pat. No. 6,246,037 to Drozd et al. and U.S. Pat. No. 6,259,077 to Drozd et al.; all of which are incorporated herein by reference. Such types of radiant drying systems can be manufactured from materials such aluminum and aluminum alloys. See, also, U.S. Pat. No. 5,563,644 to Isganitis et al., which is incorporated herein by reference.

For the evaporation of solvent, radiant-type drying systems are preferred, because typical infrared-type drying systems require relatively long residence times to adequately remove effective quantities of solvent or liquid carrier (e.g., water) from the paper web 55. For fast moving paper webs 55 running at nominal cigarette making machine speeds, the application of sufficient heat demands the need for relatively long infrared-type drying apparatus. Additionally, sufficient heat from infrared-type drying systems requires the use of relatively high temperatures; thus providing the propensity for scorching and browning of certain areas of the paper web, and the risk of fire. For example, for a conventional cigarette making machine operating so as to produce about 8,000 cigarette rods per minute, and having bands of additive material applied to the advancing paper web so that about 1 mg of water is applied to each individual cigarette rod, about 350 to about 700 watts per hour is effectively required to remove that water from the paper web.

A microwave-type drying system is desirable because effectively high amounts of heat can be employed in controlled manners. An exemplary system is one that employs planar wave guide of about 36 inches in length, an internal width of about 1.6 inches, and an internal depth of about 3.7 inches. More preferred systems are those that employ planar wave guides of either about 54 inches, about 75 inches or about 96 inches of total length. Preferred wave guides are of dimension to allow passage of only lowest order (i.e., $TE_{10}$) or single mode radiation. An exemplary system also can possess inlet and outlet ends 282, 283 that both have widths of about 1.75 inch and heights of about 0.37 inch. Within the inner region of the drying system, immediately within each end of the inlet and outlet ends 282, 283, are positioned choke flanges, pin chokes (not shown) or other means to assist in the prevention of escape or leakage of radiation from the system; and those flanges or pins typically extent about 3 inches into the system from each respective end.

Microwave-type drying systems can apply heat to desirable locations on the paper web 55 where heat is needed (i.e., in the printed regions of the paper web). In one preferred radiant-type drying system, microwave energy is launched at one end of a waveguide and is reflected at the other end of that waveguide, resulting in the paper web experiencing radiant energy for effectively an extended period. Precise drying control can be achieved by attenuating the microwave energy and/or the path of the paper web within the microwave drying system. Such radiant-type drying systems thus can be used to evaporate the solvent or liquid carrier (e.g., water) of the additive material formulations by applying the microwave energy uniformly throughout the patterned region (e.g., to the bands of applied additive material coating formulation).

The controls for the radiant-type dryer (e.g., the microwave control and associated safety systems) most preferably are integrated into the programmable logic controller-based (PLC-based) control system (not shown) for supervisory control. The PLC-based system (not shown) enables radiant energy production, and disables the radiant energy production when radiant energy is not needed for drying (e.g., such as when the production system is stopped or paper web experiences a break). The top and bottom regions of the wave guide of the drying system in portions of the drying region can be perforated with a plurality of perforations (not shown) to allow for the removal of moisture, without allowing radiation (e.g., microwave radiation) from escaping into the surroundings. A suitably designed shroud 287 and an electrically driven fan (not shown) can be placed over the top of those perforations in order to remove the evaporated moisture away from the paper web and remove dust from the system. If desired, the fan (not shown) also can be under the control of the PLC-based system, and as such, only operate during operation of the cigarette manufacturing system 8.

For a radiant heating system 280 for the embodiment shown in FIG. 2, radiant microwave energy is supplied by a generator 290 for electromagnetic radiation, which is located one end of that system. Typically, higher power generators are used to produce heat to remove greater amounts of moisture; and generators producing up to about 10 kW of power, and usually up to about 6 kW of power, are suitable for most applications. Radiation produced by the generator is passed through appropriate wave guides and circulators (not shown). The microwave radiation passes through a curved wave guide 292 and through a drying region 294 for the paper web 55. A typical drying region for a microwave drying system has a length of about 30 inches. As such, the radiation supplied to the drying system and the paper web 55 move in the same overall direction through that drying system. Radiation that travels through the drying region 294 is reflected by suitable reflector 296 (i.e., a short plate or reflector plate) at the other end of the drying system. That radiation is reflected back through the drying region, back through the channel at the other end of the heating system, and as such, the reflected radiation and the paper web 55 move in an overall counter current manner relative to one another. Any remaining radiation is appropriately redirected through appropriately positioned wave guides and circulators to a dry air-cooled load 298, or other suitable radiation dissipation means. As such, the radiation is converted to heat, and the resulting heat can be removed using electrical fans (not shown) or other suitable means.

In a preferred embodiment (not shown), the positioning of the heating device 280 shown in FIG. 2 is reversed (e.g., the heating device is rotated 180°) such that the paper web 55 enters at the end of the heating device possessing the reflector 296 and exits at the end through which radiation enters the channel 292 from the generator 290. As such, radiation entering the drying system from the source of radiation and the paper web 55 travel in an overall counter current manner relative to one another. It also is possible to position two or more of those types of heating devices in series (not shown), so as to provide a manner for subjecting the paper web 55 to prolonged exposure to radiation.

The paper web 55 having certain types of additive materials 73 applied thereto is subjected to exposure to radiation capable of causing components of the additive materials to undergo polymerization. Typical types of radiation that are suitable for such a purpose include ultraviolet (uv) and electron beam radiation. That is, coating formulations incorporating pre-polymer components can be exposed to suitable radiation of a type and in a manner sufficient to cause the pre-polymer components to undergo polymerization reactions and hence solidify. For the treatment of those types of coating formulations applied thereto, the heating/cooling control device 280 is replaced with a source of radiation, in order to provide for exposure of the coating formulation on the paper web to radiation that causes solidification of the additive material. A suitably designed reflective shield, shroud or cover 287 can be positioned over that radiation source 280 in order to ensure that radiation is directed toward the coating formulation positioned on the paper web, and in order to minimize or prevent emission of radiation to undesired locations within the environment near the cigarette making machine assembly 8.

The additive applicator 70 used in conjunction with the supply machine 200 most preferably is driven by a servo drive control system (not shown) or other suitable control means. As such, the positioning of the additive material on the paper web 55 can be controlled relative to the location that the continuous cigarette rod 170 that is manufactured using the second component 10 is cut into predetermined lengths, and hence, registration of the applied pattern of additive material on a finished cigarette can be achieved. That is, the automated cutting knife (not shown) for subdividing the continuous rod into predetermined lengths can be controlled relative to those components used to apply additive material to the paper web that is used to provide that continuous rod.

The paper web 55 exits the temperature control device 280 and is advanced to the cigarette making machine 10. Direction of the paper web 55 is provided by suitably aligned series of idler rollers 312, 314, 316 (or guideposts, turning bars, or other suitable means for directing the paper web from the first component 200 to the second component 10). Suitable pathways for travel of the paper web 55 can be provided by suitably designed tracks or tunnels (not shown). As such, there is provided a way to direct the paper web from the first component 200 to the second component 10.

The continuous paper web 55 is received from the first component 200 by the second component 10. Typically, the paper web 55 is directed from idler roller 316 to roller 60 of the cigarette making machine 10, or other suitable location. The paper web 55 travels through printing assembly 65 where indicia can be printed on the outer surface 90 of that web, if desired. The paper web 55 then travels to the garniture region 45 of the cigarette making machine 10, where there are provided components for manufacturing a continuous cigarette rod 170 by wrapping the tobacco filler 20 in the paper web. The garniture conveyor belt 130 advances that paper web through that garniture region. At the left end of the suction conveyor system 28, tobacco filler 20 is deposited from its source on the foraminous belt 32 onto the paper web 55. The garniture region 45 includes finger rail assembly 140, garniture entrance cone 144, scrape 155, tongue 160, folding mechanism 180 and adhesive applicator 184, that are employed to provide a continuous cigarette rod 170. The continuous rod 170 is subdivided into a plurality of rods (not shown), each of the desired length, using known techniques and equipment (not shown). Those rods then most preferably have filter elements attached thereto, using known techniques and equipment (not shown).

Figure 3:
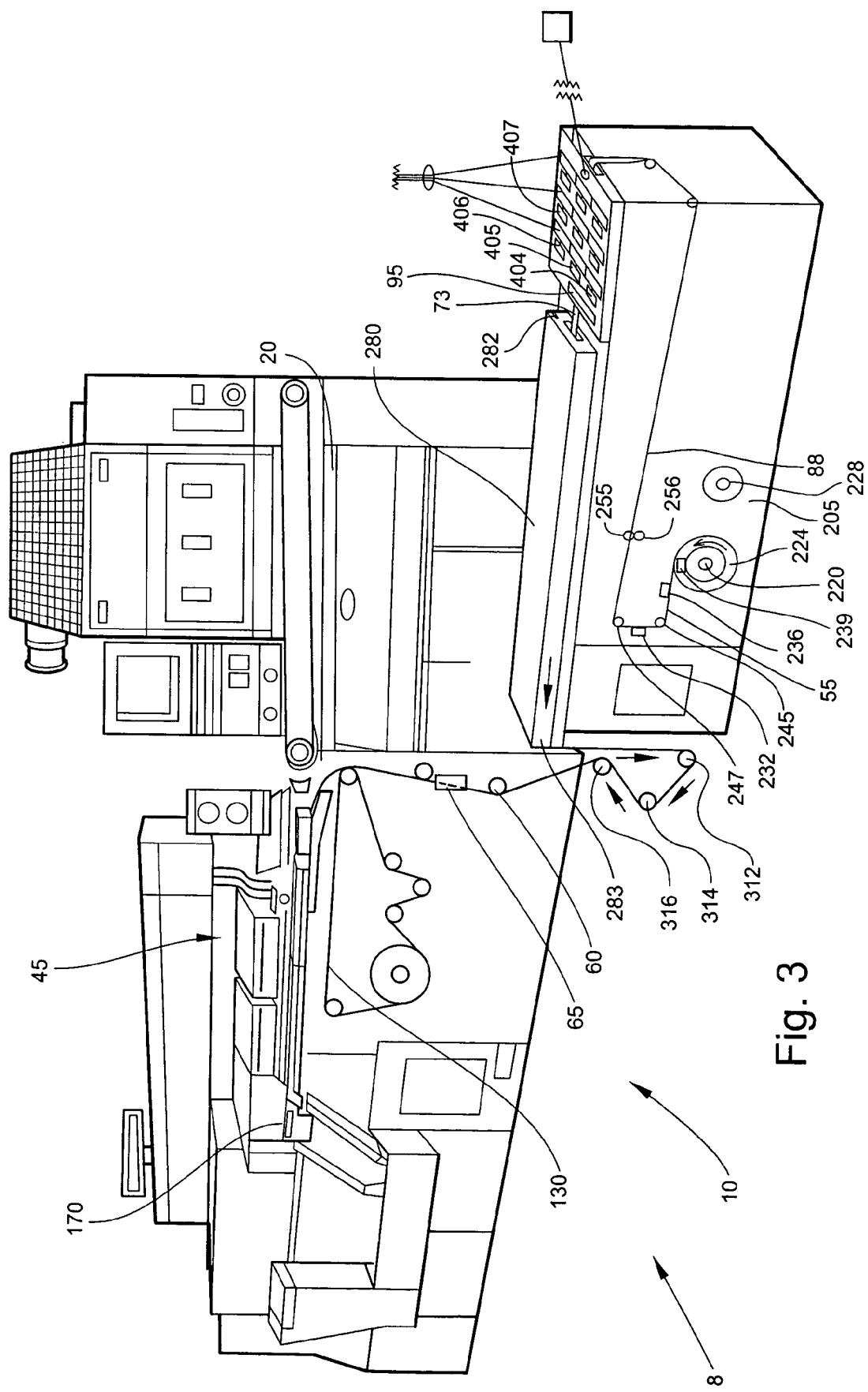
FIG. 3 is a schematic illustration of a cigarette making machine assembly for carrying out certain aspects of the present invention, the assembly including the combination of a wrapping material supply system and a cigarette making machine.

Referring to FIG. 3, there is shown a two-component automated cigarette making machine assembly 8 that is constructed by coupling a wrapping material supply machine 390 (e.g., a first component) with a cigarette making machine 10 (e.g., a second component). The assembly 8 incorporates those general components that operate in the overall general manner that have been described previously with reference to FIG. 2.

The supply machine 390 most preferably is a free-standing machine that is capable of providing a patterned web of wrapping material 55 to a conventional (or suitably modified) cigarette making machine 10. The supply machine 390 includes a frame 205 that supports at least one unwind spindle assembly 220 onto which a first bobbin 224 is mounted. The paper web 55 is threaded through a tension sensor 236, which in conjunction with a braking component 239 connected to the shaft of the unwind spindle assembly, maintains a desired amount of tension on the paper web 55 as it is transferred from the bobbin 224.

In operation, a continuous paper web 55 supplied from a bobbin 58 is routed through a path defined by a series of idler rollers 245, 247 and guideposts 255, 256. Optionally, though not preferably, the paper web 55 can be routed through a heating/cooling control unit (not shown) as the paper web passes through the series of rollers and guide posts. The paper web then is routed through an additive applicator system 400. The additive material 73 most preferably also is applied to predetermined locations on the inside surface 88 of the paper web 55.

A representative additive applicator system 400 comprises at least one non-contact application device 404. That is, for a non-contact device, the components used to apply additive material to the paper web do not come into direct physical contact with the paper web. The design and arrangement of the non-contact application device 404 can vary. For the embodiment shown, the applicator system 400 comprises a series of non-contact applicators 404, 405, 406, 407; and in particular, a plurality of non-contact printheads. The additive material 73 typically is provided from a supply source reservoir (not shown) through tubing (e.g., Tygon-type tubing) or other suitable supply means (not shown) to a port or supply region infeed regions of those applicators. Each additive applicator of the applicator system 400 can be of a type that applies additive material 73 that has a finely divided solid powder form (e.g., an electrostatic deposition type of printing device) or that has a fluid form (e.g., an ink jet type of printing device). Most preferably, the use of such types of techniques to apply coating formulation to a substrate can be computer controlled.

Representative additive applicators can incorporate those various types of technologies contained in the non-contact printing systems and associated printing system components available from sources such as Canon Kabushiki Kaisha, Durst Phototechnik AG, Inca Digital Printers, Gradco (Japan) Ltd., Leggett & Platt Digital Technologies, Mimaki Engineering Co. Ltd., Olec Corporation, Tampoprint AG, Vutek, Inc., ZUND, Spectra Inc., Xaar, Xerox Corporation, Brother Kogyo Kabushiki Kaisha, Hitachi, Ltd., Toshiba Tec Corporation, Hewlett-Packard Company, Hitachi Koki Imaging Solutions, Inc. and Ink Jet Technology Inc.

Electrostatic deposition printing is a non-impact method of printing that uses dry coating formulation, static electricity, and heat, to maintain components of that coating formulation in contact with the substrate. That is, extremely small sized particles (e.g., sub-micron size particles) incorporating polymeric material (e.g., meltable or thermoplastic materials) are applied to a substrate. Heat is provided to the coated substrate, such as through appropriate. exposure to radiation from quartz tube lamps (not shown) or by suitable contact with heated rollers (not shown). As such, the plastic materials of the coating formulation that are exposed to heat melt, and hence stick (e.g., fuse or otherwise become fixed) to substrate.

Representative types of electrostatic precipitation techniques and equipment components are set forth in U.S. Pat. No. 6,501,925 to Yamamoto et al. and U.S. Pat. No. 6,519,421 to Inoue; and U.S. Patent Application 2002/0150829 to Zhao et al.; which are incorporated herein by reference.

Ink jet printing is a non-impact method of printing that involves ejecting a coating formulation from a nozzle onto a substrate in response to an electronic digital signal. The actual coating formulation ejection method can occur via several processes, and can involve the use of pressurized nozzles, electrostatic fields, piezoelectric elements within nozzles, and heaters for vapor phase bubble formation. Various printing methods are described in *Output Hard Copy Devices*, Durbeck and Sherr (eds.), Chapter 13 (1988) and *Handbook of imaging Materials*, 2nd Ed. Diamond and Weiss (eds.) Chapter 14 (2002); which are incorporated herein by reference.

Representative types of ink jet printing equipment components, methodologies and associated technologies are set forth in U.S. Pat. No. 4,251,824 to Hara et al.; U.S. Pat. No. 4,410,899 to Haruta et al.; U.S. Pat. No. 4,412,224 to Sugitani; U.S. Pat. No. 4,463,359 to Ayata et al.; U.S. Pat. No. 4,532,530 to Hawkins; U.S. Pat. No. 4,601,777 to Hawkins et al.; U.S. Pat. No. 5,281,261 to Lin; U.S. Pat. No. 5,563,644 to Isganitis et al.; U.S. Pat. No. 5,764,257 to Miyazawa et al.; U.S. Pat. No. 6,181,439 to Bronstein et al.; and U.S. Pat. No. 6,298,780 to Ben-Horin et al.; and US Patent Application 2003/0067527 to Temple; and European Patent Specification 1,003,643; which are incorporated herein by reference.

Typical printheads incorporate a plurality of ejectors or tiny nozzles. For example, a typical printhead can incorporate about 300 to about 600 nozzles. Such printheads are capable of applying a series of tiny dots of coating formulation at desired locations on a substrate, such as a continuous paper web. Although the sizes of the individual dots can vary, typically such dots have diameters in the range of about 50 to about 60 microns. The number of dots applied to a unit area of substrate (e.g., the resolution of the application) can vary, and a representative application can be provided at about 1440 by about 720 dots per square inch (dpi). For example, for a printing pattern having a resolution of about 600 dpi, a printed band having a width of about 24 mm and a length of about 4.2 mm possesses about 100 printed dots.

The number of printheads can vary. The number of printheads and associated nozzles that are employed depends upon factors such as the width of the paper web, the speed at which the paper web moves, the overall size of each desired pattern, the design and positioning of the printed pattern relative on the paper web, the number of dots in each pattern, the sizes and weights of the dots in each pattern, and the speed at which coating formulation can be successively ejected from each nozzle. There can be at least 1, at least 5, at least 10, at least 20, even at least 30 printheads. The upper limit of the number of printheads can be determined by the size and operation of those printheads.

If desired, the various heads can be positioned and directed to deposit further amounts of coating formulation on or over coating formulation that previously has been applied to the paper web. That is, further amounts of coating formulation can be superimposed over previously deposited amounts of coating formulation. Such further amounts of coating formulation can be identical in composition to, or different from, that of the coating formulation that previously has been applied to the paper web. As such, layered patterns of the general types set forth in U.S. patent application Ser. No. 10/303,648, filed Nov. 25, 2002, can be provided.

The various printheads and associated nozzles can be arranged in a variety of ways. An array of ejectors can be formed by butting together several printheads, forming a printhead frame or bar. The printheads can be arranged on the frame so as to remain stationary on that frame, or the printheads can be movable on a track. Such a frame can be designed so as to be movable, or the frame can be designed so as to remain stationary. Movable printheads can be designed so as to move in a numerous directions; for example, back and forth, perpendicular to, parallel to, or diagonally, relative to the longitudinal axis of the paper web. The various printheads can be positioned side by side (e.g., transversely relative to the path of the moving paper web), and the various printheads can be positioned in a length-wise fashion along the relevant portion of the supply machine 390 (e.g., longitudinally relative to the path of the moving paper web).

The manner by which the desired pattern is printed can vary. For recurring bands of about 10 mm width and 24.5 mm length on a 27 mm wide strip of continuous paper web, which bands are positioned transversely to the longitudinal axis of the paper web, and which bands are spaced about 20 to about 60 mm apart, various portions of each band can be produced from the application resulting from a combination of a series of printed segments provided from the nozzles of the various printheads.

For a very rapidly moving paper web, portions of a printed pattern can be provided by individual printheads and associated nozzles of a series of printheads that cooperate to provide the desired overall pattern. An example of a manner or method by which a series of printheads can be used to produce various portions of the pattern on a fast moving continuous paper web is as follows. A first series of printheads and nozzles can combine to provide a first portion of a band of a series of spaced bands; a second series of printheads and nozzles combine to provide a second portion of that band of that series of bands; a third series of heads and nozzles combine to provide a third portion of a band of that series of bands; and a fourth series of heads and nozzles combine to provide a fourth portion of a band of that series of bands. That is, deposition of coating material as sub-patterns from individual heads and nozzles can be programmed to the speed of travel of the continuous paper web as well as to the relative sizes and spacings of the various bands.

An example of a manner or method by which a series of printheads and nozzles can be used to produce repeating series of patterns on a fast moving continuous paper web is as follows. A first series of printheads and nozzles can combine to provide a first band of a first series of spaced bands; a second series of printheads and nozzles combine to provide a second band of that first series of bands; a third series of printheads and nozzles combine to provide a third band of that first series of bands; and a fourth series of printheads and nozzles combine to provide a fourth band of that first series of bands. Then, the first series of printheads and nozzles can combine to provide a first band of a second series of spaced bands; the second series of printheads and nozzles combine to provide a second band of that second series of bands; the third series of printheads and nozzles combine to provide a third band of that second series of bands; and the fourth series of heads and nozzles combine to provide a fourth band of that second series of bands. Controlled timing of the speed of the paper web and the application of coating formulation provided by each nozzle results in application of coating formulation at the desired locations on the paper web. As such, the printed pattern is continuously repeated in order to provide a continuous paper web printed with a virtually endless pattern of essentially identical bands equally spaced along the length of that paper web.

In order to ensure proper positioning of the coating formulation on the paper web, it is desirable to ensure that the nozzles operate very quickly to provide coating formulation (e.g., it is highly desirable for the response times of those nozzles to be very short, and for those nozzles to turn on and off very quickly). For a fast moving paper web (e.g., a paper web traveling at a speed of about 500 meters per minute), a non-contact applicator that operates relatively slowly can result in application of coating formulation that is streaked across that paper web (i.e., undesirable streaking occurs when the positioning and speed of operation of the nozzles are relatively slow as compared to the speed of travel of the paper web).

After the additive material 73 has been applied to the paper web 55, components of the additive material is fixed to maintain components of that material to the paper web. Treatments such as exposure to radiation for curing or heating/cooling steps are used to ensure that components of the additive material form a film on the desired regions of the paper web. Prior to or after such types of treatments, the paper web 55 can be exposed to a sensor or detector 95 for a registration system and/or an inspection system (not shown). Preferably, the detector 95 is positioned so as to receive information concerning the paper web 55 immediately after additive material 73 has been applied to that paper web. Typically, the detector 95 is used in conjunction with the certain registration systems and inspection systems, and in conjunction with suitable marker components that are incorporated as components of the additive material 73. Representative types of sensors, detectors and inspection system components and description of inspection system technologies and operation thereof have been set forth hereinbefore with reference to FIG. 1.

For additive materials 73 that have been electrostatically deposited on the paper web 55, the paper web typically is heated and cooled. The paper web 55 can be passed through a heating/cooling control device 280, or other suitable means for controlling heat to which the paper web is subjected. The control device 280 can be used to alter the heat to which the paper web 55 and additive material is subjected (e.g., by raising or lowering the temperature). For example, the control device can be a heating device adapted to soften the additive material 73 that has been applied to the paper web 55, followed by a cooling device to harden the softened additive material. Alternatively, for example, the heating/cooling control device can be a cooling device adapted to assist in the hardening melted additive material 73 that has been applied to the paper web 55 using a heated additive applicator system 400. Typically, the heating/cooling control device 280 has a tunnel-type configuration through which the paper web 55 is passed (through an inlet end 282 and out an outlet end 283); and during the time that the paper web is present within that tunnel region, the paper web is subjected to heating supplied using infrared convection, a series of heated rollers or radiant heating devices; or cooling supplied using refrigerant-type, liquid carbon dioxide-type or liquid nitrogen-type cooling devices.

The size of the heating/cooling device 280 can vary, particularly because that device is positioned and supported by a component 200 that is physically separated from, and spaced from, the cigarette making machine 10. That is, there is provided sufficient room to subject the paper web 55 to treatment using the heating/cooling device 280. Exemplary heating/cooling devices 280 have lengths of about 2 feet to about 10 feet, with lengths of about 3 feet to about 8 feet being typical, and about 4 feet to about 7 feet being desirable. The distance that the paper web 55 travels through the heating/cooling device 280 (i.e., the length of travel through that device) can vary. For example, the paper web 55 can be routed back and forth within the heating/cooling device 280 using a suitably adapted roller system configuration (not shown). The components of suitable and appropriate heating/cooling devices will be readily apparent to those skilled in the art of the design, manufacture and use of electrostatic deposition printing devices.

For additive materials 73 incorporating pre-polymer components that have been applied to the paper web 55, those pre-polymer components are cured. For example, for additive materials 73 that have been printed onto paper webs 55 using ink jet application devices, the paper webs are subjected to exposure to suitable radiation. The paper web 55 can be passed through a suitably modified heating/cooling control device 280 in order that radiation curable components of the coating formulation 73 is exposed to a sufficient amount of the appropriate radiation so as to solidify the pre-polymer components of that coating formulation. Exemplary types of radiation for curing radiation curable formulations are set forth in U.S. Pat. No. 5,679,115 to Fritzsche et al. and US Stat. Inv. Reg. H1517 to Erickson et al.; which is incorporated herein by reference. Radiation curable systems do not necessarily require heating or cooling of components of the coating formulation or the paper web prior to application of the coating formulation to the paper web, or heating or cooling of the treated paper web after the additive materials have been applied and fixed thereto.

One type of radiation is electron beam radiation. Such radiation is an ionizing radiation, and as such, free radical polymerizable compositions within coating formulations can be solidified using electron beam radiation (i.e., gamma radiation). Representative types of electron beam radiation curing systems are set forth in US Patent Application 2002/0135290 to Avnery, which is incorporated herein by reference. Electron beam curing can be carried out using the technologies that are employed in the types of curing systems available as EZCure Electron Beam Systems from Energy Sciences, Inc.

One type of radiation is ultraviolet (uv) radiation. Such radiation is ionizing radiation, and as such, free radical polymerizable compositions within coating formulations, that also can incorporate suitable free radical initiation systems or photoinitiators, can be solidified using uv radiation. Sources of radiation are mercury lamps, xenon lamps, and those types of sources set forth in US Patent Application 2003/0035037 to Mills et al., which is incorporated herein by reference.

If desired, so-called hybrid types of curing systems can be employed. For example, relevant components of coating formulations can be cured using both uv and electron beam forms of radiation.

The amount of ionizing radiation required to effectively cure the relevant components of the coating formulations can vary. Typically, the amount of radiation is in the range of about 5 to about 50 kGray. The radiation is of an intensity, and the relevant components are exposed to that radiation for a period of time, in order that the relevant components of the coating formulation is exposed to a sufficient amount of radiant energy to provide for the desired degree of polymerization. The selection of appropriate sources of ionizing radiation can be determined by experimentation, and the identity and operation of suitable sources of ionizing radiation will be readily apparent to those skilled in the art of design, manufacture and use of devices for curing radiation curable compositions.

The paper web 55 exits the temperature control device 280 and is advanced to the cigarette making machine 10. Direction of the paper web 55 is provided by suitably aligned series of idler rollers 312, 314, 316 (or guideposts, turning bars, or other suitable means for directing the paper web from the first component 390 to the second component 10). Suitable pathways for travel of the paper web 55 can be provided by suitably designed tracks or tunnels (not shown). As such, there is provided a way to direct the paper web from the first component 390 to the second component 10.

The continuous paper web 55 is received from the first component 390 by the second component 10. Typically, the paper web 55 is directed from idler roller 316 to roller 60 of the cigarette making machine 10, or other suitable location. The paper web 55 travels through printing assembly 65 where indicia can be printed on the outer surface 90 of that web, if desired. The paper web 55 then travels to the garniture region 45 of the cigarette making machine 10, where there are provided components for manufacturing a continuous cigarette rod 170 by wrapping the tobacco filler 20 in the paper web. The garniture conveyor belt 130 advances that paper web through that garniture region. The resulting continuous rod 170 is subdivided into a plurality of rods (not shown), each of the desired length, using known techniques and equipment (not shown). Those rods then most preferably have filter elements attached thereto, using known techniques and equipment (not shown).

The cigarette making machine assemblies and configurations described with reference to FIGS. 2 and 3 are representative of cigarette making machine assemblies and configurations that can be used to provide tobacco filler 20 to a garniture region 45 from one location, and the patterned paper web 55 to the garniture region from another location. Furthermore, the representative cigarette making machine assembly (i.e., with the component that provides the patterned paper web positioned to the front and to the right of the component that incorporates the tobacco source and the garniture assembly) is such that the general direction of travel of the paper web through the wrapping material supply machine is essentially parallel to the direction of travel of the paper web through the garniture region of the cigarette making machine. However, the positioning of the wrapping material supply machine to the cigarette making machine can vary. For example, the wrapping material supply machines 200, 390 can be positioned beside or behind the cigarette making machine 10; or positioned generally perpendicular to the garniture region of the cigarette making machine 10. In such circumstances, the path of travel of the paper web from the wrapping material supply machine to the cigarette making machine can be accomplished through the use of appropriately positioned idler bars and roller guides. The exact path of travel of the paper web is a matter of design choice, and the selection thereof will be readily apparent to those skilled in the art of design and operation of cigarette manufacturing equipment.

Figure 4:
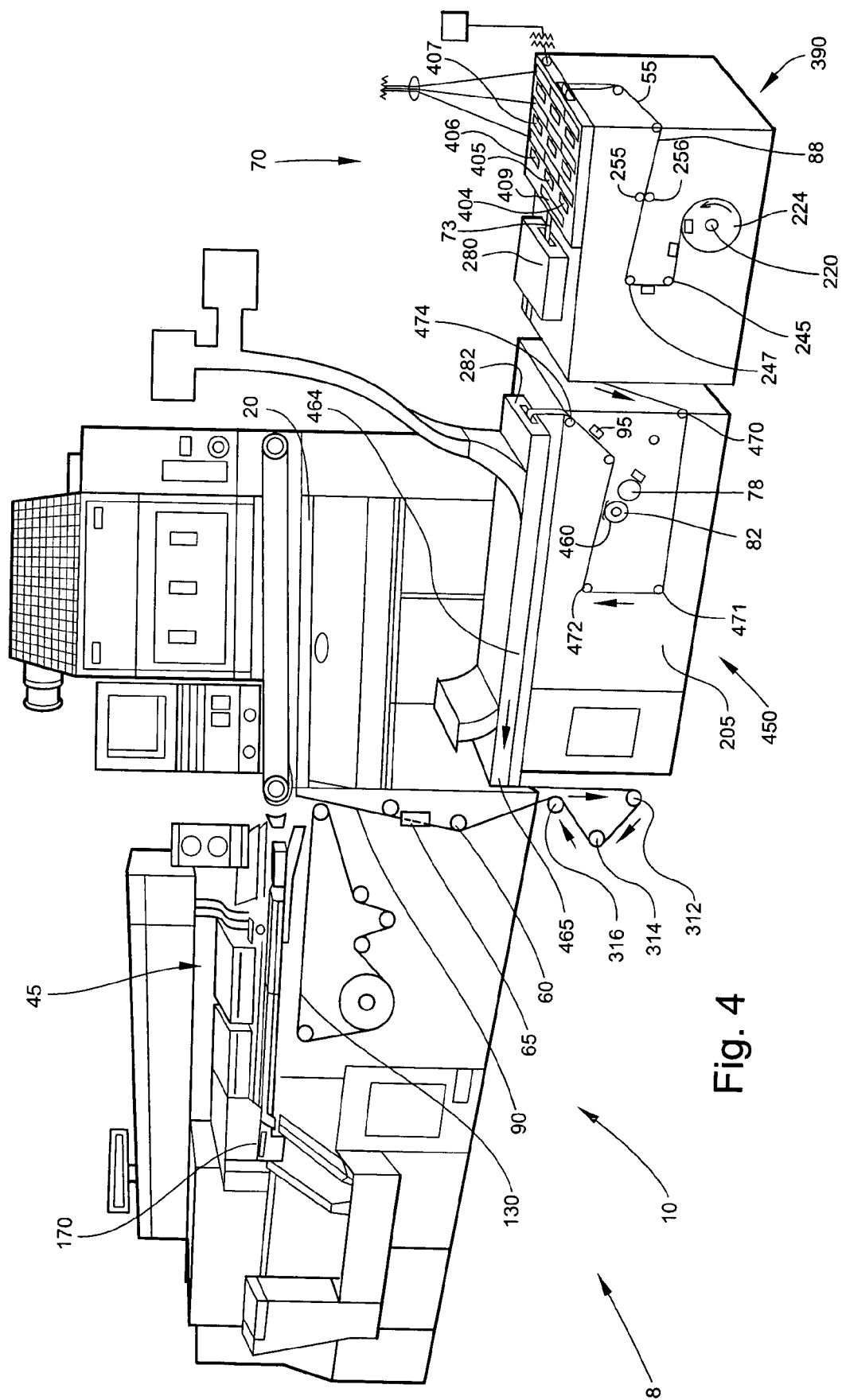
FIG. 4 is a schematic illustration of a cigarette making machine assembly for carrying out certain aspects of the present invention, the assembly including the combination of a wrapping material supply system and a cigarette making machine.

Referring to FIG. 4, there is shown a three-component automated cigarette making machine assembly 8 that is constructed by coupling a wrapping material supply machine 390 possessing a non-contact printing electrostatic deposition or ink jet printing component (e.g., a first component) with a cigarette making machine 10 (e.g., a second component). A roll application machine 450 (e.g., a third component) is positioned between the first and second components. The assembly 8 incorporates those general components that operate in the overall general manner that have been described previously with reference to FIGS. 2 and 3. That is, the assembly 8 includes a cigarette making machine 10 that is described generally with reference to FIGS. 2 and 3, and a wrapping material supply machine 390 that is described generally with reference to FIG. 3. The roll application machine component 450 of the assembly 8 provides a system 460 for applying a coating formulation 462 to the paper web 55 that has had additive material 73 applied thereto using supply machine 390.

A continuous paper web 55 is provided from a bobbin 224 from the unwind spindle assembly 220 of the supply machine 390. That paper web 55 is routed through a path defined by idler rollers 245, 247 and guideposts 255, 256. The supply machine is adapted to incorporate an additive application apparatus 70 in order that a coating formulation of additive material 73 can be applied at desired locations to the inner surface 88 of the paper web 55. A series of non-contact applicators 404, 405, 406, 407 apply additive material 73 to the paper web. A detection device 409 is used to locate and record the location of the additive material 73 that has been applied to the paper web. The paper web 55 and additive material 73 that has been applied thereto then is passed through a heating/cooling or source of radiation device 280 in order to provide treatment sufficient to fix the additive material to the paper web.

The paper web 55 is routed through a series of guide posts and rollers 470, 471, 472, 473, 474 in order to be appropriately routed through the third component 450 of the cigarette making machine assembly 8. The third component 450 possesses a frame 205 and a roll application unit 460 for applying a second coating formulation 462 to the paper web 55. A representative roll application unit 460 possesses pick-up roller 78 and applicator roller 82. A detection device 409 is used to locate and record the location of the second additive material 462, and optionally also the first additive material 73, that has been applied to the paper web. The paper web 55 having two types of additive material applied thereto then is routed through a heating/cooling device 280, such as is described previously with reference to FIG. 2. The paper web 55 then exits the heating/cooling device 464 at outlet end 465 and travels on to the second component 10 of the three component arrangement 8.

Tobacco filler 20 and components for manufacturing a continuous cigarette rod 170 from the tobacco filler is carried out using the second component of that system 10. The paper web 55 is routed from the third unit 450 to the second unit 10 using a series of rollers and guide bars 312, 314, 316 and 60 to the garniture region 45 of the second component 10. The garniture conveyor belt 130 is used to transport that paper web through the garniture region 45 of the cigarette making machine 10. The paper web 55 also can travel through printing assembly 65 where indicia can be printed on the outer surface 90 of that web, if desired.

For preferred three component systems, the three components are independent, stand alone units. The third component 450 of the system is positioned between the first component 390 and second component 10, and is used to apply coating formulation to the paper web that is supplied by the first component. The third component of the system also is adapted so that the continuous paper web passes from that third component to the second component of the system for cigarette manufacture. As such, coating formulation from a second application system can be applied to a paper web over the coating formulation previously applied to that paper web by a first application system. For example, a coating formulation that is virtually absent of solvent can be applied to the paper web, and the pre-polymer components of that formulation can be cured to provide a first coating layer; and then, a water-based starch containing coating formulation can be applied as a second layer over the first layer. As such, superimposed layers of coating material can be applied to a paper web, such as is set forth in U.S. patent application Ser. No. 10/303,648, filed Nov. 25, 2002.

For the cigarette making machine assemblies described with reference to FIGS. 1 through 4, registration of the transversely positioned bands of additive material on a continuous paper web so as to be within a tolerance window is a very desirable feature when those bands are used for the production of cigarettes that meet certain standards with regards to low ignition propensity criteria. Registration of the patterns (e.g., bands) applied to continuous paper webs within a tolerance window can be carried out whether the patterns are applied off-line (e.g., as pre-printed patterns) or on-line (e.g., as patterns applied on the cigarette making apparatus). In particular, a 2-axes control system (i.e., a system that controls two independent motors) is used within the cigarette making apparatus in conjunction with a high speed band sensor (i.e., which is fast enough to respond to nominal cigarette making speeds). A first servo motor drives the flying knife of the cigarette making machine. The knife position at rod cut off location is derived by an encoder mechanically coupled to the cut off knife, and this signal is used as a reference point for determining the position of the band. A second servo motor drives the garniture belt and the foraminous conveyor belt, and a second encoder provides the feedback regarding cigarette making speed. The detector senses a band and the location of that band with respect to the cutoff knife. If the bands are out of registration on the cigarette rods, the servo control system typically slows down the garniture belt relative to the cut off knife so that the knife temporally will cut shorter rods until the continuous tobacco rod is in registration. This can be achieved either by speeding up the cut off knife or slowing down the garniture belt. For example, the system can be programmed to make a small adjustment per rod (e.g., such as 1 mm per cut change per rod) so as to walk the system into to registration as smoothly as possible. However, for smaller adjustments, longer periods are required to bring the cigarette rods back within the tolerance window, and hence more short cigarettes will be rejected. Such a registration system is particularly useful for making adjustments (i) during cigarette making machine start up; (ii) during machine operation after recovery from a shutdown or after a new bobbin of paper web is spliced into the machine; (iii) during normal cigarette making machine operation due to factors such as stretching of the paper web.

Figure 5:
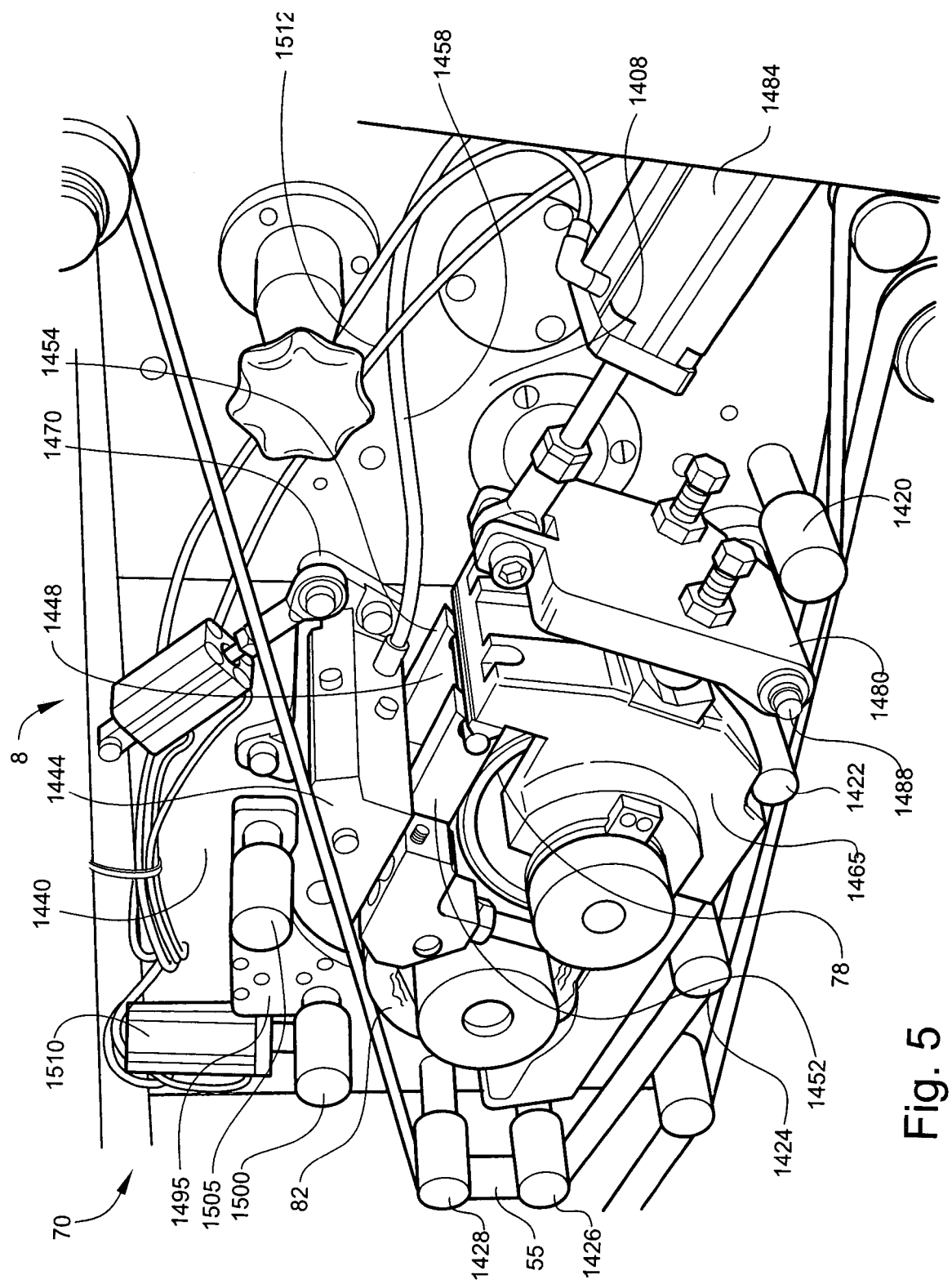
FIG. 5 is a perspective of a representative additive applicator apparatus, that apparatus being mounted at an appropriate location on a cigarette making machine assembly.

Referring to FIG. 5, there is shown a portion of a cigarette making machine assembly 8 that includes an additive applicator apparatus 70 that uses rollers 78, 82 to apply additive material (not shown) directly to the surface of a continuous strip of paper web 55. Such an additive applicator 70 is particularly useful for applying to a paper web 55 additive materials that are liquid or liquid dispersions that are not particularly viscous (e.g., formulations of additive materials having viscosities of less than about 1,000 centipoise).

Additive applicator 70 is an assembly that includes a pick-up roller 78 and a transfer roller 82 mounted adjacent to each other and through a first or front roller support plate 1400 on the exterior front face of the cigarette making machine assembly 8. A second or rear roller support plate 1408, located in the plane of and adjacent to the front roller plate 1400, provides a surface to which other structures of the additive applicator 70 are mounted. Components of the additive applicator apparatus 70, including rollers 78, 82 and support plates 1400, 1408 are manufactured from materials such as stainless steel or hardened carbon steel. Several rotatable guide rollers 1420, 1422, 1424, 1426, 1428 are suitably fixedly mounted; such as to either the front roller plate 1408 or rear roller plate 1410, depending upon the desired location of those guide rollers. Those guide rollers provide the path over which the paper web 55 travels from a bobbin (not shown), past the additive applicator 70, and on to other downstream destinations of the cigarette making machine assembly.

The additive applicator 70 also includes a manifold 1444 positioned above an additive material reservoir 1448, which is defined by the positioning of a reservoir front arm 1452 and a reservoir rear arm 1454. Those arms 1452, 1454 are positioned above the pick-up roller 78. Tubing 1458, or other suitable supply means, is connected to the manifold 1444 and originates at a source of additive material (not shown) to provide an input of additive material to reservoir 1448, and hence to the roll face of the pick-up roller 78. That portion of the additive applicator assembly thus provides a sealed path for flow of additive material to the region where that additive material is deposited onto the pick-up roller. Preferably, the reservoir front arm 1452 and rear arm 1454 each include at least one port (not shown), located on the bottom sides of each of those arms 1452, 1454. At least one of those ports is an output port through which additive material is supplied to the roll face of the pick-up roller 78. At least one other port is an input port through which a suction pump (not shown) suctions excess additive material from the edges of the pick-up roller 78, and pumps excess additive material back into the reservoir 1448 defined by arms 1452, 1454. The assembly also includes a collection pot 1465 positioned adjacent to and slightly below the pick-up roller 78. The collection pot 1465 serves as a temporary collection location for excess additive material removed from the pick-up roller 78.

The manifold 1444 is attached to a glue manifold pivot plate 1470, which is attached to the front roller plate 1400 and the rear roller plate 1408. Such attachment leaves the manifold 1444 with the capability of moving upward and downward about a manifold pivot pin (not shown). Movement of the manifold 1444 upward from the operative position allows access to those regions located below the manifold. Access to that region is desirable have access to the reservoir arms 1452, 1454, to insert, remove and service the pick-up roller 78, and for maintenance and service of the collection pot 1465. In addition, the reservoir arms 1452, 1454, are movable upward and downward about a reservoir pivot shaft (not shown) to allow access to the pick-up roller 78 and the collection pot 1465.

The transfer roller 82 and the pick-up roller 78 are positioned into operative engagement with one another using a roller pressure plate 1480. The roller pressure plate 1480 is operably connected to an air cylinder 1484, or other suitable means for applying force to rollers 78, 82. The air cylinder 1484 utilizes compressed air to force the roller pressure plate 1480 about a pressure plate pivot shaft 1488 into and out of engagement with the transfer roller 82. Movement of the roller pressure plate 1480 to engage and disengage the pick-up roller 78 with the transfer roller 82 can programmed, and as such a microprocessor associated with the operation of the cigarette making machine can be used to control movement of that plate 1480.

The additive applicator 70 further comprises a roller lift bracket 495 mounted to the front roller plate 1400, and that lift bracket is movable. The roller lift bracket 1495 includes a pair of rollers 1500, 1505, or other suitable means for controlling the path of travel of the paper web 55. The roller lift bracket 1495 is operably connected to an air cylinder 1510, or other suitable means for applying force to the lift bracket. The air cylinder 1510 also is connected to a supply of pressurized air by an air tube 1512, or other suitable connection and supply means. The air cylinder 1510 utilizes compressed air to move the pair of rollers 1500, 1505 on the roller lift bracket 1495 into and out of rotating contact with the advancing paper web 55. For example, when the rollers 1500, 1505 on the roller lift bracket 1495 move downward into contact with the paper web 55, that paper web is likewise moved into rotating contact with roll face of the transfer roller 82. As a result of the contact of the paper web 55 with the transfer roller 82, the additive material applied to the transfer roller is transferred to the inside surface of the paper web, in a desired pattern or fashion. Movement of the roller lift bracket 1494 and rollers 1500, 1505 into and out of contact with the paper web 55 can programmed, and as such a microprocessor associated with the operation of the cigarette making machine can be used to control movement of that bracket 1494. The roller lift bracket 1494 can be controlled by a signal received from the cigarette making machine, in order that the bracket can be retracted and the paper web 55 can be moved so as to not be in contact with the various rollers when the cigarette making machine is not in normal operation; and as such, problems associated with sticking of the paper web to various components of the applicator apparatus 70 are minimized, avoided or prevented.

In operation, during the process of cigarette manufacture, the pick-up roller 78 is rotated counter-clockwise, and the transfer roller 82 is rotated clock-wise. Those rollers are engaged in contact by pressure supplied by the pressure plate 1480. Additive material is feed from a source (not shown) to the manifold 1444, and from the manifold to the reservoir 1448, from the reservoir to the roll face of the pick-up roller 78, and onto the transfer roller 82. The additive material then is transferred from the transfer roller to the paper web 55 as the paper web advances across the surface of the rotating transfer roller 82. That is, as the paper web 55 advances across the surface of the rotating transfer roller 82, the roller lift bracket 1495 is moved downward, and the rollers 1500, 1505 attached to that roller lift bracket are moved into contact with the advancing paper web 55. As a result, the additive material on the surface of the transfer roller 82 is transferred to the inside surface of the advancing paper web 55 at locations corresponding to the pattern on the roller face of the transfer roller 82. The paper web 55 having additive material applied thereto then is advanced to downstream locations of the cigarette making machine.

Figure 6:
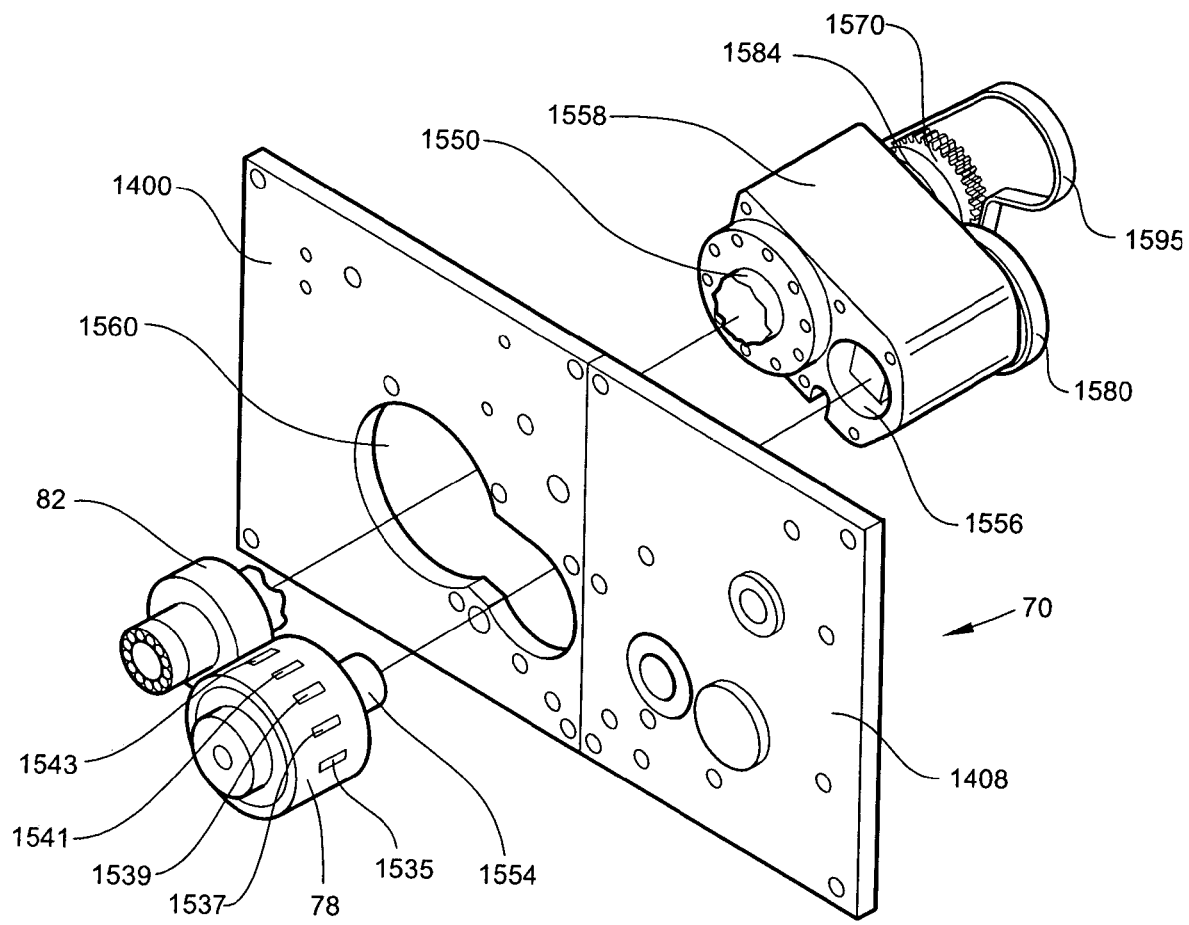
FIG. 6 is an exploded perspective of an additive applicator apparatus of the type shown in FIG. 5.

Referring to FIG. 6, there is shown a portion of a representative additive applicator apparatus 70. The pick-up roller 78 and the transfer roller 82 are shown roll contact with one another and in operative engagement. Pick-up roller 78 possesses a roll face having a pattern of recessed grooves 1535, 1537, 1539, 1541, 1543, having the form of spaced bands, or other desired pattern. Those recessed grooves provide a location for a predetermined amount of additive material to be deposited, and the size and shape of those grooves is a matter of design choice. The pick-up roller 78 is rotated using a pick-up drive shaft 1550 (shown as cut away); and the transfer roller 82 is rotated using an applicator drive shaft 1554 (shown as extending from opening 1556 in the applicator drive shaft box 1558. The drive shafts 1550, 1554 extend through an opening 1560 in the front roller support plate 1400, which is adjacent the rear roller support plate 1408. The pick-up roller 78 and the transfer roller 82 are adapted to extend beyond the front faces of each of the front and rear roller plates 1400, 1408.

The applicator drive shaft box 1558 is adapted to be positioned and secured to the back side of the front and rear roller plates 1400, 1408. A pick-up roller gear 1580 is in operative connection with the pick-up drive shaft 1550. A transfer roller gear 1584 is in operative connection with the applicator drive shaft 1554. Both gears 1580, 1584 are located external to the applicator drive shaft box 1558, and are positioned on the back side of that drive shaft box 1558. Those gears 1580, 1584 have interlocking teeth such that rotation of one of those gears in one direction causes rotation of the other gear in the opposite direction. The transfer roller gear 1584 is connected to a transfer roller pulley 1590. A belt 1595 extends about the transfer roller pulley 1590 and around a power source pulley (not shown). As a result, power for rotational movement is provided to the transfer roller shaft 1550 and transfer roller 82 by rotation of the pulley 1590 by movement of the belt 1595; and power for controlled rotational movement is provided to the pick-up roller 78 by way of the drive shaft 1550 that is rotated by operation of gears 1580, 1584. In addition, belt 1595 can act as a timing belt, and by suitable use of that belt to control the speed of the applicator drive shaft 1554 relative to the speed of operation of the cigarette making machine, it is possible to provide integral timing with the cigarette rod subdivision mechanism (not shown) of the cigarette making machine. Thus, appropriate use of belt 1595 to connect appropriate gear mechanisms yields a method for providing pattern (e.g., band) registration for each individual finished cigarette rods (not shown) that are cut from the continuous rod (not shown).

The applicator assembly 70 can further include a photoelectric sensor switch (not shown) located above a point of roller engagement between the pick-up roller 78 and the transfer roller 82. An exemplary sensor is a WT 12-2P430 from Sick, Inc. Output from the photoelectric proximity switch is sent to a PLC or other suitable processor (not shown) associated with that photoelectric sensor (not shown) and monitors the amount (e.g., level) of additive material (not shown) in the region above that point of roller engagement of rollers 78, 82. Thus, as a flow of additive material is supplied from the manifold (not shown) and reservoir (not shown), an amount of the additive material forms at the point of engagement between those rollers 78, 82. When the amount of that additive material supplied to that region drops below a predetermined level for sufficient desired transfer of the additive material to the transfer roller 82, the information sensed and supplied by photoelectric sensor controls a switch to activate a pump (not shown), and hence to supply more additive material to the reservoir. Similarly, deactivation of the pump can be controlled when a desired level of additive material is achieved.

The applicator assembly 70 can further include sensors (not shown) that assist in ensuring that proper amounts of additive material is transferred to the paper web. For example, an induction-type sensor (not shown) located in the region of a pick-up roller 78 can sense that the pick-up roller, and other associated components of the applicator assembly, are in proper position. In addition, the cigarette making machine can be programmed such that when the induction sensor detects that the pick-up roller is not in proper position, that machine can provide appropriate signal to the operator or cease operation. In addition, a further sensor (not shown) can be mounted on the rear roller plate 1408 at a location of the paper web after that paper web has passed over the transfer roller 82. That further sensor can be used to detect the presence, or degree of presence, of additive material on the paper web 55. Detection of a sufficient presence of additive material on the paper web 55 indicates that additive material transfer mechanisms are operating properly. The cigarette making machine can be programmed to alert the machine operator or stop movement of the paper web 55 if the further sensor detects an insufficient presence of the additive material on the paper web 55.

Figure 7:
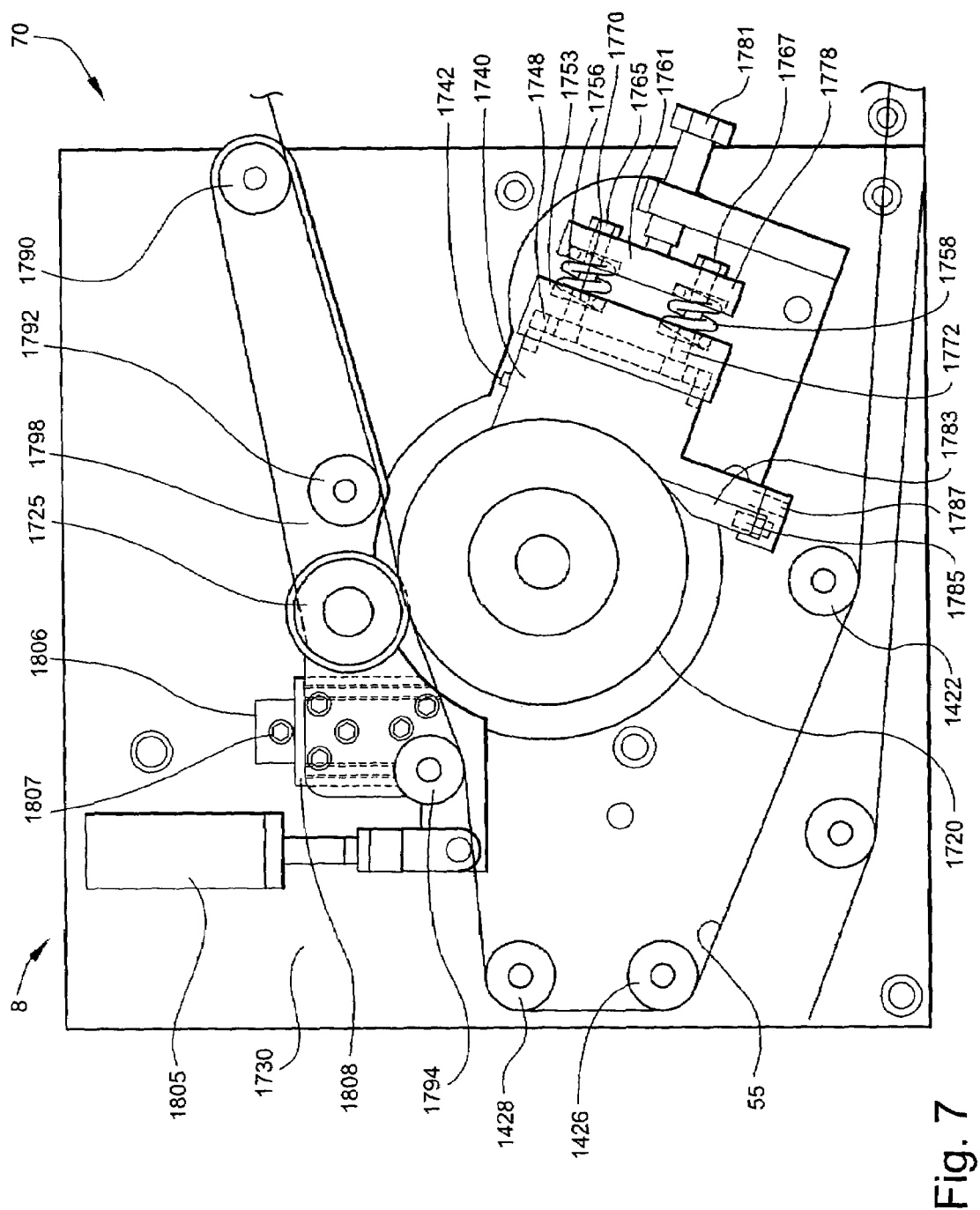
FIG. 7 is a schematic illustration of a representative additive applicator apparatus.

Referring to FIG. 7, there is shown a portion of a cigarette making machine assembly 8; and there also are shown relevant components of another representative additive applicator apparatus 70. Such an applicator 70 is particularly useful for applying to a paper web 55 more viscous additive materials, than those embodiments described previously with reference to FIGS. 5 and 6. More viscous additive materials useful in applications involving cigarette paper include, for example, formulations of additive materials having viscosities of greater than 100,000 centipoise. Such higher viscosity additive materials can be characterized as pastes.

Additive applicator 70 is an assembly that includes a major pick-up/transfer roller 1720 and a transfer pressure roller 1725 (or back-up roller) mounted adjacent to each other and through a front roller plate 1730 secured to front exterior of a cigarette making machine. Each of a plurality of rollers 1422, 1426, 1428 is fixedly mounted to the front roller plate 1730; and those rollers provide guides for a path over which the paper web 55 travels from a bobbin (not shown) to the additive applicator 70 and on to other regions of the cigarette making machine 8.

Positioned adjacent to the major roller 1720 is a reservoir 1740 for the additive material. The reservoir is maintained in place and secured to the front roller plate 1730 by bolts (not shown) or other suitable connection means. The reservoir 1740 is connected to a source (not shown) of additive material (e.g., a formulation having the form of a paste), through port 1742 near the top region of the reservoir 1740. As such, a source of additive material for the major roller 1720 is provided. Typically, the additive material is supplied through tubing (not shown), such as Tygon-type tubing, that feeds the reservoir 1740 through port 1742. The additive applicator 70 provides a sealed path for flow of the additive material to the point of deposit onto the major roller 1720. The reservoir 1740 includes at least two ports (not shown) on the side thereof adjacent to the major roller 1720. One port is an output port positioned near the middle of the reservoir 1740, through which additive material is supplied to the major roller 1720. At least one other port is an input port through which excess additive material is scraped from the edges of the major roller 1720, and is fed back into the reservoir 1740.

The reservoir 1740 is attached to an assembly that is designed to exert pressure upon that reservoir. Such a pressure exerting assembly includes a reservoir pad 1748 that is positioned adjacent to the reservoir 1740. The reservoir pad 1748 is held in position by a reservoir pad retainer 1753, which encompasses the reservoir pad 1748. Compression springs 1756, 1758 are positioned between the reservoir pad retainer 1753 and a reservoir spring retainer 1761, and provide resistance for tightening of the reservoir spring retainer 1761 toward the reservoir 1740. Screws 1765, 1767, or other suitable connection means, are positioned through each side of the reservoir spring retainer 1761, through the center of each respective compression spring 1756, 1758, and through a passage in each side of the reservoir pad retainer 1753. The screws 1765, 1767 are movable in and out of respective passages 1770, 1772 of the reservoir pad retainer 1753. The threaded ends of the screws 1765, 1767 are positioned in threaded contact with threaded walls of the passages 1770, 1772 of the reservoir pad 1748 so as to supply the application of pressure to the reservoir pad 1748 when pressure is exerted against the reservoir spring retainer 1761.

An adjustment screw mounting plate 1778 is attached to the front roller plate 1730 adjacent to the reservoir spring retainer 1761. An adjustment screw 178 is threaded through the adjustment screw mounting plate 1778 into contact with the reservoir spring retainer 1761. When the adjustment screw 1781 is adjusted a predetermined amount inward into increasingly compressive contact with reservoir spring retainer 1761, pressure is applied by the screws 1765, 1767 to the reservoir pad 1748. As a result, a predetermined amount of pressure is exerted on the paste reservoir 1740. The additive material formulation is caused to flow to the reservoir 1740 by application of head pressure supplied from an upstream pumping system (not shown) or other suitable means. The additive applicator 70 also can be equipped with sensors and control devices (not shown) of the type described previously with reference to FIG. 6.

A scraper plate 1783 is connected to the reservoir 1740. A compression spring 1785 is positioned between a scraper 1783 and the scraper plate 1787 such that the scraper is urged into operative contact with the roll face of the major roller 1720. As such, excess additive material on the surface of the roll face of the major roller 1720 is scraped from that roll face as the moving major roller passes the scraper, and that material is deposited back into the reservoir 1740. Thus, additive material carried by the major roller 1720 for transfer to the paper web is located in the desired location; within the pockets located on the roll face of that roller.

Rollers 1790, 1792, 1794 together with transfer pressure roller 1725 are positioned on a roller lift bracket 1798. The roller lift bracket 1798 is designed to be moved downward by the forces applied by air cylinder 1805 about a lift bracket pivot plate 1806. The air cylinder 1805 is connected to a source of pressurized air (not shown), and is employed to provide for movement of the roller lift bracket 1798. The roller lift bracket 1798 is attached on one end to the front roller plate 1730 about lift bracket pivot plate 1806 through roller lift bracket pivot pin 1807, and the lift bracket 1798 is movable. The roller lift bracket 1798 further includes a lift bracket pivot sleeve 1808, which is slidingly attached on the end opposite the pivot pin 1807 to lift bracket pivot plate 1806.

In operation, the transfer pressure roller 1725 and rollers 1790, 1792, 1794 can be moved about the pivot pin 1807 so as to be positioned into and out of contact with the upper surface of the paper web 55. When the transfer pressure roller 1725 is moved into operative contact with the major roller 1720, the transfer pressure roller 1725 rotates under the power of the major roller 1720, but in the opposite direction to that of the major roller. Preferably, the major roller 1720 rotates clockwise, and the transfer pressure roller

1725 rotates counter-clockwise. The transfer pressure roller 1725 thus preferably contacts the advancing paper web 55 at a point of engagement of the roll faces of the transfer pressure roller 1725 and the major roller 1720. As a result of the pressured contact experienced by the paper web 55 as it travels between transfer pressure roller 1725 and the major roller 1720, additive material is applied to the paper web 55 in a predetermined pattern. Movement of the roller lift bracket 1798, transfer pressure roller 1725, and rollers 1790, 1792, 1794 into and out of contact with the paper web 55 can programmed, and as such a microprocessor associated with the operation of the cigarette making machine can be used to control movement of that lift bracket 1798. The roller lift bracket 1798 can be controlled by a signal received from the cigarette making machine, in order that the bracket can be retracted and the paper web 55 can be moved so as to not be in contact with the various rollers when the cigarette making machine is not in normal operation; and as such, problems associated with sticking of the paper web to various components of the applicator apparatus 70 are minimized, avoided or prevented.

Figure 8:
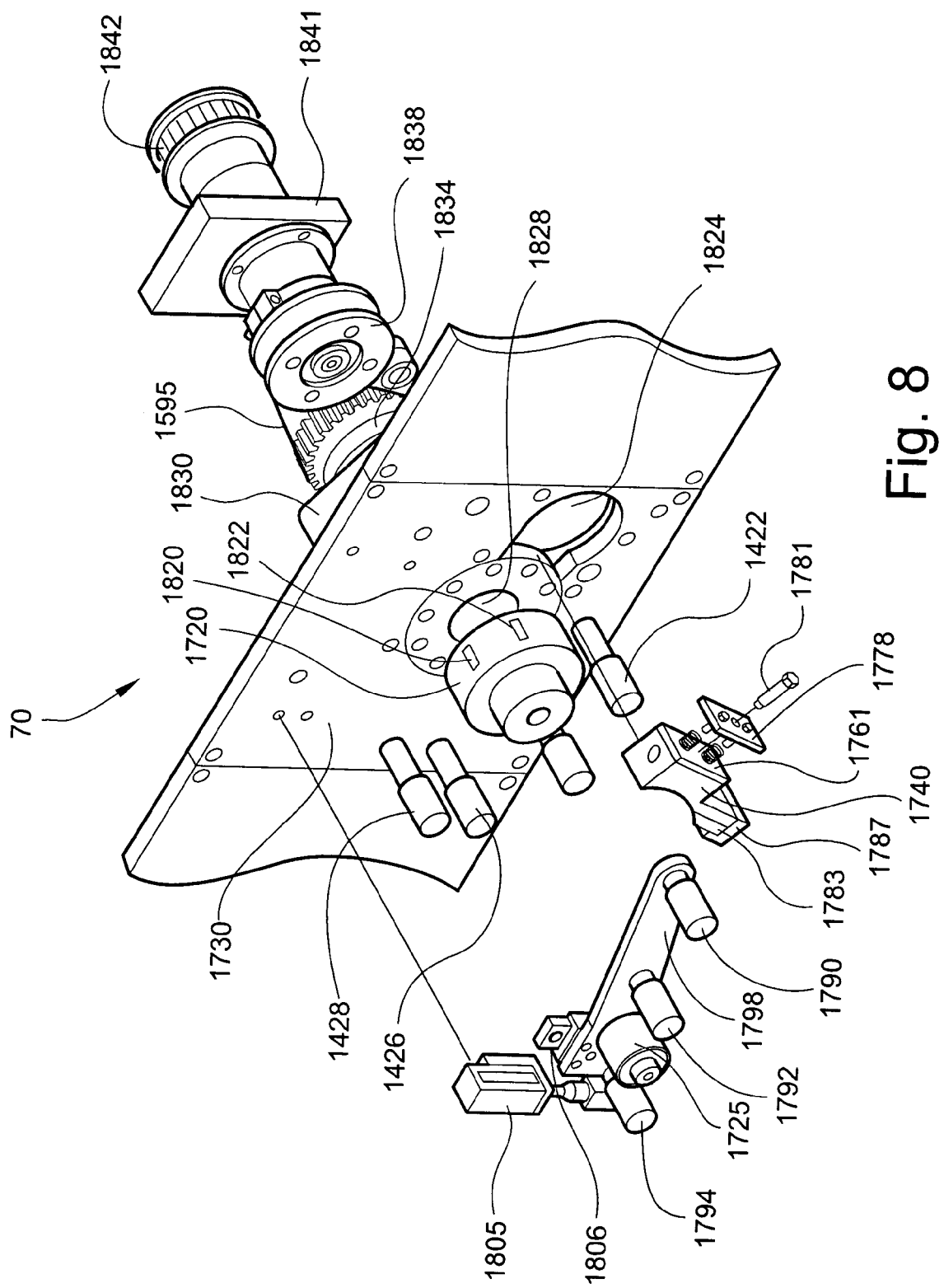
FIG. 8 is an exploded perspective of an additive applicator apparatus of the type shown in FIG. 7.

Referring to FIG. 8, there are shown relevant components of a portion of a representative additive applicator apparatus 70. The major roller 1720 possesses a roll face having a pattern of recessed grooves or pockets 1820, 1822; thus providing a pocketed wheel. The diameter of the major roller can vary, but suitable major roller has a diameter of about 104 mm. Exemplary grooves provide spaced bands located so as to extend perpendicularly to the longitudinal axis of a paper web and across a portion of the width of that paper web, and are generally box-like in shape. The dimensions of the grooves can vary, and are dependent upon factors such as the pattern of application that is desired; but suitable grooves have depths of about 2 mils, longitudinally extending lengths of about 5 mm, and transversely extending lengths of about 23 mm. Those grooves 1820, 1822 are designed to contain additive material (not shown) and to transfer that additive material to a paper web (not shown) that contacts that roller face as the paper web travels past the roll face of the major roller 1720. As such, for the pattern shown, spaced apart bands are applied at predetermined intervals transversely to the longitudinal axis of the continuous paper web. That is, the recessed grooves 1820, 1822 provide a location for a predetermined amount of additive material to be deposited on a paper web; and the size and shape of those grooves is a matter of design choice. The major roller 1720 is manufactured from materials such as stainless steel, hardened carbon steel, or the like.

The roller lift bracket 1798 supports rollers 1790, 1792, 1794 and back-up roller 1725. Back-up roller 1725, or "soft-faced" roller, typically is manufactured from stainless steel or hardened carbon steel, and the roll surface is provided by an overlying band or ring of a suitable material such as a rubber-type or elastomeric material. Suitable "soft-faced" rollers 1725 are adapted from those types of commonly used for component parts of conventional cigarette making machines, and are manufactured from materials commonly used in conventional cigarette making machines. The rubber-type material can be manufactured from a suitable polyurethane material. The roller lift bracket also supports the air cylinder 1805 and the pivot plate 1806. The diameter of the back-up roller 1798 can vary, but a suitable back-up roller has a diameter of about 40 mm.

The reservoir 1740 for the additive material is assembled along with the reservoir spring retainer 1761, the adjustment screw mounting plate 1778, the adjustment screw 1781, scraper 1783 and the scraper plate 1787.

Positioned on the front roller plate 1730 are a plurality of rollers 1422, 1426, 1428 and an opening 1824. The major roller 1720 is connected to a roller drive shaft 1828 that passes through opening 1824 and to an applicator drive shaft box 1830 that is in turn connected to a roller gear 1834. A belt 1595 extends about the roller gear 1834 and around a pulley 1838 mounted to a power drive assembly 1841. Rotational power is provided from the power drive assembly 1841 to the roller gear 1834 to the roller shaft 1828 and to the major roller 1720. Timing belt pulley 1842 can be used to receive input regarding the speed of operation of the cigarette making machine, and hence can be use in conjunction with a belt (not shown) to time operation of the other components of the applicator apparatus 70.

Figure 9:
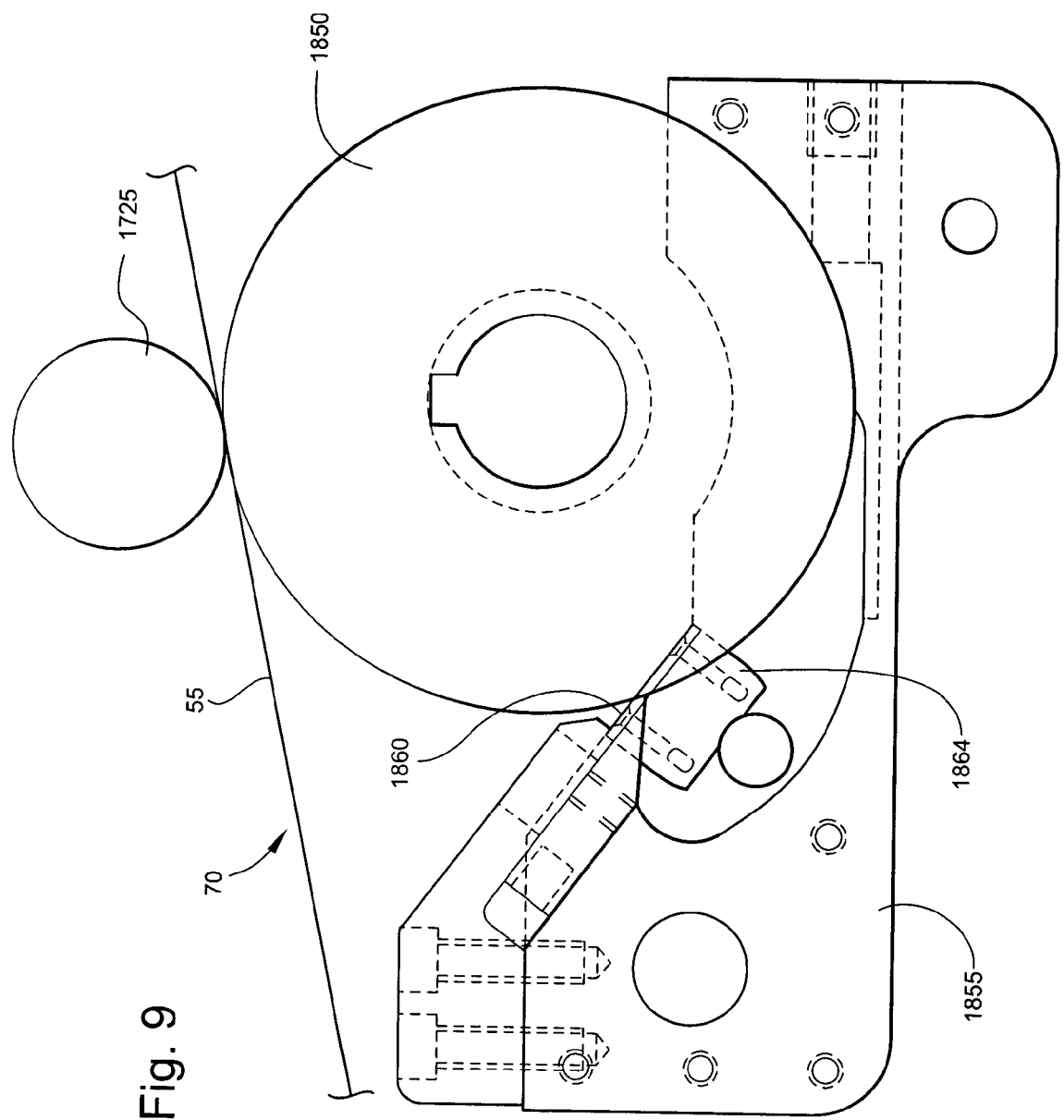
FIG. 9 is a schematic illustration of a representative additive applicator apparatus.

Referring to FIG. 9, there are shown relevant components of a portion of yet another representative additive applicator apparatus 70. Other components of the additive applicator apparatus, and the general operation thereof, are described previously with reference to FIGS. 7 and 8. Such an applicator 70 is particularly useful for applying to a paper web 55 more viscous additive materials. More viscous additive materials useful in applications involving cigarette paper include, for example, paste-type formulations of additive materials having viscosities of greater than 100,000 centipoise.

Additive applicator 70 is an assembly including a major pick-up/transfer roller 1850 that is generally similar to that pocketed roller described previously with reference to FIGS. 5 and 6. For example, the diameter of the major roller 1850 can be about 104 mm, and the major roller can be manufactured from materials such as stainless steel, hardened carbon steel, and the like. Several rollers (not shown) are fixedly mounted to the front roller plate 1730; and those rollers provide guides for a path over which the paper web 55 travels from a bobbin (not shown) to the additive applicator 70, between the roll faces of major roller 1850 and back-up roller 1725, and on to other regions of the cigarette making machine 8.

Positioned adjacent to the major roller 1850 is a reservoir 1855 for the additive material. The reservoir is maintained in place and secured to the front roller plate 1730 by bolts (not shown) or other suitable connection means. The reservoir 1855 is connected to a source (not shown) of additive material (e.g., a formulation having the form of a paste), through the top region of the reservoir 1855. As such, a source of additive material for the major roller 1850 is provided. A portion of the reservoir 1855 is shown in phantom in order to show more clearly the positioning of a portion of the major roller 1850 within the reservoir, and to more clearly show the positioning of the scrapers 1860, 1864 against the roll face and side, respectively, of the major roller. Typically, the additive material is supplied through tubing (not shown), such as Tygon-type tubing, that feeds the reservoir 1850 through a port (not shown). The additive applicator 70 provides a path for flow of the additive material to the point of deposit onto the major roller 1850.

A scraper 860 is connected to the body of the reservoir 1855. The scraper 1860 is urged into operative contact with the roll face of the major roller 1850. As such, excess additive material on the surface of the roll face of the major roller 1850 is scraped from that roll face as the moving major roller passes the scraper, and that material is deposited back into the reservoir 1855. Thus, additive material carried by the major roller 1850 for transfer to the paper web is located in the desired location; within the pockets located on the roll face of that roller. Against the front side face of major roller 1850 is positioned a scraper 1864. A corresponding scraper (not shown) is positioned against the back side face of the major roller 1850. As such, the roll face and both side faces are subjected to surface treatment by three scraper pieces arranged in a "U"-like configuration, so as to remove undesirable excess additive formulation from those surfaces, and hence, maintain those surfaces relatively clean by maintaining those surfaces relatively free of build up of coating formulation.

Figure 10:
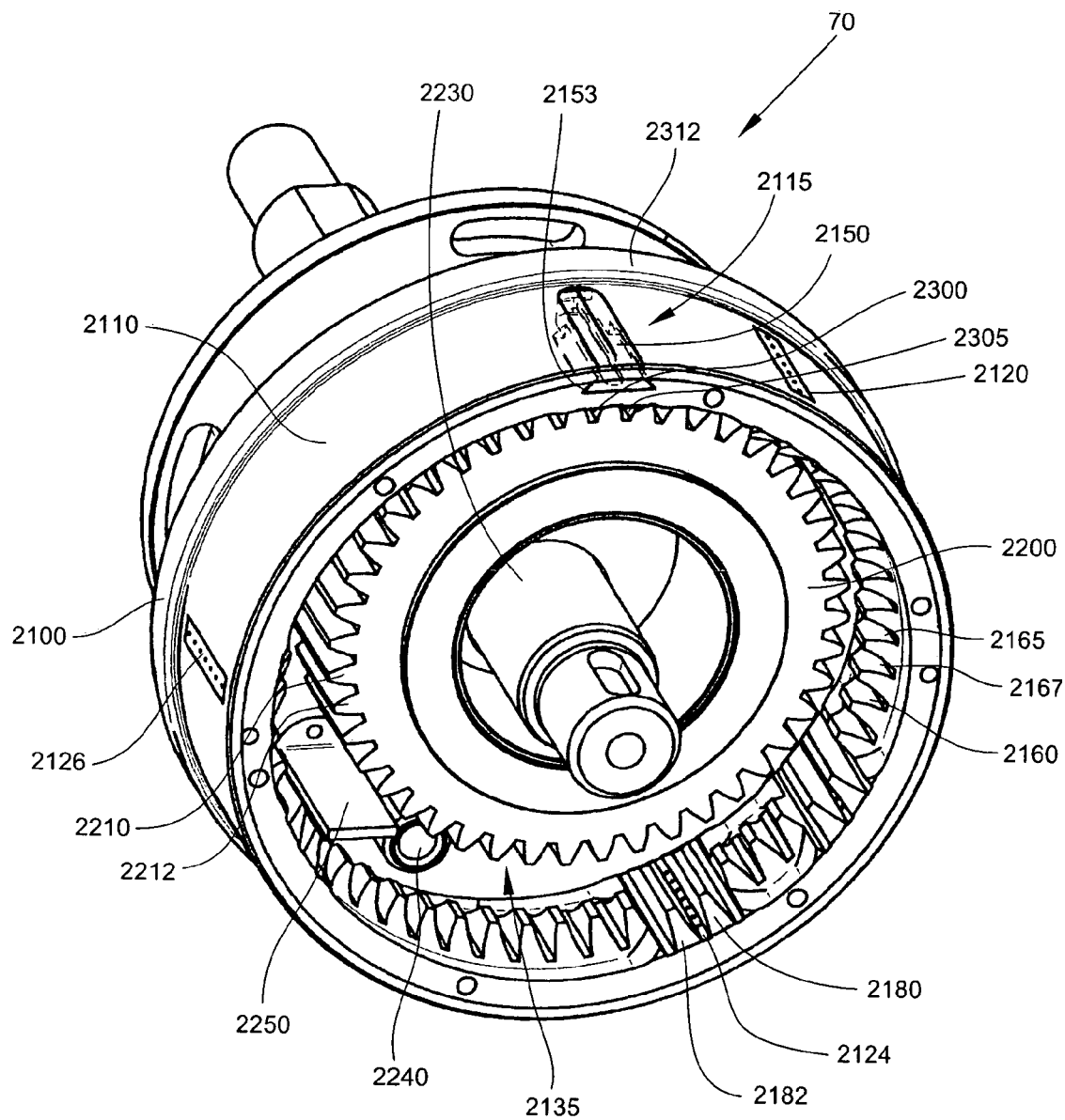
FIG. 10 is a perspective of an additive applicator apparatus for carrying out certain aspects of the present invention.

Referring to FIG. 10, there is shown certain relevant components an additive applicator apparatus 70 representative of one aspect of the present invention. Such an application system 70 is useful for applying additive material (not shown) to a moving substrate, such as a continuously moving strip of paper web (not shown). The application system 70 can replace those types of applicators described previously with reference to FIGS. 5 through 9. That is, the applicator system can be positioned in those locations for applicator systems for those cigarette making machines described previously with reference to FIGS. 1, 2 and 4.

The applicator system 70 includes an outer housing 2100 that has an outer roll face 2110. A representative outer housing 2100 has a generally circular shape, and the circumference of the roll face 2110 is about 40.2 cm. The roll face or application face possesses a several passageways 2115, 2120, 2124, 2126, and those passageways extend from the outer surface of the outer housing to within a central cavity or inner region 2135 of that outer housing 2100. The shapes, dimensions, format and locations of the passageways can vary; but as shown, exemplary passageways each are composed of a series of holes (e.g., each passageway is composed of two rows each of about 23 mm across, and each row is composed of seven holes each of about 0.75 mm in diameter). Alternatively, for example, the passageways each can have the form of one continuous passageway (e.g., each passageway has the form of a slot having a width of about 23 mm and a length of about 0.25 mm). The six representative passageways are positioned so as to provide for spaced band shaped patterns on a continuous strip of paper web. Exemplary passageways are positioned such that first and second passageways are separated by about 30 mm, second and third passageways are separated by about 104 mm, third and fourth passageways are separated by about 30 mm, fourth and fifth passageways are separated by about 104 mm, fifth and sixth passageways are separated by about 30 mm, and sixth and first passageways are separated by about 104 mm. As such, each revolution of the roll face can provide printing on a continuous paper web so as to provide wrapping material for a six cigarette rods, each rod 67 mm in length and each rod having one band printed at about 15 mm from one end thereof. The passageways can be provided by forming or machining the desired passageway configuration through the desired locations of the outer housing; or the passageways can be formed or machined into a replaceable inserts 2150, that is designed to fit into a corresponding receptacle 2153 in the outer surface region of the outer housing. The number and positioning of the passageways can vary, depending upon factors such as desired location of application on the wrapping material, the size of cigarette rods manufactured using the wrapping material, and the circumference of the roll face of the outer housing. Furthermore, the exact size, shape and format of the individual passageways can vary, is dependent upon the desired configuration of pattern to be applied to the wrapping material, and is a matter of design choice.

The outer housing possesses an inner gear face 2160. The inner face has a generally circular face, and possesses a series of gear teeth 2165, 2167. For the exemplary applicator system shown, the inner face possesses a series of 54 teeth, those teeth being characterized as DIN Module 2. Gear teeth 2180, 2182 adjacent to one another in the regions of the respective passageways are designed so as to extend essentially across the width of the inner cavity; and the front and back regions of the other gear teeth 2165, 2167 are designed so that those teeth do not extend entirely across the width of the inner cavity. Typically, gear teeth having the shape of gear teeth 2165, 2167 are milled on the front and back regions thereof, and the shape of gear teeth milled in such a manner is such that churning or other unnecessary movement of fluid coating formulation within the inner region of the outer housing is minimized during operation of the applicator system. The outer housing 2100 also possesses a front plate or face (not shown), to enclose inner region of that outer housing. Typically, the passageways are positioned so as to extend from the outer surface of the outer housing to a trough region between two adjacent gears 2180, 2182 of the inner surface of that outer housing. Thus, when the gears mate as shown, that mating occurs near the uppermost region of the applicator system. As such, coating formulation (not shown) can be forced from the trough region between those gears outwards to the outer surface of the outer housing.

Within the outer housing 2100 is positioned an inner gear 2200. The inner gear is generally circular in shape, and possesses a series of gear teeth 2210, 2212. For the exemplary application system shown, the inner gear 2200 possesses a series of 44 teeth, those teeth being characterized as DIN Module 2. The outer housing 2100 and the inner gear 2200 are positioned such that the gear teeth extending from the inner surface of the outer housing are positioned in a cooperating arrangement with the gear teeth extending from the outer surface of the inner gear. A drive shaft 2230 provides suitable means for supplying rotation of the outer housing 2100. That is, appropriate connection of one end of the drive shaft to the outer housing, and appropriate connection of the other end (not shown) of the drive shaft to a suitable power source (not shown) allows power supplied by the power source to provide rotation of the outer housing at the desired rate. Manners and methods for connecting a drive shaft to the power source and other components of a cigarette making machine are set forth previously with reference to FIGS. 5 through 9.

A fluid coating formulation (not shown) is introduced into the cavity 2135 of the outer housing through entrance port 2240 from a source, such as a tube (not shown), and the formulation can be pumped (or otherwise supplied) from a supply reservoir (not shown). In use, the outer housing is rotated clockwise by rotation of the drive shaft 2230. The inner gear also is rotated clockwise; and as such, the inner and outer components 2200, 2100 also rotate relative to one another. Coating formulation within the reservoir region of the inner cavity is transferred to trough regions between adjacent teeth of the outer gear. That is, rotation of the outer gear within the housing, and the passage of a portion of the gear face of the inner gear through the reservoir region, results in the outward forces that result in introduction of coating formulation to the trough regions between the adjacent teeth of the outer housing. A scrape 2250, plough, or other suitable means for removing excess coating material from the surface of the teeth of the outer housing is positioned upstream from the pick-up region of the reservoir 2135. Typically, the scrape is positioned abut 0.5 mm from the upper surface of the gear teeth of the outer housing. The cooperation of the gear teeth of the two gears 2160, 2200 that rotate relative to one another is such that during mating coating material in the trough regions 2300, 2305 of adjacent teeth of certain gear teeth 2300, 2310 of the inner gear with the gear teeth of the outer housing near the upper region 2312 of the applicator system 70 forces or pumps the coating formulation (not shown) through the passageway 2115 and to the outer surface of the outer housing 2100.

Figure 11:
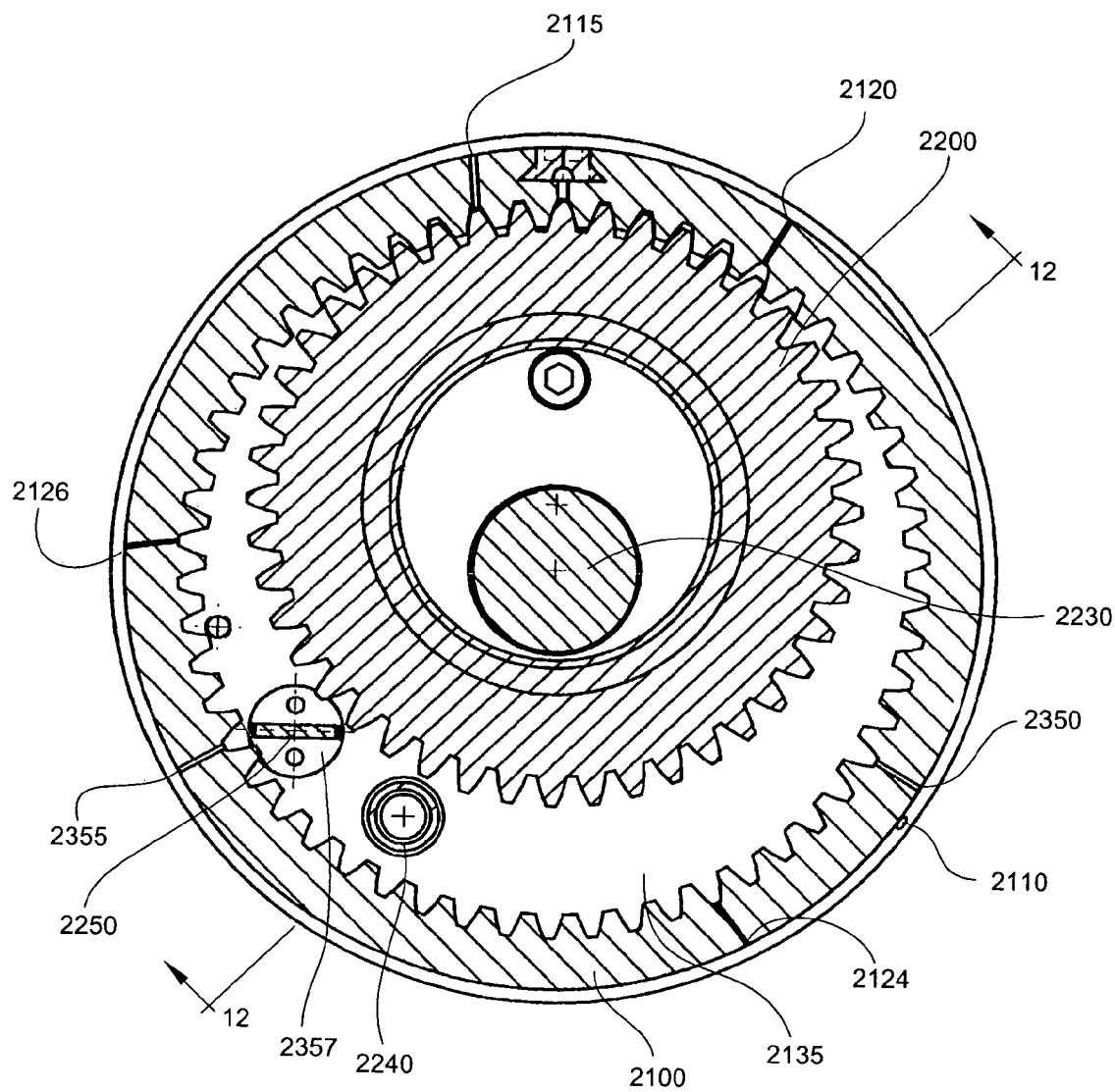
FIG. 11 is a schematic illustration of an end view of an additive applicator apparatus of the type shown in FIG. 10.

Referring to FIG. 11, there is shown the outer housing 2100 having a generally circular outer roll face 2110. The outer housing includes six passageways 2115, 2120, 2350, 2124, 2355, 2126, and the gear teeth located on the inner surface of that outer housing. Within the outer housing is the reservoir region 2135, an inlet port 2240 for coating formulation (not shown), the scrape 2250, and the mount 2357 or support for that scrape. Within the outer housing is the inner gear 2200. The drive shaft 2230 provides for rotation of the outer housing.

Figure 12:
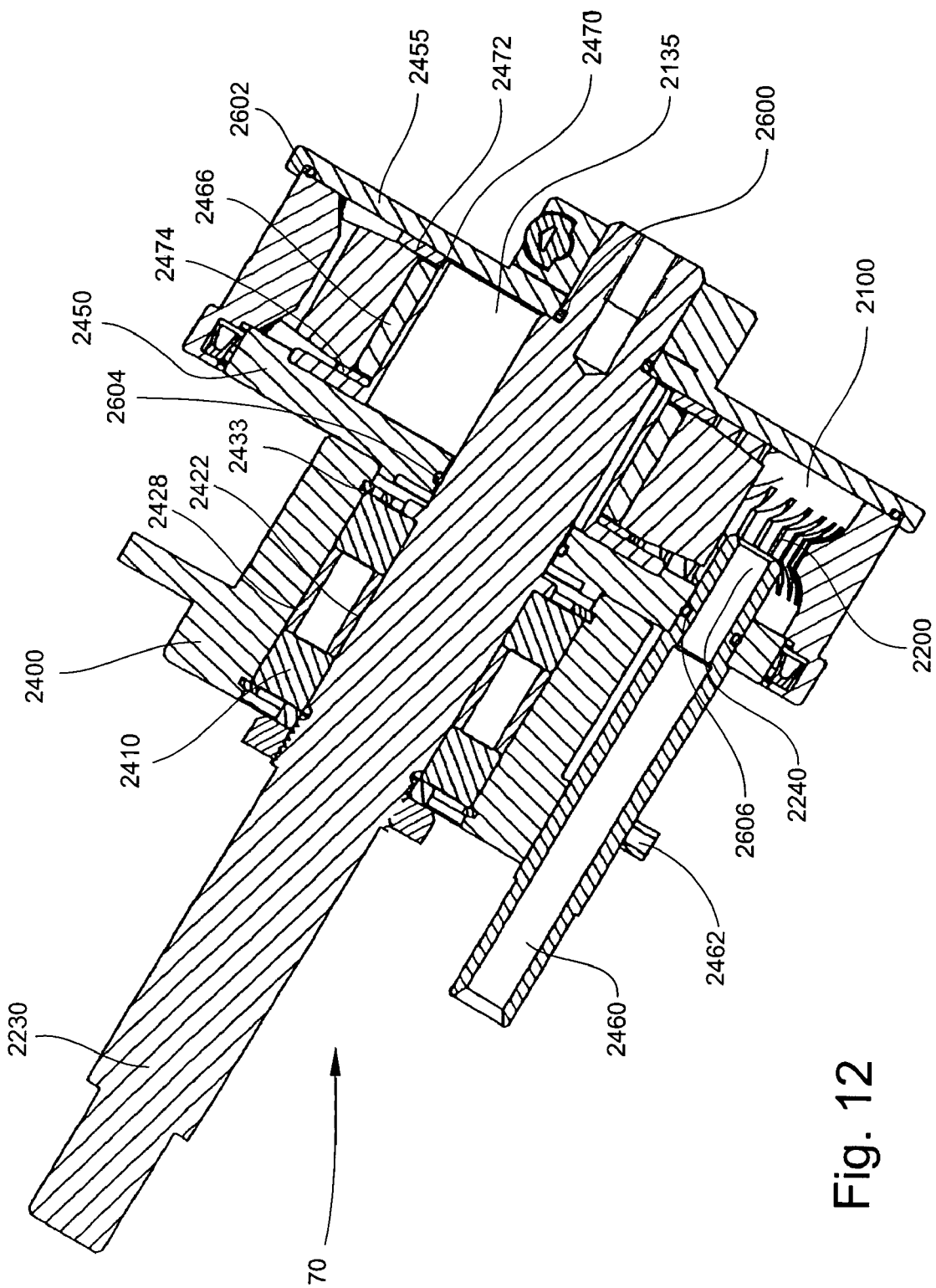
FIG. 12 is a cross-sectional schematic illustration of side view an additive applicator apparatus of the type shown in FIG. 10 taken along lines 12—12 in FIG. 11.

Referring to FIG. 12, there is shown various components of the applicator apparatus 70. The application system 70 includes a bearing housing 2400 for ball bearings 2410, an inner bearing spacer 2422, an outer bearing spacer 2428, and internal retaining ring 2433 and an external beveled retaining ring 2440. The system also includes a drive shaft 2230, the inner gear 2200 and the outer housing 2100. The gear teeth of the inner surface of the outer housing 2100 that are shown are those that have been shaped so as to avoid churning of the fluid coating formulation (not shown) within the reservoir 2135. A rear side plate or disc 2450 and a front side plate or disc 2455 maintains a closed system. Inlet port 2240 to the inner cavity 2135 is provided through a passage 2460 from a supply port 2462 from a source (not shown). The applicator system also includes a needle bearing 2466, a gear mount 2470 for the inner gear 2200, thrust washers 2472, 2474, and a series of nuts, screws or other suitable connection means for maintaining the various components in proper operative arrangement. The various components of the applicator system are manufactured from suitable materials, such as stainless steel, hardened carbon steel, or the like. The application system also includes a series of appropriately located seals, such as o-rings 2600, 2602, 2604, 2606. Appropriate seals can be manufactured from Teflon-type materials, polyurethane-type materials, rubber-type materials, or the like. The construction of the application system most preferably is such that coating formulation only exits that system from desired locations, such as the passageways, at the appropriate times.

Figure 13:
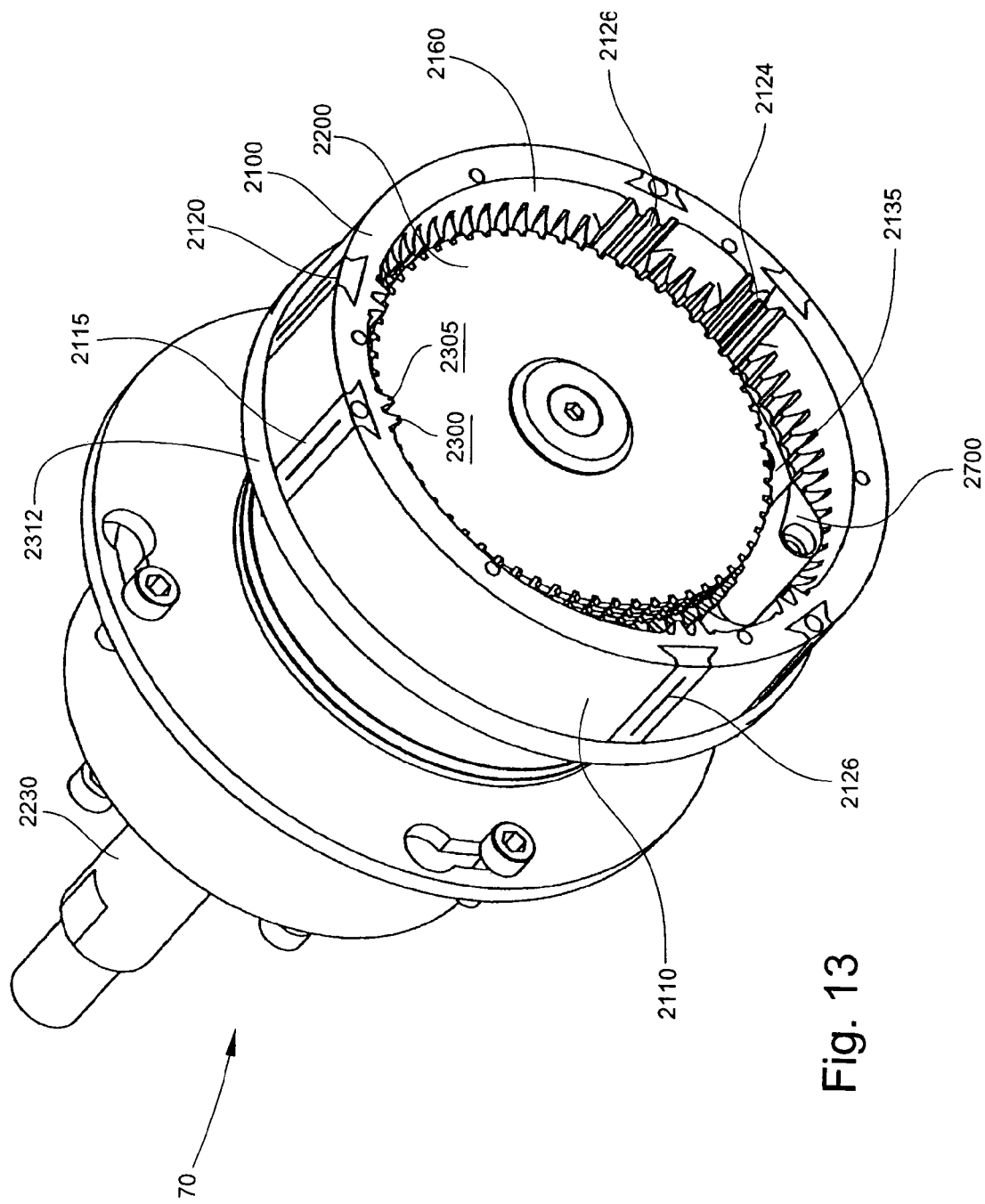
FIG. 13 is a perspective of an additive applicator apparatus for carrying out certain aspects of the present invention.

Referring to FIG. 13, there is shown certain relevant components of another embodiment of additive applicator apparatus 70 representative of one aspect of the present invention. Such an application system 70 is useful for applying additive material (not shown) to a moving substrate, such as a continuously moving strip of paper web (not shown). The application system 70 can replace those types of applicators described previously with reference to FIGS. 5 through 9. That is, the applicator system is similar in many regards to that applicator system set forth previously with reference to FIGS. 10 through 12, and the applicator system can be positioned in those locations for applicator systems for those cigarette making machines described previously with reference to FIGS. 1, 2 and 4.

The applicator system 70 includes an outer housing 2100 that has an outer roll face 2110. The outer housing has a generally circular shape, and the circumference of the roll face 2110 for the representative embodiment shown is about 40.2 cm. The roll face or application face possesses a several passageways 2115, 2120, 2124, 2126, and those passageways extend from the outer surface of the outer housing to within a central cavity or inner region 2135 of that outer housing 2100. The shapes, dimensions, format and locations of the passageways can vary; and representative passageway configurations have been described previously with reference to FIGS. 10 through 12. A drive shaft 2230 provides suitable means for supplying rotation of the inner gear 2200. That is, appropriate connection of one end of the drive shaft to the outer housing, and appropriate connection of the other end (not shown) of the drive shaft to a suitable power source (not shown) allows power supplied by the power source to provide rotation of the outer housing at the desired rate. Manners and methods for connecting a drive shaft to the power source and other components of a cigarette making machine are set forth previously with reference to FIGS. 5 through 9.

A plough 2700, scrape, or other suitable means for removing excess coating material from the surface of the teeth of the outer housing is positioned upstream from the pick-up region of the reservoir 2135. In operation, the cooperation of the gear teeth of the two gears 2160, 2200 that rotate relative to one another is such that coating material in the trough regions 2300, 2305 of adjacent teeth of certain gear teeth of the inner gear with the gear teeth of the outer housing near the upper region 2312 of the application system 70 forces or pumps the coating formulation (not shown) through the passageway 2115 and to the outer surface of the outer housing 2100.

Figure 14:
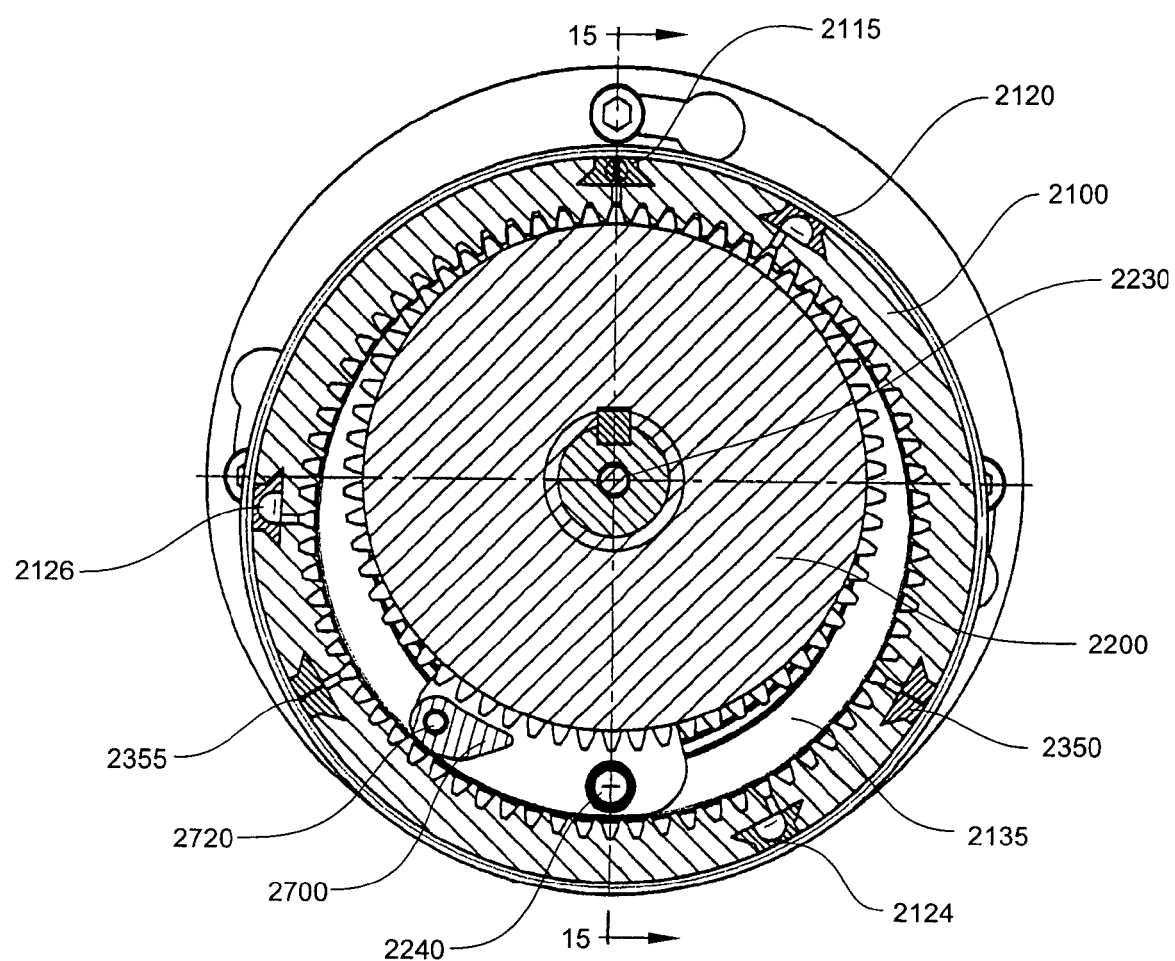
FIG. 14 is a schematic illustration of an end view of an additive applicator apparatus of the type shown in FIG. 13.

Referring to FIG. 14, there is shown the outer housing 2100 that includes six passageways 2115, 2120, 2350, 2124, 2355, 2126, and the gear teeth located on the inner surface of that outer housing. Within the outer housing is the reservoir region 2135, an inlet port 2240 for coating formulation (not shown), the plough 2700, and the mount or support 2720 for that plough. Within the outer housing is the inner gear 2200. The drive shaft 2230 provides for rotation of the outer housing.

Figure 15:
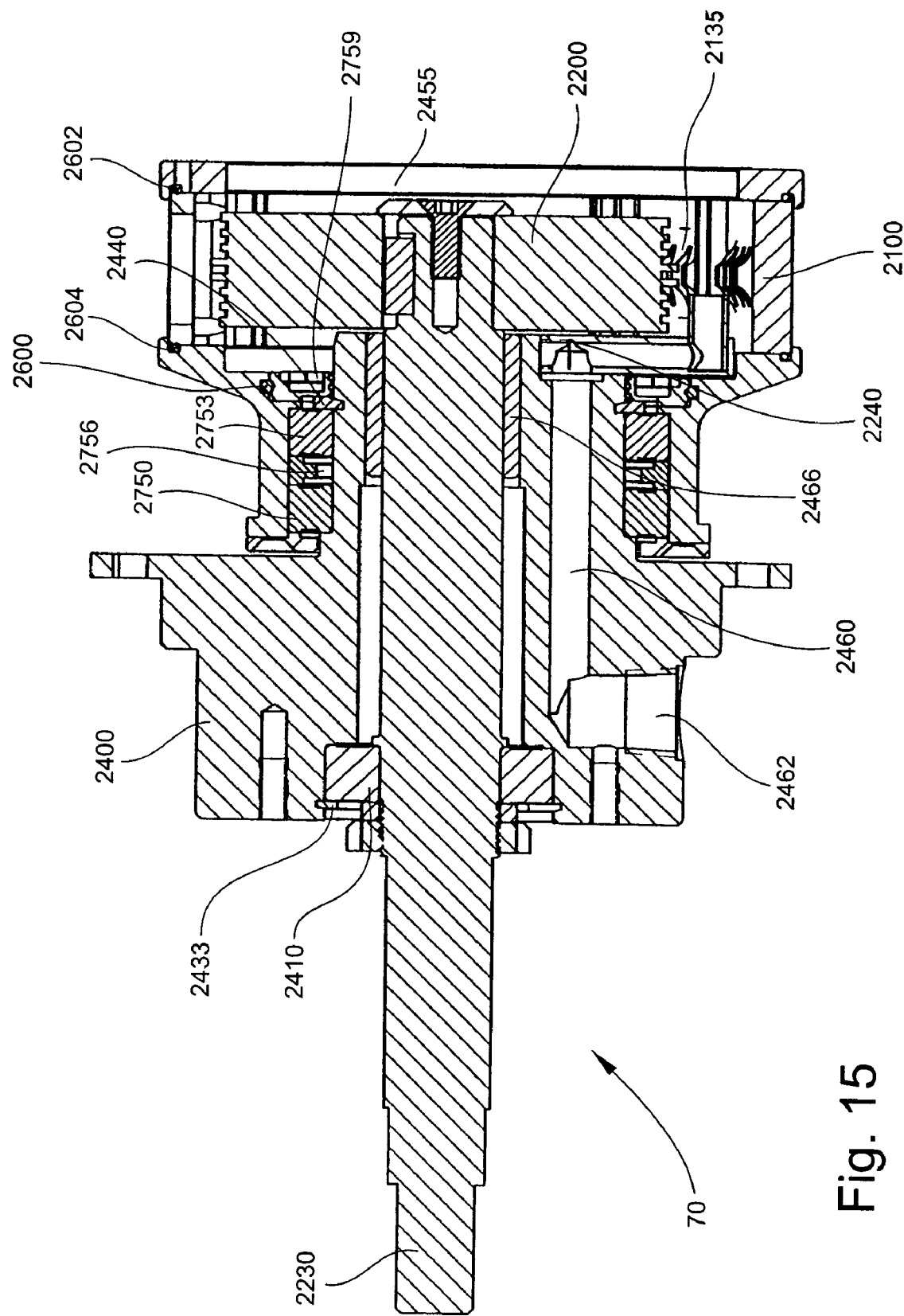
FIG. 15 is a cross-sectional schematic illustration of side view an additive applicator apparatus of the type shown in FIG. 13 taken along lines 15—15 in FIG. 14.

Referring to FIG. 15, there is shown there is shown various components of the applicator apparatus 70. The application system 70 includes a bearing housing 2400 for ball bearings 2410, second ball bearings 2750, third ball bearings 2753, bearing spacer 2756, wind back seal 2759, internal retaining ring 2433, and an external beveled retaining ring 2440. The system also includes a drive shaft 2230, the inner gear 2200 and the outer housing 2100. The gear teeth of the inner surface of the outer housing 2100 that are shown are those that have been shaped so as to avoid churning of the fluid coating formulation (not shown) within the reservoir 2135. A front side plate or disc 2455 maintains a closed system. Inlet port 2240 to the inner cavity 2135 is provided through a passage 2460 from a supply port 2462 from a source (not shown). The applicator system also includes a needle bearing 2466, and a series of nuts, screws or other suitable connection means for maintaining the various components in proper operative arrangement. The various components of the applicator system are manufactured from suitable materials, such as stainless steel, hardened carbon steel, or the like. The application system also includes a series of appropriately located seals, such as o-rings 2600, 2602, 2604.

For the embodiments shown with reference to FIGS. 9 through 15, the amount of additive material applied to the continuous paper web can be controlled with greater precision by holding the paper web firmly down against the outer housing during rotation of that housing. This can be accomplished, for example, by use of a flexible moving belt (not shown). That is, a flexible continuous belt of appropriate width can be positioned so as to form a type of arc that matches the general shape of a portion of the peripheral face of the region of the outer housing where coating formulation is forced from the applicator system. Typically, a flexible belt can be applied under tension between two or more guide posts (not shown) positioned to maintain the belt in place, or by other suitable means. As such, there is provided an arrangement whereby force is applied generally downwards to the outer surface of the paper web so as to counteract forces (e.g., those forces provided by the outward pumping action of the applicator system and centrifugal forces resulting from the high speed rotation of the outer housing) that have an undesirable tendency to force the paper web away from the outer housing during operation of the applicator system.

The types of application systems described with reference to FIGS. 9 through 15 can be used to apply coating formulations of the type having a fluid form; and exemplary coating formulations that have fluid forms can have the form of liquids, syrups, pastes, emulsions, or dispersions or slurries of solid materials within any of the foregoing. Those application systems are particularly useful for applying fluid coating formulations that have a wide range of viscosities, but are particular, coating formulations having viscosities in the range of about 800,000 centipoise to about 1,000,000 centipoise. The application systems can be used to apply coating formulations that are virtually solvent free. For example, a generally liquid-type of fluid coating formulation incorporating pre-polymer components can be applied to a paper web using such an application system, and those components that have been applied at desired locations on the paper web can be cured using suitable radiation curing systems of the type set forth hereinbefore with reference to FIGS. 3 and 4. The application systems also can be used to apply coating formulations of the type set forth in U.S. patent application Ser. No. 10/324,837, filed Dec. 20, 2002. For example, a water-based coating formulation can be applied to a paper web using such an application system, and the formulation that has been applied at desired locations on the paper web can be dried using the suitable microwave curing systems of the type set forth hereinbefore with reference to FIGS. 1, 2 and 4.

Figure 16:
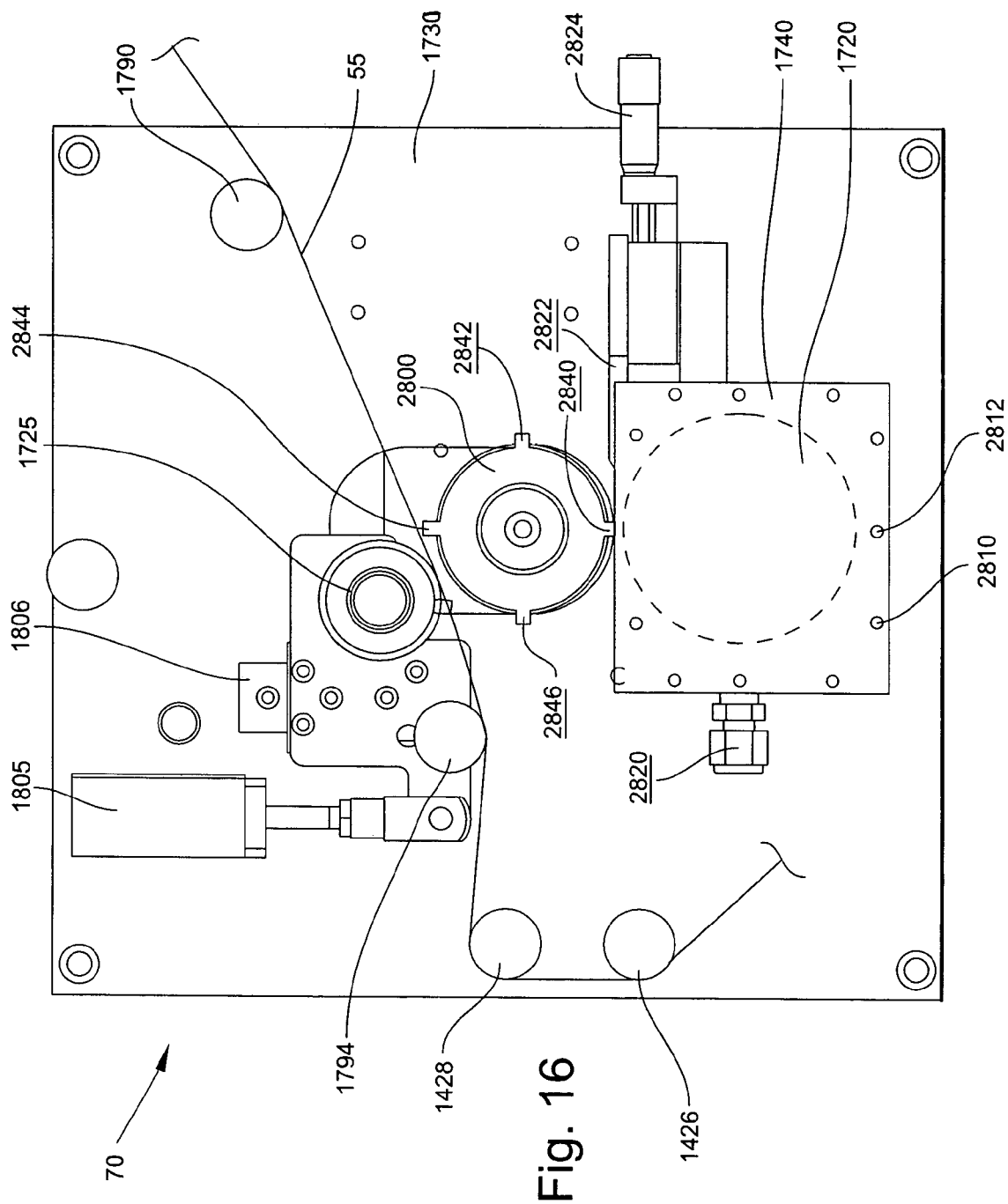
FIG. 16 is a schematic illustration of a representative additive applicator apparatus.

Referring to FIG. 16, there is shown a portion of a cigarette making machine assembly 8; and there also are shown relevant components of another representative additive applicator apparatus 70. Such an applicator 70 is particularly useful for applying to a paper web 55 certain types of viscous additive materials. Such additive materials useful in applications involving cigarette paper include, for example, paste-type formulations of additive materials having viscosities in the range of about 500,000 centipoise to about 2,500,000 centipoise.

Additive applicator 70 is an assembly that includes a pick-up 1720 and a transfer pressure roller 1725 (or back-up roller) mounted on each side of an application roller 2800. Those rollers are mounted through a front roller plate 1730 secured to the front exterior region of a cigarette making machine. Each of a plurality of rollers 1426, 1428, is fixedly mounted to the front roller plate 1730; and those rollers provide guides for a path over which the paper web 55 travels from a bobbin (not shown) to the additive applicator 70 and on to other regions of the cigarette making machine 8.

The pick-up roller 1720 (shown in phantom) is positioned within a reservoir 1740 for the additive material (not shown). The reservoir is maintained in place and secured to the front roller plate 1730 by bolts 2810, 2812 or other suitable connection means. The reservoir 1740 is connected to a source (not shown) of additive material (e.g., a formulation having the form of a paste), through port 2820 near the top region of the reservoir 1740. As such, a source of additive material for the pick-up roller 1720 is provided. If desired, the reservoir can be equipped with devices for monitoring the amount of additive material that is present within that reservoir, such as are described hereinbefore with reference to FIG. 6. Typically, the additive material is supplied through tubing (not shown), such as Tygon-type tubing, that feeds the reservoir 1740 through port 2820. The reservoir of the additive applicator 70 provides a receptable for the additive material to the point of deposit onto the pick-up roller 1720.

A doctor blade 2822 is positioned near the pick-up roller 1720 near the top region of that roller. The doctor blade can be supported in a fixed position relative to the roller, or the doctor blade can be adjustable, for example, by being mounted in so as to be moveable using micrometer 2844. As such, the positioning of the doctor blade 2822 relative to the roll face of roller 1720 can be adjusted. Preferably, the doctor blade is positioned in order that additive material that has been applied to the roll face of the pick-up roller is provided in the desired amount. Typically, the doctor blade is positioned so as to provide a layer of additive material on the roll face of the pick-up roller that has the desired thickness, both along the length and width of the roll face. Typically, the doctor blade 2822 is positioned about 0.001 to about 0.002 inch from the surface of the roll face of pick-up roller 1720. After the additive material on the roll face of the pick-up roller has been provided in the desired amount, that additive material is transferred from the pick-up roller to the face of appropriate die 2840 of applicator roller 2800.

The pick-up roller 1720 preferably is manufactured from a material that can vary, but preferably is manufactured from an elastomeric type material, such as a polyurethane rubber type material, a natural gum rubber, ethylene-propylene diene monomer rubber, or the like. An exemplary pick-up roller has a diameter of about 50 mm to about 100 mm. For the embodiment shown, the pick-up roller rotates counter-clockwise within the reservoir 1740, and additive material within the reservoir is deposited on the surface of that roller.

The pick-up roller 1720 is in roll contact with a plurality of protruding applicator dies 2840, 2842, 2844, 2846 of application roller 2800. The application roller dies preferably are of the general dimension of the pattern of additive material that is desired to be applied to the paper web 55. An exemplary application roller 2800 is manufactured from stainless steel, elastomeric material, or a combination of those materials. For example, larger wheel portion of the applicator roller can be manufactured from stainless steel, and the protruding dies can be manufactured as replaceable inserts manufactured from relatively soft elastomeric materials. Alternatively, the wheel and die component parts of the applicator roller can be manufactured from a hard metal material, such as stainless steel. An exemplary applicator roller has a diameter of about 50 mm to about 100 mm, and typically about 85 mm; and possesses four protruding dies each of about 10 mm to about 15 mm in height, about 22 mm to about 25 mm in width, and about 5 mm to about 8 mm in circumferential length. Other sizes and shapes of the dies, other configurations of the dies on the roller, other roller sizes, and the composition of components used to manufacture the roller, can be a matter of design choice. For the embodiment shown, application roller 2800 rotates clockwise.

In a preferred embodiment, each roller 1725, 2800 is driven independently. For example, one servo drive (not shown) can control the rotation of transfer roller 1725, and a second servo drive (not shown) can control the applicator roller 2800. Controlling operation of the two rollers 1725, 2800 with independent servo system allow for independent control of speeds of those two rollers, and hence, the ability to tightly control the tolerances associated with application of additive material to the paper web using those two rollers. Rollers that are independently adjustable also are preferred in that the degree of touching of the roll faces of the respective rollers during roll contact can be controlled.

In operation, the continuous paper web 55 passes between the roll faces of the transfer roller 1725 and the application roller 2800. As a result of the such contact, the forces experienced by the paper web 55 as it travels between the roll faces of the transfer pressure roller 1725 and the applicator roller 2800, additive material transferred to the surfaces of the protruding dies 2840, 2842, 2844, 2846 from the surface of the applicator roller 1720 is applied to the paper web 55 in a predetermined pattern. As such, the die faces provide a type of off-set printing of additive material to desired locations on the moving paper web. Movement of the transfer pressure roller 1725 can programmed, and as such a microprocessor associated with the operation of the cigarette making machine. Such control by a signal received from the cigarette making machine can allow for retraction of the pressure roller from the paper web 55 so as to not be in contact with the various rollers when the cigarette making machine is not in normal operation; and as such, problems associated with sticking of the paper web to various components of the applicator apparatus 70 are minimized, avoided or prevented.

Figure 17:
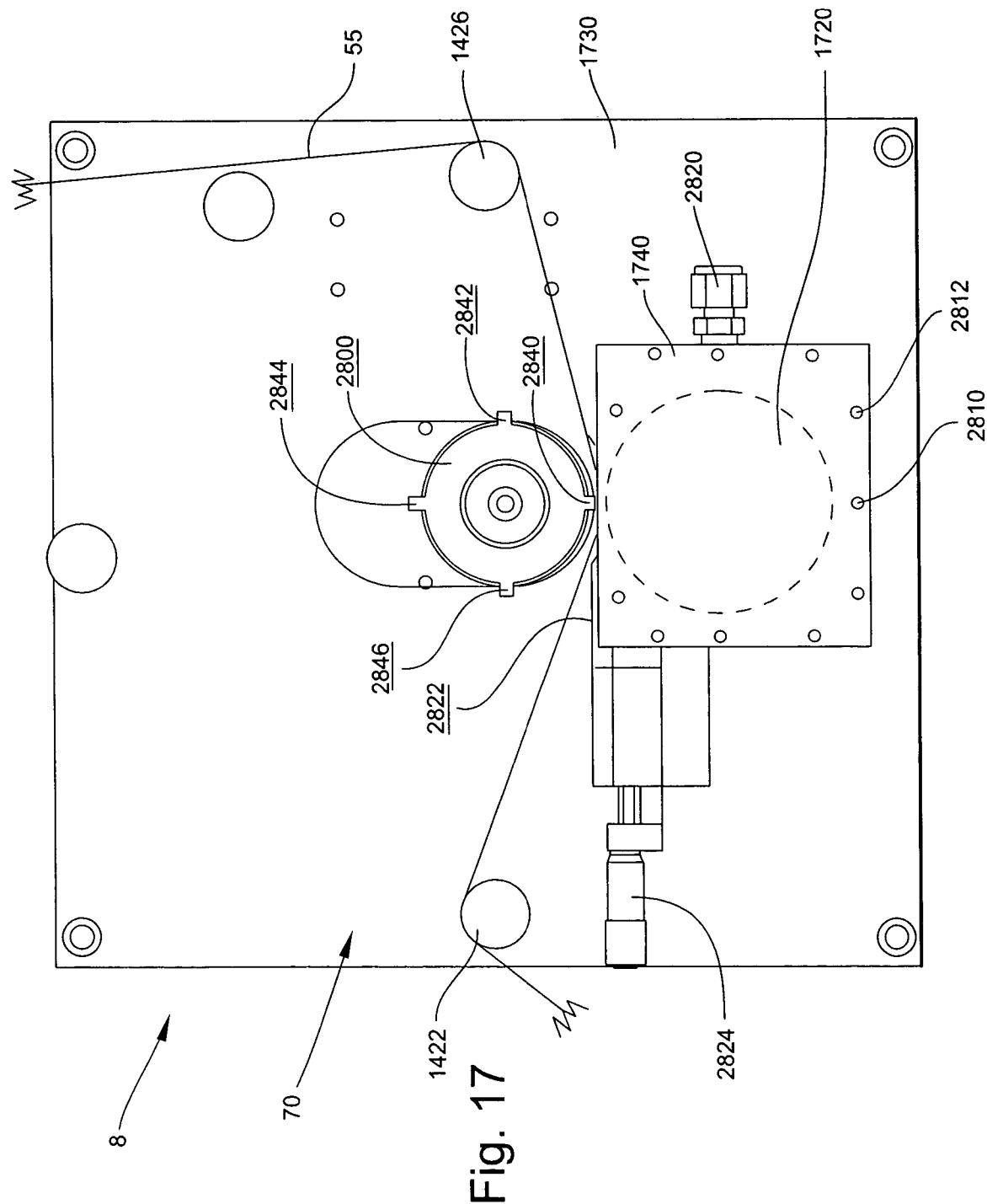
FIG. 17 is a schematic illustration of a representative additive applicator apparatus.

Referring to FIG. 17, there is shown a portion of a cigarette making machine assembly 8; and there also are shown relevant components of another representative additive applicator apparatus 70. Such an applicator 70 is particularly useful for applying to a paper web 55 certain types of viscous additive materials. Such additive materials useful in applications involving cigarette paper include, for example, paste-type formulations of additive materials having viscosities in the range of about 500,000 centipoise to about 2,500,000 centipoise.

Additive applicator 70 is an assembly that includes a pick-up 1720 in roll contact with an applicator roller 2800. Those rollers are mounted through a front roller plate 1730 secured to front exterior of a cigarette making machine. Each of a plurality of rollers 1422, 1426, is fixedly mounted to the front roller plate 1730; and those rollers provide guides for a path over which the paper web 55 travels from a bobbin (not shown) to the additive applicator 70 and on to other regions of the cigarette making machine 8.

The pick-up roller 1720 (shown in phantom) is positioned within a reservoir 1740 for the additive material (not shown). The reservoir is maintained in place and secured to the front roller plate 1730 by bolts 2810, 2812 or other suitable connection means. The reservoir 1740 is connected to a source (not shown) of additive material (e.g., a formulation having the form of a paste), through port 2820 near the top region of the reservoir 1740. As such, a source of additive material for the pick-up roller 1720 is provided. Typically, the additive material is supplied through tubing (not shown), such as Tygon-type tubing, that feeds the reservoir 1740 through port 2820.

A doctor blade 2822 is positioned near the pick-up roller 1720 near the top region of that roller. The doctor blade can be mounted in a fixed position relative to the roll face of the roller. The doctor blade also can be adjustable, for example, by being positioned so as to be movable using a micrometer 2844. As such, the positioning of the doctor blade 2822 relative to the roll face of roller 1720 can be adjusted. Preferably, the doctor blade is positioned in order that additive material that has been applied to the roll face of the pick-up roller is provided in the desired amount. Typically, the doctor blade is positioned so as to provide a layer of additive material on the roll face of the pick-up roller that has the desired thickness, both along the length and width of the roll face. Typically, the doctor blade 2822 is positioned about 0.001 to about 0.002 inch from the surface of the roll face of pick-up roller 1720. After the additive material on the roll face of the pick-up roller has been provided in the desired amount, that additive material is transferred from the pick-up roller to the face of appropriate location on the paper web 55.

The pick-up roller 1720 preferably is manufactured from a material that can vary, can be a soft material or a hard material, but preferably is manufactured from an elastomeric type material, such as a polyurethane rubber type material, or other suitable material. An exemplary pick-up roller is described previously with reference to FIG. 16. The pick-up roller rotates clockwise (for the embodiment shown) within the reservoir 1740, and additive material within the reservoir is deposited on the surface of the roll face of that roller.

The pick-up roller 1720 is in roll contact with protruding applicator cams 2840, 2842, 2844, 2846 of application roller 2800. The application roller cams are of the general dimension of the pattern of additive material that is desired to be applied to the paper web 55. An exemplary application roller 2800 is described previously with reference to FIG. 16. For the embodiment shown, application roller 2800 rotates counter-clockwise.

In a preferred embodiment, each roller 1725, 2800 is driven independently. For example, one servo drive (not shown) can control the rotation of transfer roller 1725, and a second servo drive (not shown) can control the applicator roller 2800. Controlling operation of the two rollers 1725, 2800 with independent servo system allow for independent control of speeds of those two rollers, and hence, the ability to tightly control the tolerances associated with application of additive material to the paper web using those two rollers.

In operation, the continuous paper web 55 passes between the roll faces of the pick-up roller 1720 and the application roller 2800. As a result of the contact experienced by the paper web 55 as it travels between pick-up roller 1720 and the applicator roller 2800, additive material transferred to the surfaces of the protruding cams 2840, 2842, 2844, 2846 from the surface of the applicator roller 1720 is applied to the paper web 55 in a predetermined pattern. That is, the protruding applicator roller cams on the side of paper web, opposite the pick-up roller and the additive material, cause periodic deflection of the paper web toward the pick-up roller; and as such, additive material is transferred from the surface of the pick-up roller to the paper web in a controlled manner as a result of the camming action of the applicator roller. The paper web 55 is routed in a manner such that the paper web has a tendency to move upwards and away from the surface of the applicator pick-up roller when the various cams are not deflecting that paper web downwards. As a result, control of the location of the application of additive material on the paper web can be carried out.

Figure 18:
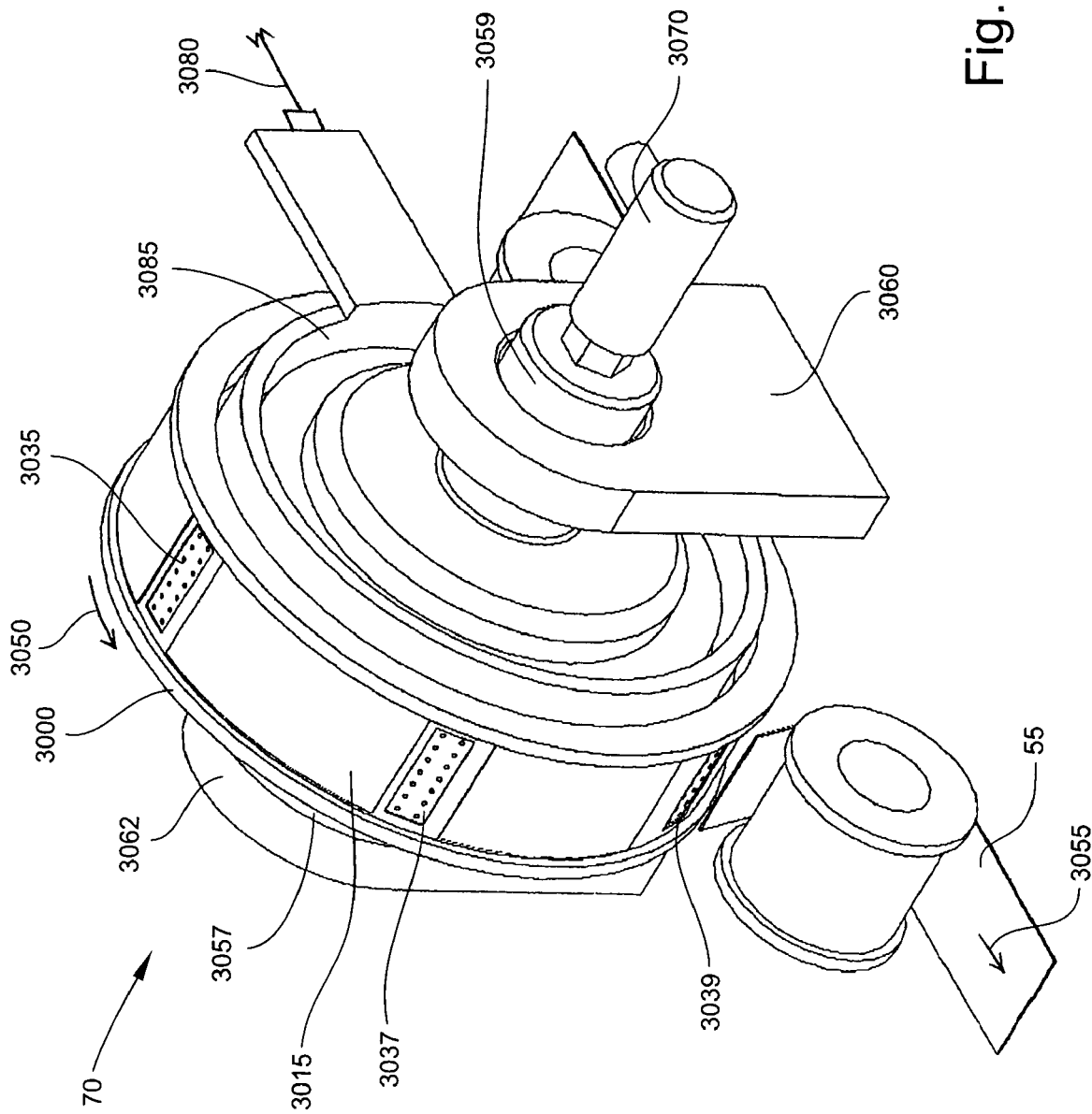
FIG. 18 is a schematic illustration of a representative additive applicator apparatus.

Referring to FIG. 18, there are shown relevant components of a portion of yet another representative additive applicator apparatus 70. Such an applicator can be used to provide coating formulation to the moving paper web 55 (partially shown and cut away) in a non-contact manner. Such an applicator can be used to apply additive formulation that is ejected onto the paper web, such as is set forth hereinbefore with reference to FIGS. 3 and 4. Appropriate cigarette making assemblies (not shown) can be equipped with one applicator of such a type, or two or more applicators of such a type can be employed in series.

The applicator apparatus 70 possesses an outer housing 3000 having a generally wheel-like shape. The outer housing has a roll face 3015. A plurality of printheads 3035, 3037, 3039 are arranged at pre-determined locations on the roll face 3015. Preferred printheads are ink jet types of printheads, for example, of the type described previously with reference to FIGS. 3 and 4.

For the embodiment shown, the outer housing is adapted to rotate counter-clockwise; in the direction indicated by arrow 3050. A strip of paper web 55 travels over at least the top surface of the roll face 3015 of the housing 3000, in the direction indicated by arrow 3055. The desired path of travel of the paper web 55 is dictated by suitably positioned idler rollers 3057, 3059, or other appropriate means. Alternatively, for an embodiment that is not shown, the path of travel of the paper web 55 can be underneath of the housing 3000 and can be in the same overall direction as arrow 3055; and for such an embodiment, the housing 3000 is rotated in the direction opposite of arrow 3050. Thus, for the two embodiments so described, additive material can be applied to either side of a continuous strip of paper web.

Most preferably, the printheads 3035, 3037, 3039 are recessed slightly from the surface of the outer roll face of the housing in order that the paper web traveling over the roll face does not come into contact with those printheads. As such, non-contact application of coating formulation (not shown) to the paper web can be carried out.

The wheel-like housing 3000 is supported on by a suitable frame, such as is provided by front support 3060 and back support 3062. Each support is located on either side of the housing. Each support incorporates suitable bearing assemblies (not shown) or other suitable means for allowing the housing to rotate relative to those supports.

The housing is supplied with additive material (not shown) from a suitable supply source (not shown) using a rotary union 3070 or other suitable fluid material supply means. Suitable unions are those available as Deublin ⅛" to ½" Air-Hydraulic Unions from Deublin Company. As such, additive material is supplied to the inner region of the housing 3000, and thereafter, the additive material can be supplied to the printheads 3035, 3037, 3039.

Control of the rotation of the housing and of the operation of the various printheads is provided from a remote location (not shown) through wire 3080 or other appropriate connection means that are in turn connected to a slip ring 3085. Suitable slip rings are those high-speed slip rings available from International Instruments, Inc. As such, during rotation of the housing, electronic control of the printheads can be achieved, and additive material from the rotary union also can be supplied to the various printheads.

In operation, the paper web 55 is advanced over the top region of the applicator roll face 3015. The applicator is rotated, and is rotated at a rate such that application of additive material from each individual printhead provides the desired pattern on the paper web in the desired location on that paper web. As such, ejection of additive material is applied as both the applicator nozzles and the paper web both are moving at high rate of speed, and for the most highly preferred embodiments, at essentially identical speeds. Thus, non-contact ink jet types of technologies can be used to effectively apply ejected additive materials to pre-determined locations and in pre-determined patterns onto a continuous strip of paper web moving at a very high rate of speed.

The various aspects of the present invention, whether employed individually or in some combination, offer several advantages and improvements to conventional systems and methods for cigarette manufacture. The present invention allows a cigarette manufacturer to apply predetermined and discrete amounts of an additive material to a continuous advancing strip of a paper web at desired locations on that paper web, during the manufacture of a continuous cigarette rod using conventional types of cigarette making equipment and methodologies. Of particular interest are bands of additive material that are positioned perpendicularly to the longitudinal axis of the paper web, and those bands can be positioned so as to extend across less than the total width of that paper web. As such, the location of additive material can be controlled so as to not be located in the lap zone of the continuous cigarette rod (e.g., where the side seam adhesive is applied). Thus, for example, a continuous paper web having a width of about 27 mm and used to provide a cigarette rod having a circumference of about 24.5 mm (i.e., such that the lap zone has a width of about 2.5 mm) can have a band applied to that web such that the band is not located within the lap zone where side seam adhesive is applied; and as such, such a band can have a transversely extending length of about 22 mm to about 24.5 mm. The present invention allows a cigarette manufacturer to apply to paper webs additive formulations that have a wide range of chemical and physical properties, and that are provided for application in a wide variety of forms (e.g., a wide range of viscosities). In addition, the present invention allows a manufacturer of cigarettes to apply additive materials to paper webs without adversely affecting the physical properties and integrity of that paper web to any significant degree. Registration of patterns (e.g., bands) applied to the paper wrapping materials of tobacco rods promotes the ability of cigarette manufacturers to provide consistent quality cigarette rods, and the ability to control the properties of cigarettes through on-line production techniques offers advantages over cigarettes that are manufactured using pre-printed paper wrapping materials. The present invention also provides a manufacturer of cigarettes with the ability to ensure the production of high quality cigarettes with applied patterns registered in the desired locations of those cigarettes.

The paper wrapping material that is further processed to provide the patterned wrapping material can have a wide range of compositions and properties. The selection of a particular wrapping material will be readily apparent to those skilled in the art of cigarette design and manufacture. Typical paper wrapping materials are manufactured from fibrous materials, and optional filler materials, to form so-called "base sheets." Wrapping materials of the present invention can be manufactured without significant modifications to the production techniques or processing equipment used to manufacture those wrapping materials.

Typical wrapping material base sheets suitable for use as the circumscribing wrappers of tobacco rods for cigarettes have basis weights that can vary. Typical dry basis weights of base sheets are at least about 15 g/m$^2$, and frequently are at least about 20 g/m$^2$; while typical dry basis weights do not exceed about 80 g/m$^2$, and frequently do not exceed about 60 g/m$^2$. Many preferred wrapping material base sheets have basis weights of less than 50 g/m$^2$, and even less than 40 g/m². Certain preferred paper wrapping material base sheets have basis weights between about 20 g/m² and about 30 g/m².

Typical wrapping material base sheets suitable for use as the circumscribing wrappers of tobacco rods for cigarettes have inherent porosities that can vary. Typical base sheets have inherent porosities that are at least about 5 CORESTA units, usually are at least about 10 CORESTA units, often are at least about 15 CORESTA units, and frequently are at least about 20 CORESTA units. Typical base sheets have inherent porosities that are less than about 200 CORESTA units, usually are less than about 150 CORESTA units, often are less than about 85 CORESTA units, and frequently are less than about 70 CORESTA units. A CORESTA unit is a measure of the linear air velocity that passes through a 1 cm² area of wrapping material at a constant pressure of 1 centibar. See, CORESTA Publication ISO/TC0126/SC I N159E (1986). The term "inherent porosity" refers to the porosity of that wrapping material itself to the flow of air. A particularly preferred paper wrapping material base sheet is composed of wood pulp and calcium carbonate, and exhibits an inherent porosity of about 20 to about 50 CORESTA units.

Typical paper wrapping material base sheets suitable for use as the circumscribing wrappers of tobacco rods for cigarettes incorporate at least one type of fibrous material, and can incorporate at least one filler material, in amounts that can vary. Typical base sheets include about 55 to about 100, often about 65 to about 95, and frequently about 70 to about 90 percent fibrous material (which most preferably is a cellulosic material, such as wood pulp); and about 0 to about 45, often about 5 to about 35, and frequently about 10 to about 30 percent filler material (which most preferably is an inorganic material, such as calcium carbonate); based on the dry weight of that base sheet. Base sheets can have various additive materials incorporated therein, and the base sheets can be physically treated (e.g., the base sheets can be electrostatically perforated). Exemplary fibrous materials, filler materials, additives and physical treatments of papers are set forth in U.S. patent application Ser. No. 10/303,648, filed Nov. 25, 2002 and Ser. No. 10/324,837, filed Dec. 20, 2002, which are incorporated herein by reference in their entireties. See, also, US Patent Application 2003/0089377 to Hajaligol et al.

Typical paper wrapping materials that can be used in carrying out the present invention are manufactured under specifications directed toward the production of a wrapping material having an overall generally consistent composition and physical parameters. For those types of wrapping materials, the composition and parameters thereof preferably are consistent when considered over regions of each of the major surfaces of those materials. However, typical wrapping materials tend to have a "two-sided" nature, and thus, there can be changes in the composition and certain physical parameters of those materials from one major surface to the other.

Though less preferred, the wrapping material can be manufactured using a paper making process adapted to provide a base web comprising multiple layers of cellulosic material. See, U.S. Pat. No. 5,143,098 to Rogers et al.

Much less preferred paper wrapping materials can have compositions and/or properties that differ over different regions of each of their major surfaces. The wrapping material can have regions of increased or decreased porosity provided by control of the composition of that material, such as by controlling the amount or type of the filler. The wrapping material can have regions of increased or decreased air permeability provided by embossing or perforating that material. See, for example, U.S. Pat. No. 4,945,932 to Mentzel et al. The wrapping material can have regions (e.g., pre-determined regions, such as bands) treated with additives, such as certain of the aforementioned salts. However, wrapping materials having a patterned nature are not necessary when various aspects of the present invention are used to apply patterns to those wrapping materials using on-line pattern application techniques.

Paper wrapping materials suitable for use in carrying out the present invention (e.g., suitable for use as wrapping materials for smokable materials and for the manufacture of cigarette rods) are commercially available. Representative cigarette paper wrapping materials have been available as Ref. Nos. 419, 454, 456, 460 and 473 Ecusta Corp.; Ref. Nos. Velin 413, Velin 430, VE 825 C20, VE 825 C30, VE 825 C45, VE 826 C24, VE 826 C30 and 856 DL from Miquel; Tercig LK18, Tercig LK24, Tercig LK38, Tercig LK46 and Tercig LK60 from Tervakoski; and Velin Beige 34, Velin Beige 46, Velin Beige 60, and Ref. Nos. 454 DL, 454 LV, 553 and 556 from Wattens. Exemplary flax-containing cigarette paper wrapping materials have been available as Grade Names 105, 114, 116, 119, 170, 178, 514, 523, 536, 520, 550, 557, 584, 595, 603, 609, 615 and 668 from Schweitzer-Mauduit International. Exemplary flax-containing cigarette paper wrapping materials having relatively high levels of chemical additives have been available as Grade Names 512, 525, 527, 540, 605 and 664 from Schweitzer-Mauduit International. Exemplary wood pulp-containing cigarette paper wrapping materials have been available as Grade Names 404, 416, 422, 453, 454, 456, 465, 466 and 468 from Schweitzer-Mauduit International. Exemplary wood pulp-containing cigarette paper wrapping materials having relatively high levels of chemical additives have been available as Grade Names 406 and 419 from Schweitzer-Mauduit International.

The composition of the additive material or coating formulation can vary. Generally, the composition of the coating is determined by the ingredients of the coating formulation. Preferably, the coating formulation has an overall composition, and is applied in a manner and in an amount, such that the physical integrity of the wrapping material is not adversely affected when the coating formulation is applied to selected regions of the wrapping material. It also is desirable that components of the coating formulation not introduce undesirable sensory characteristics to the smoke generated by a smoke article incorporating a wrapping material treated with that coating formulation. Thus, suitable combinations of various components can act to reduce the effect of coatings on sensory characteristics of smoke generated by the smoking article during use.

A coating formulation can have a liquid, syrup or paste form, and is applied as such. Depending upon the actual ingredients that are combined with the solvent, the coating formulation has the form of a liquid type of solution or of a liquid having solid materials dispersed therein. Certain other optional ingredients also are dissolved, dispersed or suspended in that formulation. Additionally, optional filler material also is dispersed within that formulation. Preferably, the filler material is essentially insoluble and essentially chemically non-reactive with the solvent, at least at those conditions at which the formulation is employed. For example, the material does not undergo significant undesirable chemical reaction when subjected to heat or radiation during the process conditions of the present invention.

The coating formulation most preferably includes a material that provides a film or otherwise acts as a film-forming agent. Suitable combinations of various film-forming agents also can be employed. Materials in the form of films have a tendency to adhere to a paper substrate, maintain other components of the coating formulations in place, and have the ability to lower the inherent porosity of the paper substrate and otherwise have an effect upon the performance characteristics of a cigarette incorporating such a treated paper.

In certain aspects of the present invention, the film-forming agent most preferably is a polymeric material or resin; and such a film-forming agent is applied to the desired location on the surface of a cigarette paper substrate within a solvent or liquid carrier. As such, a solution or dispersion of a coating formulation is applied to the substrate, and after removal of solvent or liquid carrier, the film-forming agent dries to form a film on that substrate. Exemplary polymeric film-forming agents include water soluble polymeric materials, such as starches.

In certain aspects of the present invention, the film-forming agent is applied to the desired location on the surface of a cigarette paper substrate as part of a coating formulation that is virtually absent of a solvent or liquid carrier (e.g., the coating formulation can be characterized as being 100 percent solids in nature). Certain coating formulations that have been applied to the desired location on the surface of a cigarette paper substrate using contact application techniques. Contact application techniques involve the use of the roll applicator techniques set forth hereinbefore, or other suitable techniques, such as screen printing types of techniques. Screen printing technology is described in US Patent Application 2001/0042456 to Kamen et al., which is incorporated herein by reference. Suitable non-contact application techniques (e.g., ink jet type printing techniques) also can be used to apply coating formulations to the paper substrate. Then, those formulations are subjected to exposure to an effective amount of radiation in order to polymerize (e.g., cross-link) certain components of those formulations, and to ensure fixing or adherence of the components of those formulations to the desired locations on the paper substrate. As such, the polymerizable components of those coating formulations are subjected to electromagnetic radiation capable of initiating photochemical reactions. Effective initiation of chemical reactions between those polymerizable components that have an overall liquid form results in polymerization (e.g., cross-linking reactions) of those components, and a resultant curing or solidification of polymerizable components.

Exemplary radiation curable polymerizable compositions are those compositions that comprise free radical polymerizable components (e.g., free radical addition polymerizable components), and most preferably, compounds having terminal ethylenic unsaturation that are overall liquid in nature under those types of conditions under which those polymerizable compositions are handled and used. Such exemplary compositions are referred to as "pre-polymer compositions," and typically comprise monomeric diluents that can be combined with oligomers, preformed polymers, or combinations of oligomers or preformed polymers. A monomeric diluent is a lower molecular weight compound (e.g., a lower molecular weight ethylenically unsaturated compound) that is a reactant in a polymerization reaction directly upon initiation by free radicals generated upon absorption of radiation. Typically, an exemplary monomeric diluent is comprised of at least one monomeric compound having at least one terminal ethylenically unsaturated moiety. Alternatively, pre-polymer compositions can comprise condensation polymerizable components and suitable cross-linking agents. For example, pre-polymer compositions comprising mixtures of cellulosic-type materials and epoxides can be employed.

Representative types of monomic compounds, diluents, oligomers and preformed polymers, techniques for applying those materials to substrates, and techniques for curing those materials using radiation, are set forth in U.S. Pat. No. 5,563,644 to Isganitis et al. and U.S. Pat. No. 6,232,361 to Laksin et al.; PCT WO 00/56554 and PCT WO 02/08309; US Patent Applications 2001/0042456 to Kamen et al.; 2002/0004132 to Banovetz et al.; 2003/0004223 to Khudyakov et al.; 2003/0031843 to Wu et al.; 2003/0032692 to Mejiritski et al.; 2003/0064201 to Xing et al.; 2003/0069363 to Greenblatt et al. and 2003/0073755 to Garnett et al.; and US Stat. Inv. Reg. H1517 to Erickson et al.; which are incorporated herein by reference.

Suitable radiation curable materials are available commercially from sources such as Sartomer Company, Inc., Sun Chemical Corporation (e.g., as products designated as Sunbeam LE); Rohm & Haas Company and Liofol Company. Exemplary pre-polymer components that are suitable for providing coatings on paper webs incorporate polymerized ethylene-type materials, polymerized propylene-type materials, polymerized ethylene vinylacetate-type formulations, polymerized ethylene acrylic acid-type formulations, polymerized ethylene methacrylic acid-type formulations, polyvinyl alcohol formulations, polystyrene formulations, polyethylene formulations, polypropylene formulations, and the like. Exemplary pre-polymer components that are suitable for providing coatings on paper webs incorporate suitable cross-linking agents with low molecular weight polyesters, low molecular weight cellulosics (e.g., ethylcellulose or nitrocellulose), low molecular weight polyurethanes, low molecular weight nylons, and the like.

Coating formulations incorporating pre-polymer compositions can incorporate at least one initiator. Initiators are used when such coating formulations are cured using uv radiation, and optionally can be used to some degree when such coating formulations are cured using electron beam radiation. Initiators can be characterized as free radical or cationic. Examples suitable initiators are the peroxide-type initiators that include the diacyls, peroxydicarbonates, monoperoxycarbonates, peroxyketals, peroxyesters, dialkyl peroxides and hydroperoxides. Initiators are commercially available, such as Luperox F, Luperox DC, Luperox 130, Luperox 801 Luperox 230 and Luperox 231 from SpecialChem S. A. The amount of initiator that is employed can vary, and is dependent upon factors such as the pre-polymer material that is subjected to radiation for cure. Typically, for uv curable pre-polymer compositions, the amount of initiator ranges from about 0.5 to about 6 percent, and often about 1 to about 3 percent, based on the weight of the pre-polymer composition within the coating formulation. Numerous initiators are set forth in those references that has been cited hereinbefore, and that disclose various radiation curable monomic compounds, diluents, oligomers and preformed polymers, techniques for applying those materials to substrates, and techniques for curing those materials using radiation. Certain water-based uv curable systems using uv photoinitiators are set forth in U.S. Pat. No. 5,623,001 to Figov, which is incorporated herein by reference.

Certain additive materials can be applied to the wrapping material in the form of a coating formulation that is in a so-called "solid polymer" form. Such coating formulations can be applied using contact application techniques or non-contact application (e.g., electrostatic deposition) techniques. That is, film-forming materials, such as ethylene vinyl acetate copolymers and certain starches, can be mixed with other components of the coating formation, and applied to the wrapping material without the necessity of dissolving those film-forming materials in a suitable solvent. Typically, solid polymer coating formulations are applied at elevated temperatures relative to ambient temperature; and the viscosities of the film-forming materials of those heated coating formulations typically have an extremely wide range of viscosities. Certain preferred heated solid polymer coating formulations have viscosities of about 1000 to about 5000 centipoise. Other exemplary components that are suitable for providing coatings for paper web are those that incorporate low molecular weight polymers and resins. Examples of polymers and resins include polyesters (e.g., polyester terephlalate), cellulosics (e.g., ethylcellulose and nitrocellulose), polyolefins (e.g., polyethylene and polypropylene), polyurethanes, nylons, polyvinyl alcohol, polyaromatics (e.g., polystyrene), polyethylene vinylacetate, polyethylene acrylic acid, polyethylene methacrylic acid, and the like.

Certain coating formulations that are used in carrying out certain aspects of the present invention can incorporate liquid solvents, such as a liquid having an aqueous character as is set forth in Ser. No. 10/324,837, filed Dec. 20, 2002. However, typical coating formulations useful for carrying out certain aspects of the present invention (i.e., those aspects that relate to the use a radiation curable coating formulations or electrostatic deposition formulations) contain less than about 15 percent, preferably less than about 10 percent, more preferably less than about 5 percent, and most preferably about 0 percent, solvent or liquid carrier, based on the total weight of the coating formulation just prior to application. Representative solvents and liquid carriers are liquids having aqueous characters, and can include relatively pure water; or non-aqueous liquid solvents, such as ethanol, n-propyl alcohol, iso-propyl alcohol, ethyl acetate, n-propyl acetate, iso-propyl acetate, toluene, and the like. It is preferred that the radiation curable coating formulation contain a relatively low amount of solvent or liquid carrier; it is highly preferred that such a coating formulation be essentially absent of solvent or liquid carrier; and it is most highly preferred that the coating formulation be virtually free of (i.e., not contain any) solvent or liquid carrier. Exemplary solvents and liquid carriers, and representative amounts of those solvents and liquid carriers used for coating formulations containing relatively high levels of those solvents and liquid carriers, are set forth in U.S. patent application Ser. No. 10/303,648, filed Nov. 25, 2002 and Ser. No. 10/324,837, filed Dec. 20, 2002.

The coating formulation also can include a filler material. Exemplary filler materials can be the essentially water insoluble types of filler materials of the type described in U.S. patent application Ser. No. 10/303,648, filed Nov. 25, 2002. See, also, US Patent Application 2003/0089377 to Hajaligol et al. Preferred filler materials have a finely divided (e.g., particulate) form. Typical fillers are those that have particle sizes that are less than about 3 microns in diameter. Typical particle sizes of suitable fillers range from about 0.3 micron to 2 microns in diameter. The filler materials can have a variety of shapes. Exemplary filler materials are those that are composed of inorganic materials including metal particles and filings, calcium carbonate (e.g., precipitated-type fillers, including those having a prismatic form), calcium phosphate, clays (e.g., attapulgite clay), talc, aluminum oxide, mica,. magnesium oxide, calcium sulfate, magnesium carbonate, magnesium hydroxide, calcium phosphate, aluminum oxide and titanium dioxide. See, for example, the types of filler materials set forth in U.S. Pat. No. 5,878,753 to Peterson et al. Representative calcium carbonate fillers are those available as Albacar PCC, Albafil PCC, Albaglos PCC, Opacarb PCC, Jetcoat PCC and Calopake F PCC from Specialty Minerals, Inc. Exemplary filler materials also can be composed of natural or synthetic organic materials including starches, modified starches and flours (e.g., rice flour), particles of polyvinyl alcohol, particles of tobacco (e.g., tobacco dust), and other like materials. The filler material also can be fibrous cellulosic materials. See, for example, U.S. Pat. No. 5,417,228 to Baldwin et al. Although less preferred, alternate fillers can include carbon-based materials (e.g., graphite-type materials, carbon fiber materials and ceramics), metallic materials (e.g., particles of iron), and the like. The filler material also can be a water soluble salt (e.g., potassium chloride, sodium chloride, potassium citrate, sodium citrate, calcium chloride or magnesium chloride). Exemplary salts are set forth in U.S. Pat. No. 4,622,983 to Mathews; U.S. Pat. No. 4,941,485 to Perfetti et al; and U.S. Pat. No. 5,220,930 to Gentry.

The coating formulations can incorporate other ingredients in addition to the aforementioned coating materials; and those ingredients can be dispersed or suspended within the coating formulation. Those other ingredients can be employed in order to provide specific properties or characteristics to the wrapping material. Those ingredients can be preservatives (e.g., potassium sorbate), humectants (e.g., ethylene glycol and propylene glycol), pigments, dyes, colorants, bum promoters and enhancers, burn retardants and inhibitors, plasticizers (e.g., dibutyl phthalate, polyethylene glycol, polypropylene glycol and triacetin), sizing agents, syrups (e.g., high fructose corn syrup), flavoring agents (e.g., ethyl vanillin and caryophyllene oxide), sugars (e.g., rhamnose), flavor precursors, hydrate materials, such as metal hydrates (e.g., borax, magnesium sulfate decahydrate, sodium silicate pentahydrate and sodium sulfate decahydrate), viscosity reducing agents (e.g., urea), and the like. Nanoparticle materials can be incorporated into such coating formulations, such as is set forth in U.S. patent application Ser. No. 10/342,618, filed Jan. 15, 2003, which is incorporated herein by reference. If desired, the coating formulations can contain dyes or pigments for aesthetic purposes (e.g., those components can provide white, black, gray, blue or brown colors) or to facilitate automated inspection of paper wrapping materials to which the formulations are applied.

For a coating formulation that employs a liquid solvent or carrier, the amount of such solvent or liquid carrier typically makes up about at least about 20 percent of the formulation, and often makes up at least about 30 percent of the formulation, based on the weight of the formulation. Most preferably, such a coating formulation includes at least about 0.5 percent film-forming agent, usually at least about 1 percent film-forming agent, and often at least about 2 percent film-forming agent, based on the total weight of that formulation. Typically, the amount of film-forming agent within such a coating formulation does not exceed about 60 percent, usually does not exceed about 50 percent, and often does not exceed about 40 percent, based on the total weight of that formulation. Typically, the coating formulation includes at least about 3 percent of the optional filler material, usually at least about 5 percent filler material, and often at least about 10 percent filler material, based on the total weight of that formulation. Typically, the amount of optional filler material within the coating formulation does not exceed about 35 percent, usually does not exceed about 30 percent, and often does not exceed about 25 percent, based on the total weight of that formulation.

For a coating formulation that employs a radiation curable pre-polymer formulation, the relative amounts of the various components of that formulation can vary. Most preferably, such a coating formulation includes at least about 5 percent material that is cured to provide the film-forming agent, usually at least about 10 percent of that agent, and often at least about 15 percent of that agent, based on the total weight of that formulation. The material that is cured to form the film-forming agent can comprise approximately all (i.e., about 100 weight percent) of the coating formulation. Typically, the amount of film-forming agent within such a coating formulation does not exceed about 30 percent, usually does not exceed about 20 percent, and often does not exceed about 15 percent, based on the total weight of that formulation. Typically, the coating formulation includes at least about 50 percent of the optional filler material, usually at least about 60 percent filler material, and often at least about 70 percent filler material, based on the total weight of that formulation. Typically, the amount of optional filler material within the coating formulation does not exceed about 80 percent, usually does not exceed about 50 percent, and often does not exceed about 40 percent, based on the total weight of that formulation.

For a coating formulation that is applied using electrostatic deposition techniques, the relative amounts of the various components of that formulation can vary. Most preferably, such a coating formulation includes at least about 30 percent film-forming agent, usually at least about 50 percent film-forming agent, and often at least about 80 percent film-forming agent, based on the total weight of that formulation. Typically, the amount of film-forming agent within such a coating formulation can make up all of the formulation, but typically does not exceed about 95 percent, and often does not exceed about 90 percent, of the total weight of that formulation. Typically, the coating formulation includes at least about 5 percent of the optional filler material, usually at least about 10 percent filler material, and often at least about 20 percent filler material, based on the total weight of that formulation. Typically, the amount of optional filler material within the coating formulation does not exceed about 70 percent, and usually does not exceed about 50 percent, based on the total weight of that formulation.

The amounts of other optional components of the various coating formulations can vary, depending upon factors such as the type of coating formulation that is employed and the desired properties of the coated substrate. When employed, the amount of plasticizer often ranges from about 0.5 percent to about 5 percent, preferably about 2 to about 3 percent, based on the total weight of the formulation. When employed, the amount of humectant often ranges from about 1 percent to about 5 percent, preferably about 2 to about 3 percent, based on the total weight of the formulation. When employed, the amount of wetting agent often ranges from about 0.5 percent to about 2 percent, preferably about 0.8 to about 1 percent, based on the total weight of the formulation. When employed, the amount of preservative often ranges from about 0.01 percent to about 0.3 percent, preferably about 0.5 percent, based on the total weight of the formulation. When employed, the amount of burn chemical often ranges from about 1 percent to about 15 percent, preferably about 5 to about 10 percent, based on the total weight of the formulation. When employed, the amount of viscosity reducing agent often ranges from about 1 percent to about 10 percent, preferably about 2 percent to about 6 percent, based on the total weight of the formulation. When employed, the amount of metal hydrate often ranges from about 3 percent, usually at least about 5 percent, and often at least about 10 percent, based on the total weight of that formulation; but the amount of metal hydrate usually does not exceed about 35 percent, often does not exceed about 30 percent, and frequently does not exceed about 25 percent, based on the total weight of that formulation.

Flavoring agents can be incorporated into the coating formulations. Preferably, the flavoring agents exhibit sensory characteristics that can be described as having notes that are sweet, woody, fruity, or some combination thereof. The flavoring agents preferably are employed in amounts that depend upon their individual detection thresholds. Typically, the flavoring agents are employed in sufficient amounts so as to mask or ameliorate the off-tastes and malodors associated with burning paper. Combinations of flavoring agents (e.g., a flavor package) can be employed in order to provide desired overall sensory characteristics to smoke generated from the smoking articles incorporating those flavoring agents. Most preferably, those flavoring agents are employed in amounts and manners so that the sensory characteristics of those flavoring agents are hardly detectable; and those flavoring agents do not adversely affect the overall sensory characteristics of smoking article into which they are incorporated. Preferred flavoring agents can be incorporated into printing formulations, have low vapor pressures, do not have a tendency to migrate or evaporate under normal ambient conditions, and are stable under the processing conditions experienced by wrapping materials of the present invention. Exemplary flavoring agents that provide sweet notes include ethyl vanillin, vanillin, heliotropin, methylcyclopentenolone; and those flavoring agents typically are employed in amounts of 0.001 to about 0.01 percent, based on the total weight of the coating formulation into which they are incorporated. An exemplary flavoring agent that provides woody notes includes caryophyllene oxide; and that flavoring agent typically is employed in amounts of 0.2 to about 0.6 percent, based on the total weight of the coating formulation into which it is incorporated. Exemplary flavoring agents that provide fruity notes include ketones such as 4-hydroxphenyl-2-butanone and lactones such as gamma-dodecalactone; and those flavoring agents typically are employed in amounts of 0.001 to about 0.1 percent, based on the total weight of the coating formulation into which they are incorporated.

One suitable formulation for an additive material for a paper web incorporates a water-based coating that is employed in liquid form, and that coating is an adhesive formulation of R. J. Reynolds Tobacco Company used as a cigarette seam adhesive and designated as CS-1242. The CS-1242 formulation is a water emulsion-based adhesive consisting of about 87 to about 88 weight percent ethylene vinyl acetate copolymer emulsion sold under the designation Resyn 32-0272 by National Starch & Chemical Company, and about 12 to about 13 weight percent adhesive concentrate stabilizer of R. J. Reynolds Tobacco Company known as AC-9. The AC-9 adhesive concentrate stabilizer consists of about 92 weight percent water and about 8 weight percent polyvinyl alcohol resin available as Celvol 205 from Celanese Chemicals. Such a formulation exhibits a viscosity of about 400 centipoise. If desired, the formulation can contain dyes or pigments for aesthetic purposes or to facilitate automated inspection of paper wrapping materials to which the formulation is applied. Such a formulation is particularly suitable for use with an application system of the type described previously with reference to FIGS. 3 and 4.

Another suitable formulation for an additive material for a paper web is a starch-based aqueous formulation. A representative formulation includes about 10 weight percent sodium chloride, about 0.5 weight percent potassium sorbate, about 35 weight percent oxidized tapioca starch available as Flo-Max 8 from National Starch & Chemical Company, about 20 weight percent calcium carbonate, and about 34.5 weight percent water. Such a formulation exhibits a viscosity of about 1,000 centipoise. If desired, the formulation can contain dyes or pigments for aesthetic purposes or to facilitate automated inspection of paper wrapping materials to which the formulation is applied. Such a formulation is particularly suitable for use with an application system of the type described previously with reference to FIGS. 3 and 4.

Another suitable formulation for an additive material for a paper web is a starch-based aqueous formulation. A representative formulation includes about 5 weight percent sodium chloride, about 0.5 weight percent potassium sorbate, about 49.8 weight percent oxidized tapioca starch available as Flo-Max 8 from National Starch & Chemical Company, and about 44.7 weight percent water. Preferably, the mixture is heated at an elevated temperature (e.g., about 170° F.) for a period of time (e.g., about 10 minutes) sufficient to result in the formation of a desirable paste. Such a formulation exhibits a viscosity in the range of about 200,000 centipoise to about 2,000,000 centipoise. The viscosity of such a formulation increases over time after initial manufacture. If desired, the formulation can contain dyes or pigments for aesthetic purposes or to facilitate automated inspection of paper wrapping materials to which the formulation is applied. Such a formulation is particularly suitable for use with an application system of the type described previously with reference to FIGS. 5 through 7.

Another suitable formulation for an additive material for a paper web is a starch-based aqueous formulation. A representative formulation includes about 10 weight percent sodium chloride, about 0.5 weight percent potassium sorbate, about 40 weight percent oxidized tapioca starch available as Flo-Max 8 from National Starch & Chemical Company, and about 49.5 weight percent water. Preferably, the mixture is heated at an elevated temperature (e.g., about 170° F.) for a period of time (e.g., about 10 minutes) sufficient to result in the formation of a desirable paste. After manufacture and storage, such a formulation exhibits a viscosity in the range of about 200,000 centipoise to about 2,000,000 centipoise. The viscosity of such a formulation gradually increases over time after initial manufacture. If desired, the formulation can contain dyes or pigments for aesthetic purposes or to facilitate automated inspection of paper wrapping materials to which the formulation is applied. Such a formulation is particularly suitable for use with an application system of the type described previously with reference to FIGS. 5 through 7.

For off-line printing, representative types of printers are those that are available as Scitex Grandject V Professional Printer from Scitex Corporation Ltd. Off-line type printing applications also are set forth in U.S. patent application Ser. No. 10/303,648, filed Nov. 25, 2002.

The amount of coating formulation that is applied to the paper wrapping material can vary. Typically, coating of the wrapping material provides a coated wrapping material having an overall dry basis weight (i.e., the basis weight of the whole wrapping material, including coated and uncoated regions) of at least about 1.05 times, often at least about 1.1 times, and frequently at least about 1.2 times, that of the dry basis weight of that wrapping material prior to the application of coating thereto. Typically, coating of the wrapping material provides a coated paper having an overall dry basis weight of not more about 1.4 times, and often not more than about 1.3 times, that of the dry basis weight of the wrapping material that has the coating applied thereto. Typical overall dry basis weights of those wrapping materials are about 20 g/m² to about 40 g/m²; preferably about 25 g/m² to about 35 g/m². For example, a paper wrapping material having a dry basis weight of about 25 g/m² can be coated in accordance with the present invention to have a resulting overall dry basis weight of about 26.5 g/m² to about 35 g/m², and often about 28 g/m² to about 32 g/m².

The dry weights of the coated regions of wrapping material of the present invention can vary. For wrapping materials that are used for the manufacture of cigarettes designed to meet certain cigarette extinction test criteria, it is desirable that the wrapping materials have sufficient coating formulation applied thereto to in the form of appropriately shaped and spaced bands in order that the dry weight of additive material applied to those wrapping materials totals at least about 1 pound/ream, often at least about 2 pounds/ream, and frequently at least about 3 pounds/ream; while the total dry weight of that applied additive material normally does not exceed about 10 pounds/ream.

Typical coated regions of paper wrapping materials of the present invention that are suitable for use as the circumscribing wrappers of tobacco rods for cigarettes have inherent porosities that can vary. Typically, the inherent porosities of the coated regions of the wrapping materials are less than about 8.5 CORESTA units, usually are less than about 8 CORESTA units, often are less than about 7 CORESTA units, and frequently are less than about 6 CORESTA units. Typically, the inherent porosities of the coated regions of the wrapping materials are at least about 0.1 CORESTA unit, usually are at least about 0.5 CORESTA unit, often are at least about 1 CORESTA unit. Preferably, the inherent porosities of the coated regions of the wrapping materials, particularly those wrapping materials that are used for the manufacture of cigarettes designed to meet certain cigarette extinction test criteria, are between about 0.1 CORESTA unit and about 4 CORESTA units.

The paper wrapping material of the present invention can have can be coated in patterns having predetermined shapes. The coating can have the form of cross directional lines or bands (including those that are perpendicular to the longitudinal axis of the wrapping material), stripes, grids, longitudinally extending lines, circles, hollow circles, dots, ovals, checks, spirals, swirls, helical bands, diagonally crossing lines or bands, triangles, hexagonals, honeycombs, ladder-type shapes, "zig-zag" shaped stripes or bands, sinusoidal shaped stripes or bands, square wave shaped stripes or bands, patterns composed of coated regions that are generally "C" or "U" shaped, patterns composed of coated regions that are generally "E" shaped, patterns composed of coated regions that are generally "S" shaped, patterns composed of coated regions that are generally "T" shaped, patterns composed of coated regions that are generally "V" shaped, patterns composed of coated regions that are generally "W" shaped, patterns composed of coated regions that are generally "X" shaped, patterns composed of coated regions that are generally "Z" shaped, or other desired shapes. Combinations of the foregoing shapes also can used to provide the desired pattern.

The relative sizes or dimensions of the various shapes and designs can be selected as desired. For example, shapes of coated regions, compositions of the coating formulations, or amounts or concentrations of coating materials, can change over the length of the wrapping material. The relative positioning of the printed regions can be selected as desired. For example, wrapping materials that are used for the production of cigarettes designed to meet certain cigarette extinction test criteria, the pattern most preferably has the form of spaced continuous bands that are aligned transversely or cross directionally to the longitudinal axis of the wrapping material. However, cigarettes can be manufactured from wrapping materials possessing discontinuous bands positioned in a spaced apart relationship. For wrapping materials of those cigarettes, it is most preferred that discontinuous bands (e.g., bands that are composed of a pattern, such as a series of dots, grids or stripes) cover at least about 70 percent of the surface of the band area or region of the wrapping material.

Preferred wrapping materials possess coatings in the form of bands that extend across the wrapping material, generally perpendicular to the longitudinal axis of the wrapping material. The widths of the individual bands can vary, as well as the spacings between those bands. Typically, those bands have widths of at least about 0.5 mm, usually at least about 1 mm, frequently at least about 2 mm, and most preferably at least about 3 mm. Often, those bands have widths of up to about 10 mm, typically up to about 8 mm, and usually up to about 7 mm. Preferred bands have widths of about 4 mm to about 7 mm. Such bands can be spaced apart such that the spacing between the bands is at least about 10 mm; often at least about 15 mm, frequently at least about 20 mm, often at least about 25 mm, in certain instances at least about 30 mm, and on occasion at least about 35 mm; but such spacing usually does not exceed about 50 mm.

Paper wrapping materials of the present invention are useful as components of smoking articles such as cigarettes. Preferably, one layer of the wrapping material of the present invention is used as the wrapping material circumscribing the smokable material, and thereby forming the tobacco rod of a cigarette. In one regard, it is preferable that the wrapping material possesses the coated regions located on the "wire" side thereof, and the "wire" side of that wrapping material forms the inner surface of the circumscribing wrapping material of the tobacco rod. Typically, the "felt" side of the wrapping material is used as the visible outer surface of the tobacco rod. The terms "wire side" and "felt side" in referring to the major surfaces of paper sheet are readily understood as terms of art to those skilled in the art of paper and cigarette manufacture.

Cigarettes of the present invention can be manufactured from a variety of components, and can have a wide range of formats and configurations. Typical cigarettes of the present invention having cross directional bands applied to the wrapping materials of the tobacco rods of those cigarettes have static burn rates (i.e., burn rates of those cigarettes under non-puffing conditions) of about 50 to about 60 mg tobacco rod weight per minute, in the non-banded regions of those cigarettes. Typical cigarettes of the present invention having cross directional bands applied to the wrapping materials of the tobacco rods of those cigarettes have static burn rates (i.e., burn rates of those cigarettes under non-puffing conditions) of less than about 50 mg tobacco rod weight per minute, preferably about 40 to about 45 mg tobacco rod weight per minute, in the banded regions of those cigarettes.

The smokable materials used for the manufacture of cigarettes of the present invention can vary. The smokable material typically consists primarily of tobacco, and it is preferred that the smokable material be virtually all tobacco. Descriptions of various types of tobaccos, growing practices, harvesting practices and curing practices are set for in *Tobacco Production, Chemistry and Technology*, Davis et al. (Eds.) (1999). The tobacco normally is used in cut filler form (e.g., shreds or strands of tobacco filler cut into widths of about 1/10 inch to about 1/60 inch, preferably about 1/20 inch to about 1/35 inch, and in lengths of about 1/4 inch to about 3 inches). The amount of tobacco filler normally used within a cigarette ranges from about 0.6 g to about 1 g. The tobacco filler normally is employed so as to filler the tobacco rod at a packing density of about 100 mg/cm$^3$ to about 300 mg/cm$^3$, and often about 150 mg/cm$^3$ to about 275 mg/cm$^3$. Tobaccos can have a processed form, such as processed tobacco stems (e.g., cut-rolled or cut-puffed stems), volume expanded tobacco (e.g., puffed tobacco, such as propane expanded tobacco and dry ice expanded tobacco (DIET)), or reconstituted tobacco (e.g., reconstituted tobaccos manufactured using paper-making type or cast sheet type processes).

Typically, tobacco materials for cigarette manufacture are used in a so-called "blended" form. For example, certain popular tobacco blends, commonly referred to as "American blends," comprise mixtures of flue-cured tobacco, burley tobacco and Oriental tobacco, and in many cases, certain processed tobaccos, such as reconstituted tobacco and processed tobacco stems. The precise amount of each type of tobacco within a tobacco blend used for the manufacture of a particular cigarette brand varies from brand to brand. See, for example, *Tobacco Encyclopedia*, Voges (Ed.) p. 44–45 (1984), Browne, *The Design of Cigarettes*, 3$^{rd}$ Ed., p. 43 (1990) and *Tobacco Production, Chemistry and Technology*, Davis et al. (Eds.) p. 346 (1999). In addition, the smokable material can be cased and/or top dressed; and/or at least one flavor component can be incorporated within the side seam adhesive applied to the wrapping material during tobacco rod manufacture. See, for example, U.S. patent application Ser. No. 10/303,648, filed Nov. 25, 2002.

Cigarette wrapping materials manufactured in accordance with the present invention can be used to manufacture a wide variety of cigarettes. Exemplary cigarettes, and exemplary components, parameters and specifications thereof, are of the type set forth in U.S. Pat. No. 4,924,888 to Perfetti et al.; U.S. Pat. No. 5,056,537 to Brown et al.; U.S. Pat. No. 5,220,930 to Gentry; and U.S. Pat. No. 5,360,023 to Blakely et al.; PCT WO 02/37990; US Patent Application 2002/0166563 and Serial No. 10/285,395, filed Oct. 31, 2002; and Bombick et al., *Fund. Appl. Toxicol.*, 39, p. 11–17 (1997); which are incorporated herein by reference.

There are several factors that determine a specific coating pattern for a wrapping material of the present invention. It is desirable that the components of the coating formulations applied to wrapping materials not adversely affect to any significant degree (i) the appearance of cigarettes manufactured from those wrapping materials, (ii) the nature or quality of the smoke generated by those cigarettes, (iii) the desirable burn characteristics of those cigarettes, or (iv) the desirable performance characteristics of those cigarettes. It also is desirable that wrapping materials having coating formulations applied thereto not introduce undesirable off-taste, or otherwise adversely affect the sensory characteristics of the smoke generated by cigarettes manufactured using those wrapping materials. In addition, preferred cigarettes of the present invention do not have a tendency to undergo premature extinction, such as when lit cigarettes are held in the smoker's hand or when placed in an ashtray for a brief period of time.

For an exemplary full flavor cigarette having a tobacco rod length of about 63 mm and a filter element length of about 21 mm, cross directional bands of about 6 mm width can be spaced at about 20 mm intervals on the wrapping materials used to manufacture those cigarettes. Alternatively, for those types of cigarettes, bands of about 4 mm width can be spaced at about 22 mm intervals on the wrapping materials used to manufacture those cigarettes. Alternatively, for those types of cigarettes, bands of about 6 mm width can be spaced at about 39 mm intervals. For an exemplary full flavor cigarette having a tobacco rod length of about 70 mm and a filter element length of about 30 mm, cross directional bands of about 6 mm width can be spaced at about 44 mm intervals on the wrapping materials used to manufacture those cigarettes. For an exemplary ultra low tar cigarette having a tobacco rod length of about 57 mm and a filter element length of about 27 mm, cross directional bands of about 7 mm width can be spaced at about 20 mm intervals. Alternatively, for those types of cigarettes, bands of about 6 mm width can be spaced at about 33 mm intervals, or at about 39 mm intervals, on the wrapping materials used to manufacture those cigarettes. For an exemplary ultra low tar cigarette having a tobacco rod length of about 68 mm and a filter element length of about 31 mm, cross directional bands of about 6 mm width can be spaced at about 44 mm intervals on the wrapping materials used to manufacture those cigarettes. Full flavor cigarettes are classified as those that yield about 14 mg or more of FTC "tar." Ultra low tar cigarettes are classified as those that yield less than about 7 mg of FTC "tar." Those cigarettes, have tobacco rods having appropriate wrapping materials possessing bands composed of appropriate amounts of appropriate components have the ability to meet the aforementioned cigarette extinction criteria.

Certain preferred paper wrapping materials used in carrying out the present invention are useful for the manufacture of cigarettes designed to exhibit reduced ignition propensity. That is, cigarettes incorporating certain wrapping materials, when placed on a flammable substrate, tend to self extinguish before burning that substrate. Of particular interest are those cigarettes possessing tobacco rods manufactured using appropriate wrapping materials possessing bands composed of appropriate amounts of appropriate components so as to have the ability to meet certain cigarette extinction criteria.

Cigarettes designed to meet certain cigarette extinction test criteria can be produced from wrapping materials of the present invention. Banded regions on a wrapping material are produced using additive materials that are effective in reducing the inherent porosity of the wrapping material in those regions. Film-forming materials and fillers applied to the wrapping material in those banded regions are effective in increasing the weight of the wrapping material in those regions. Filler materials that are applied to the wrapping material in those banded regions are effective in decreasing the burn rate of the wrapping materials in those regions. Typically, when wrapping materials of relatively high inherent porosity are used to manufacture cigarettes, those wrapping materials possess relatively high weight bands that introduce a relatively low inherent porosity to the banded regions. Film-forming materials have a tendency to reduce the porosity of the wrapping material, whether or not those materials are used in conjunction with fillers. However, coatings that combine porosity reduction with added coating weight to wrapping materials also are effective in facilitating extinction of cigarettes manufactured from those wrapping materials. Low porosity in selected regions of a wrapping material tends to cause a lit cigarette to extinguish due to the decrease in access to oxygen for combustion for the smokable material within that wrapping material. Increased weight of the wrapping material also tends to cause lit cigarette incorporating that wrapping material to extinguish. As the inherent porosity of the wrapping material increases, it also is desirable to (i) select a film-forming material so as to cause a decrease the inherent porosity of the coated region of the wrapping material and/or (ii) provide a coating that provides a relatively large amount of added weight to the coated region of the wrapping material.

Certain cigarettes possessing tobacco rods manufactured using certain appropriately treated wrapping materials, when tested using the methodology set forth in the Cigarette Extinction Test Method by the National Institute of Standards and Technology (NIST), Publication 851 (1993) using 10 layers of Whatman No. 2 filter paper, can meet criteria requiring extinction of greater than about 50 percent, preferably greater than about 75 percent, and most preferably about 100 percent, of cigarettes tested. Certain cigarettes possessing tobacco rods manufactured using certain appropriately treated wrapping materials, when tested using the methodology set forth in ASTM Designation: E 2187-02b using 10 layers of Whatman No. 2 filter paper, also can meet criteria requiring extinction of greater than about 50 percent, preferably greater than about 75 percent, and most preferably about 100 percent, of cigarettes tested.

For cigarettes designed to meet those aforementioned extinction criteria, each such cigarette typically possesses at least one band located in a region of its tobacco rod such that the band is capable of providing that cigarette with the ability to meet those extinction criteria. For a tobacco rod of a particular length incorporating a wrapping material possessing bands that are aligned transversely to the longitudinal axis of the wrapping material in a spaced apart relationship, the ratio of the length of the tobacco rod to the sum of the width of a band and the distance between the bands is 1 to 2, preferably about 1.1 to about 1.4, and most preferably about 1.2. Alternatively, bands can be positioned at virtually identical predetermined locations on each rod (e.g., each cigarette can have one band positioned 20 mm from the lighting end thereof; or each cigarette can have two bands, one band positioned at 15 mm from the lighting end thereof and the second band positioned at 30 mm from the lighting end).

Representative cigarettes can be manufactured using paper wrapping materials that are printed off-line using electrostatic deposition techniques. A template can be provided on a sheet of multipurpose business paper commonly used for office photocopying. A representative template sheet has a size of about 8.5 inches by about 11 inches. The template is provided as a pattern made up of a series of black bands, each band of 5 mm width and extending 8.5 inches across the width of the template sheet; and successive leading edges of the bands are separated from one another by 25 mm. Onto a similar second sheet of paper are taped six strips of cigarette paper web. Each strip is about 11 inches long, and the strips are aligned parallel to one another so that each strip covers that second sheet extends along the length of that second paper sheet. The cigarette paper that is used to provide those strips is the type available as Reference No. 456 from Ecusta Corp. The template sheet is placed on the imaging region of a Canon Imagerunner 400S copier. The second sheet is placed in the in-feed tray of the copier. The image from the template is copied onto the second sheet so that the image from the template in copied onto the cigarette paper strips. As such, each cigarette paper strip of 11 inch length has a series of black bands of 5 mm width and the leading edges of those bands are spaced at 25 mm, and those bands each extend transversely to the longitudinal axis of that paper strip. The resulting paper strips are used to made handmade cigarettes, such as cigarettes of the format and configuration of Camel Light 85 brand cigarettes that are manufactured by R. J. Reynolds Tobacco Company. Cigarettes of such a type can have the ability to consistently meet certain cigarette extinction criteria, such as the Cigarette Extinction Test Method by the National Institute of Standards and Technology (NIST), Publication 851 (1993) using 10 layers of Whatman No. 2 filter paper. As such, electrostatic deposition of photocopier toner material as a plurality of bands on a cigarette paper wrapper, and the fusing of that deposited toner to that paper, provides a way for manufacturing a cigarette that has a propensity to extinguish such a cigarette when the fire cone of that cigarette reached such a band. That is, fusion of the plastic-based components of the toner material to the paper in selected regions provides that paper with a character that has the potential to promote extinguishment of a cigarette manufactured from that paper (e.g., fusion of plastic-based toner components to the paper can reduce the inherent porosity of that paper in the printed regions).

Although the present invention has been described with reference to particular embodiments, it should be recognized that these embodiments are merely illustrative of the principles of the present invention. Those of ordinary skill in the art of smoking article design and manufacture will appreciate that the various systems, equipment, materials and methods may be constructed and implemented in other ways and embodiments. Accordingly, the description herein should not be read as limiting the present invention, as other embodiments also fall within the scope of the present invention.

What is claimed is:

1. A method for registering pattern location on a wrapping material of a cigarette during cigarette manufacture, comprising:

providing an automated cigarette making apparatus having a source of a continuous strip of a paper web and a means for applying an additive material to the paper web;

providing a continuous cigarette rod by wrapping tobacco filler in the paper web;

controlling a speed of formation of the continuous cigarette rod;

controlling an application of the additive material to the paper web relative to the speed of formation of the continuous cigarette rod;

cutting the continuous cigarette rod into a plurality of cigarette rods of predetermined lengths;

controlling a location of the additive material application on the paper web relative to a location at which one of the plurality of the continuous cigarette rods provided from the paper web is cut; and controlling the location of the additive material application relative to a length of travel of the paper web after the additive material is applied and prior to cutting the continuous cigarette rod.

2. The method of claim 1, wherein the length of travel of the paper web after the additive material is applied comprises an adjusted length of travel.

* * * * *